United States Patent

Isfeld et al.

Patent Number: 5,802,278
Date of Patent: Sep. 1, 1998

[54] BRIDGE/ROUTER ARCHITECTURE FOR HIGH PERFORMANCE SCALABLE NETWORKING

[75] Inventors: Mark S. Isfeld, San Jose; Tracy D. Mallory, Palo Alto; Bruce W. Mitchell, San Jose; Michael J. Seaman, Mountain View; Nagaraj Arunkumar, San Jose, all of Calif.

[73] Assignee: 3Com Corporation, Santa Clara, Calif.

[21] Appl. No.: 599,473

[22] Filed: Jan. 23, 1996

Related U.S. Application Data

[63] Continuation-in-part of Ser. No. 438,897, May 10, 1995.

[51] Int. Cl.$^6$ .................... G06F 15/16; G06F 13/14
[52] U.S. Cl. ............. 395/200.02; 395/800; 395/183.19; 370/85.13
[58] Field of Search ................ 395/800, 200.1, 395/497.01, 182.02, 183.19, 200.06; 340/825.02, 825.51; 364/DIG. 1, DIG. 2; 370/60.1, 85.13, 60, 94.1

[56] References Cited

U.S. PATENT DOCUMENTS

| | | | |
|---|---|---|---|
| 4,475,155 | 10/1984 | Oishi et al. | 395/842 |
| 4,644,532 | 2/1987 | George et al. | 370/112 |
| 4,783,730 | 11/1988 | Fischer | 395/825 |
| 4,860,244 | 8/1989 | Bruckert et al. | 395/250 |
| 4,912,723 | 3/1990 | Verbanets, Jr. | 375/220 |
| 4,962,497 | 10/1990 | Feren et al. | 370/60.1 |
| 5,088,090 | 2/1992 | Yacoby | 370/85.13 |
| 5,088,091 | 2/1992 | Schroeder et al. | 340/825.02 |
| 5,093,824 | 3/1992 | Coam et al. | 395/182.02 |
| 5,109,484 | 4/1992 | Hughes et al. | 395/200.1 |
| 5,121,383 | 6/1992 | Golestani | 370/60 |
| 5,131,081 | 7/1992 | McKenna et al. | 395/842 |
| 5,134,691 | 7/1992 | Elms | 395/200.01 |
| 5,255,387 | 10/1993 | Arnold et al. | 395/600 |
| 5,335,325 | 8/1994 | Frank et al. | 395/490 |
| 5,379,296 | 1/1995 | Johnson et al. | 370/60 |
| 5,404,524 | 4/1995 | Celi, Jr. | 395/700 |
| 5,426,637 | 6/1995 | Derby et al. | 370/85.13 |
| 5,469,548 | 11/1995 | Callison et al. | 395/441 |
| 5,485,455 | 1/1996 | Dobbins et al. | 370/60 |
| 5,521,910 | 5/1996 | Matthews | 370/54 |

FOREIGN PATENT DOCUMENTS

WO 94/08415  4/1994  WIPO.

OTHER PUBLICATIONS

Choi, et al., "Integrating Networks and Memory Hierarchies in a Multicomputer Node Architecture," IEEE, pp. 10–17, (1994).

*Primary Examiner*—Daniel H. Pan
*Attorney, Agent, or Firm*—Wilson Sonsini Goodrich & Rosati

[57] ABSTRACT

A high performance scalable networking bridge/router system is based on a backbone communication medium and message passing process which interconnects a plurality of input/output modules. The input/output modules vary in complexity from a simple network interface device having no switching or routing resources on board, to a fully functional bridge/router system. Also, in between these two extremes input/output modules which support distributed protocol processing are supported. A central internetworking engine includes a shared memory resource coupled to the backbone. The architecture includes a physical layer communication system for transferring control messages and data packets across the backbone, a logical layer interprocessor messaging system which operates over the physical layer across the backbone for communication between intelligent input/out modules, and between such modules in the central internetworking engine, and distributed protocol modules which are supported on intelligent input/output modules, and communicate using the logical interprocessor messaging system with the central internetworking resources.

32 Claims, 30 Drawing Sheets

| transfer type | MSG XMIT | SMEM WRITE | SMA READ | SMEM READ | MEM MOVE | CELL XMIT | MSG RCV | CBIO & CBMEM WRITE | CB READ | PROMIS-CUOUS RCV |
|---|---|---|---|---|---|---|---|---|---|---|
| source addr a | SDRAM | SDRAM | SMEM | SMEM | SDRAM | SDRAM | other card | 29030 | explicit (mem/io) | other card |
| dest addr b | MSG | SMEM | MSG (channel) | SDRAM | SDRAM | explicit msg addr | MSG (channel) | explicit (mem/io) | 29030 | any CB addr, filtered |
| direction wrt IOM | outbound | outbound | inbound | inbound | loopback (not CB) | outbound (loop?) | inbound | outbound | inbound | inbound |
| origin of cycle | command list | command list | command list | command list | command list | command list | other card | command list | command list | any CB cycle |
| receive activity | n/a | n/a | rcv buff free list | move to SDRAM | move to SDRAM | varies | rcv buff free list | n/a | move to SDRAM | move to SDRAM |
| data buffering | packing cell buff | packing cell buff | packing cell buff | packing cell buff | packing cell buff | packing cell buff | inbound cell buff | embedded in cmd list | packing cell buffer | inbound cell buff |
| align & pack | yes | yes | yes | yes | yes | no | no | no | no | no |

FIG. 9

Corebus Data Transfers

Message Transmit Datapath

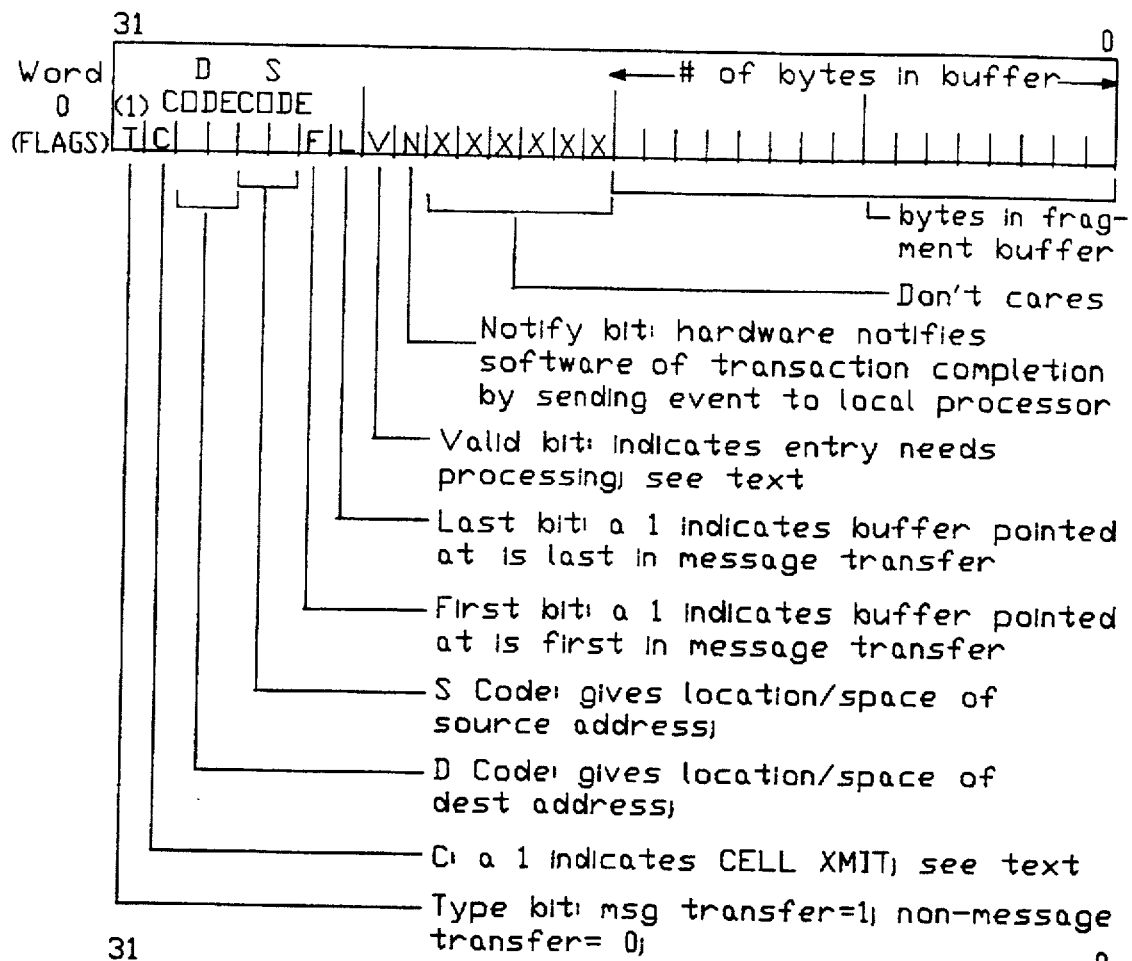
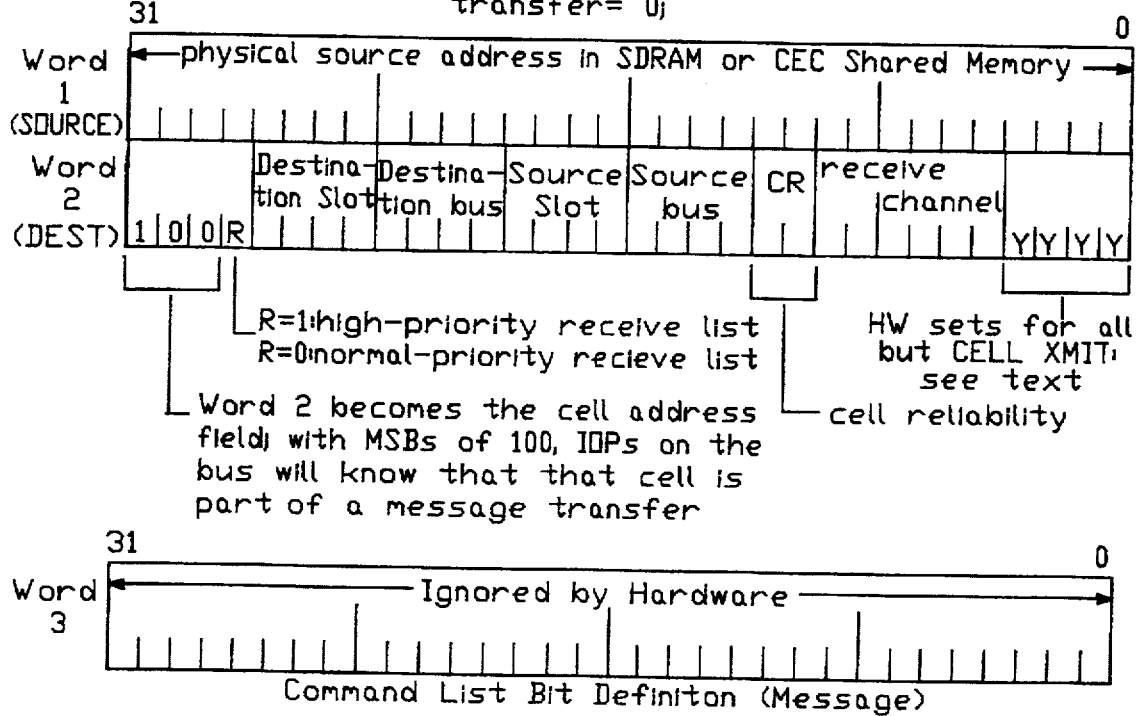
FIG.19

| IMS Message Type | Minimum Latency Requirement | Minimum Reliability Requirement | Frequency of occurrence on IOS/IOP -Avg.Peak (Msgs/Sec) | IMS Message Queue | IMS drop priority |
|---|---|---|---|---|---|
| Internal Remote function calls | High | Very High | 20, 40 | HRQ | Guaranteed Delivery |
| IOP Management (e.g. statistics) | High | High | 5, 30 | HRQ | Guaranteed Delivery |
| IOS/IOP control messages (e.g. cache-query, intra-box msgs) | Low | Very High | 20, 200 | HRQ | 1(Low drop probability) |
| Critical Network Control Pkts (e.g.IS-IS LSPs, STP Pkts) | Medium | High | 10, 50 | HRQ | 2 |
| Other Network Control Pkts (e.g. ES-IS hellos, IPX SAPs) | Medium | Medium | 10, 100 | HRQ | 3(High drop probability) |
| IOP-IOP Data pkts for a IOP-distributed protocol | Medium | Low-Med | 10k, 50k | HTQ | 1(Low drop probability) |
| IOP-IOM Data pkts for a IOP-distributed protocol | Medium | Low-Med | 5k, 50k | HTQ | 2 |
| IOP-CEC centralized protocol data packets | Medium | Low-Med | 5k, 50k | HTQ | 3 |
| IOP-external distributed protocol exception packets | High | Low | 10, 500 | HTQ | 4 |
| Transit Multicast packets | High | Lower | 20, 1000 | HTQ | 5(High drop probability) |

FIG.25

BRIDGE/ROUTER ARCHITECTURE FOR HIGH PERFORMANCE SCALABLE NETWORKING

RELATED APPLICATION DATA

This application is a continuation-in-part of prior filed U.S. application Ser. No. 08/438,897, entitled NETWORK INTERMEDIATE SYSTEM WITH MESSAGE PASSING ARCHITECTURE, filed May 10, 1995, which is incorporated by reference as if fully set forth herein.

BACKGROUND OF THE INVENTION

1. Field of the Invention

The present invention relates to high performance bridge/routers that supply transparent communication between a variety of types of network interfaces within a single chassis, integrating such local area network standards as Token Ring, Ethernet, FDDI, and ATM, and also supporting wide area links. More particularly, the present invention provides an internetworking device providing high performance, scalable internetworking.

2. Description of Related Art

A router is an internetworking device that chooses between multiple paths when sending data, particularly when the paths available span a multitude of types of local area and wide area interfaces. Routers are best used for (1) selecting the most efficient path between any two locations; (2) automatically re-routing around failures; (3) solving broadcast and security problems; and (4) establishing and administering organizational domains. One class of router, often called bridge/routers or Brouters, also implements switching functionality, such as transparent bridging and the like. One commercially available example of such system is known as NETBuilder II, provided by 3Com Corporation of Santa Clara, Calif.

Because bridge/routers are designed to interconnect a variety of networks, the volume of data flow through the router can be very high. The ability to move large amounts of data, according to a wide variety of networking protocols, makes the bridge/router a unique class of high performance data processing engines.

One problem with prior art bridge/router architectures is scalability, and another is backward compatibility. When a customer buys a prior art system, and fills up the available ports on the system, often the customer is required to buy another copy of the entire system, which may be much more than is necessary, or scrap the old system and buying a new system with a larger number of ports. Thus, the prior art establishes plateaus in system hardware that are very expensive to cross.

The NETBuilder II architecture, which is described in the parent application from which this is a continuation in part, allows expansion on a port by port basis. However, there is a limit to the number of ports that can be mounted on the backplane bus of the NETBuilder II architecture, because this architecture requires that all of the data frames incoming through the ports get transferred across the backplane bus to a centrally shared memory and processed there.

An alternative prior art system allows for a number of sophisticated multi-port router engines to communicate with one another. Thus, the only packets that go across the link between the routers are those which must be transferred from a port on one router to a port on another. This architecture, however, requires that expansion of the system be done by adding an entire new router engine. Thus, the system does not allow incremental expansion on a port by port basis.

Accordingly, it is desirable to provide a high performance, scalable networking strategy which allows flexible growth of a switching, routing engine. Using such strategy, expertise can be brought together quickly to deliver projects or products efficiently and effectively, without requiring large scale hardware upgrades which are unsuited to the particular project or product needed. Custom applications can be developed faster and more cost effectively. The cost of incremental computing power will drop dramatically with a scalable platform. Further, the investment in current equipment and technologies is protected, while paving the way for future technologies.

SUMMARY OF THE INVENTION

The present invention provides a high performance, scalable networking bridge/router system which overcomes many of the problems discussed above. The bridge/router architecture according to the present invention is based on a message passing system which interconnects a plurality of input/output modules. The input/output modules vary in complexity from a simple network interface device having no switching or routing resources on board, to a fully functional bridge/router system. Also, in between these two extremes input/output modules which support distributed protocol processing with differing levels of intelligence are included.

The bridge/router architecture according to one aspect of the invention includes a central internetworking engine, including a shared memory resource coupled to the high speed backplane bus. Depending on the level of sophistication supported on the input/output module, the central internetworking engine may perform all routing decisions for packets received on a particular port, or may support distributed protocol processing at an input/output module in which certain classes of packets are routed locally on the input/output module while others are forwarded to the central engine. The architecture can be characterized as having a number of components, including a physical layer communication system for transferring control messages and data packets across the backplane bus; and a logical layer interprocessor messaging system which operates over the physical layer across the bus supporting communication between intelligent input/output modules, and between such modules in the central internetworking engine. Distributed protocol modules are supported on intelligent input/output modules, which communicate using the logical interprocessor messaging system with the central internetworking resources, and with other input/output modules on the system to make routing decisions for a majority of packets of a particular type received on such systems. As mentioned above, the central internetworking engine also supports input/output modules which only include the network interface chip and resources for communicating data across the backplane bus to the central engine, which acts as a data link layer agent for such systems. The logical layer can overlay a variety of physical layers, including in addition to a high speed bus, local area networks such as Ethernet, Token Ring, asynchronous transfer mode ATM, and others.

The centralized internetworking engine includes central distributed protocol module servers which manage the distributed protocol modules on the input/output modules, when the distributed protocol modules only partially support such protocols. Further, the centralized internetworking engine can support maintenance of synchronization between distributed protocol modules in the system. Thus, distributed protocol modules may include protocol address caches to support routing decisions locally on the input/output module for addresses stored in the cache. The central internetworking engine according to this aspect stores the entire routing table for the particular protocol, and includes resources for responding to cache update requests from the input/output modules, and for managing routing data used in the operation of the distributed protocol modules on a plurality of input/output modules in the system. In a preferred system, the cache is loosely coupled with the central routing table, using a cache management protocol which is timer based and requests updates for stale entries in response to traffic using the stale entry.

Accordingly, the present invention can be characterized as an apparatus for interconnecting a plurality of networks. The apparatus comprises a communication medium having a physical layer protocol. A central routing processor is coupled to the physical layer. A plurality of input/output modules communicate with the central routing processor according to the physical layer protocol. The input/output modules have respective sets of physical network interfaces which support a variety of LAN and WAN network protocols. An interprocessor messaging system in a logical layer above the physical layer protocol is executed in the central routing processor and in a set of one or more intelligent input/output modules within the plurality of input/output modules. Distributed protocol services are executed over the interprocessor messaging system, and include a distributed protocol module in at least one of the plurality of input/output modules which makes routing decisions supported by the distributed protocol module, and a distributed protocol module server in the central routing processor which in response to queries from the distributed protocol module makes routing decisions on behalf of the distributed protocol module. Further, a particular input/output module in the plurality may include resources for signalling the central routing processor about events across the physical layer protocol. According to this aspect, there are centralized routing resources executed in the central routing processor over the physical layer protocol in response to such events for making routing decisions on behalf of such input/output modules.

The distributed protocol services according to the present invention may include resources for performing transparent bridging, internet protocol routing, or other routing or switching decisions based on other internetworking protocols. The distributed protocol modules may include a protocol routing table cache and the distributed protocol module server includes resources for maintaining a central protocol routing table and supporting the protocol routing table caches.

The interprocessor messaging system includes resources for transferring control messages and network packets in transit among the central routing processor and the input/output modules in the set of intelligent input/output modules. This allows the input/output modules to be developed with a logical layer communication system in mind for access to the centralized internetworking engine. This enables tremendous flexibility in the design and expansion of bridge/routers according to the present invention. Further, because the centralized internetworking engine supports communication across the backplane with input/output modules without higher layer protocol processing, backward compatibility is ensured, as well as the ability to incrementally expand an existing system with one network interface at a time growth.

The system further provides tremendous flexibility in utilization of the backplane. Thus, the interprocessing messaging system, as well as the physical layer protocol support communication among the central routing processor and the plurality of input/output modules with messages in a plurality of latency classes, and in a plurality of reliability classes. Thus, certain control messages can be delivered across a system with very high reliability. Data packets in transit can be transferred across the system with lower reliability but higher throughput. A dropped data packet from time to time does not affect overall system performance significantly because network protocols are able to recover from such lost packets. The critical parameter for transferring data in transit is minimizing system overhead and maximizing throughput.

In sum, the present invention provides a high performance scalable internetworking platform based on an interprocessor messaging system which provides a logical layer for communicating among input/output modules, allowing diverse input/output modules. The diverse input/output modules may include distributed protocol modules which communicate with a distributed protocol module server on a centralized resource. This allows a large amount of routing decisions to be made in the distributed protocol modules without requiring transfer of data in transit from the port to the centralized processor. Rather, these packets are transferred directly from port to port in the system, maximizing efficiency of the data paths in the device. The centralized internetworking engine allows synchronization of internetworking functions, and provides for handling of exception packets in the host, which occur rarely and need not be supported in the distributed modules.

Other aspects and advantages of the present invention can be seen upon review of the figures, the detailed description, and the claims which follow.

BRIEF DESCRIPTION OF THE FIGURES

FIG. 9 is a table setting forth the data transfer types in the system of FIG. 1.

FIG. 19 illustrates the command list bit definition for a message type transfer.

FIG. 25 is a table showing the interprocessor messaging system message types and their priorities according to one implementation of the present invention.

DETAILED DESCRIPTION

A detailed description of an embodiment of the present invention is provided with reference to the figures. FIGS. 1–5 illustrate a basic hardware environment for the system applied as a network intermediate system. FIGS. 6–21 illustrate the message transfer hardware and techniques applied according to the present invention in the environment of FIG. 1.

FIGS. 22 through 32 illustrate the processing resources and the logical layered interprocessor messaging system used over the physical layer.

Figure 33:
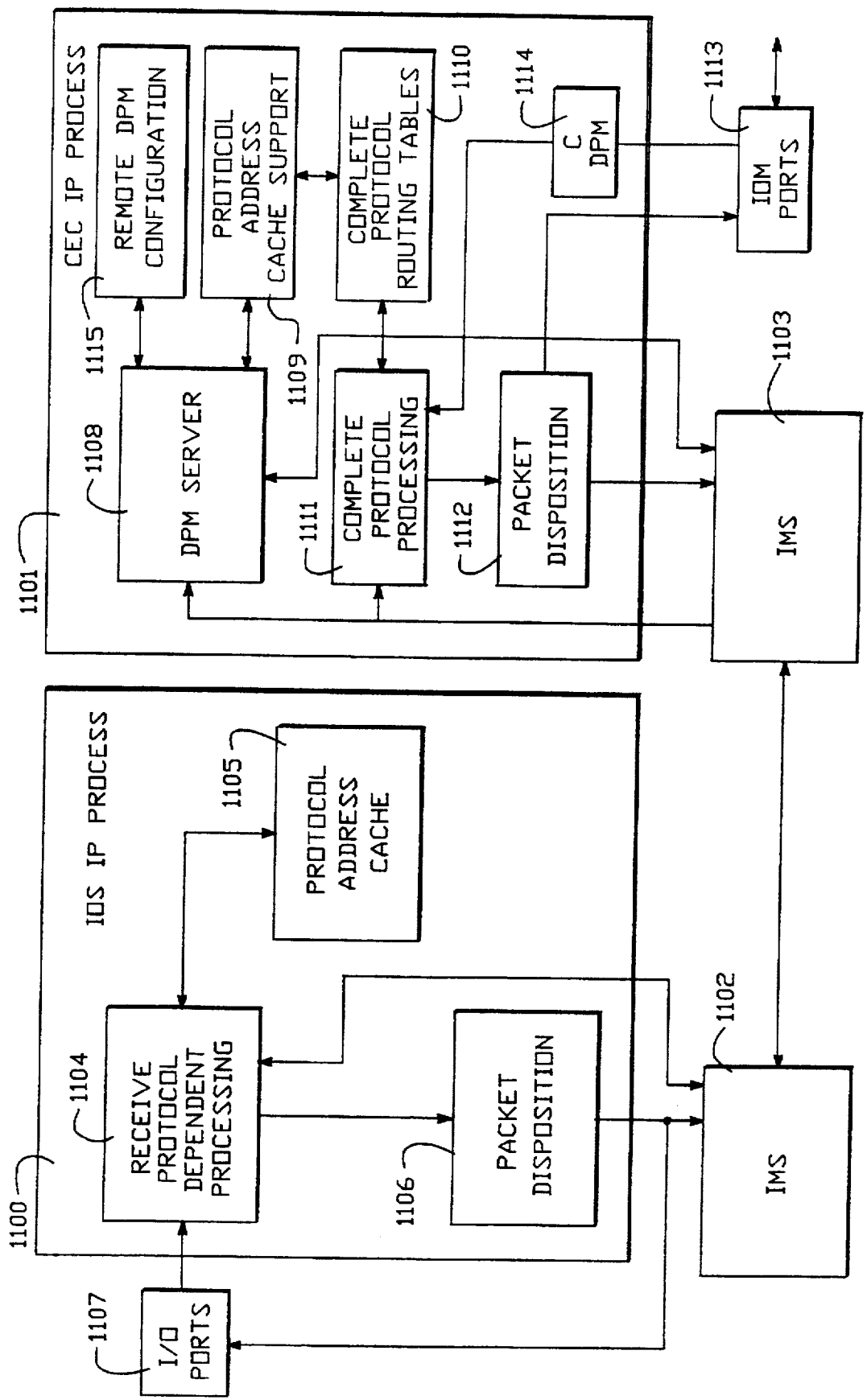
FIG. 33 illustrates the components of distributed internet protocol (IP) processing according to the present invention.
Figure 34:
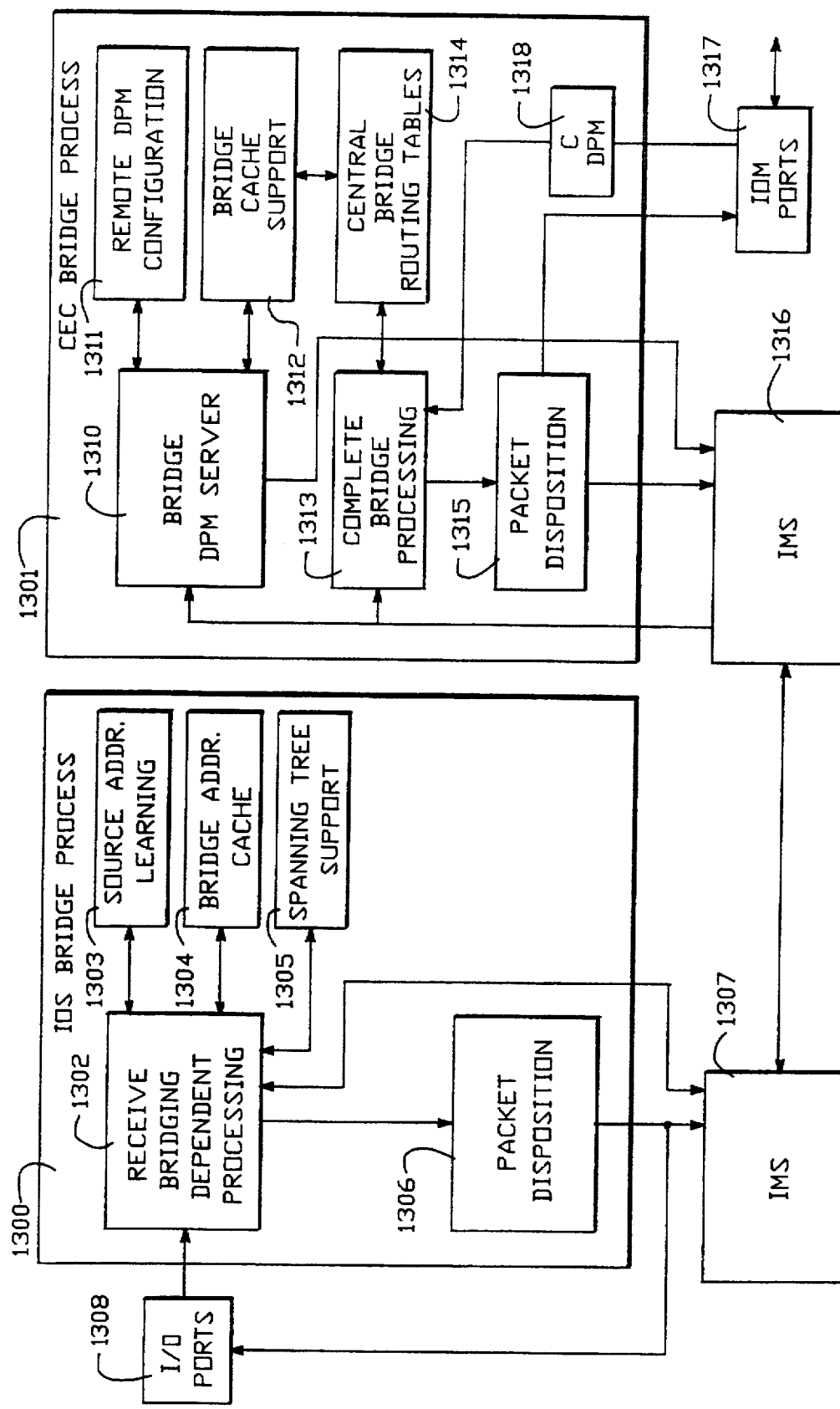
FIG. 34 illustrates the components of distributed transparent bridging processing according to the present invention.
Figure 35:
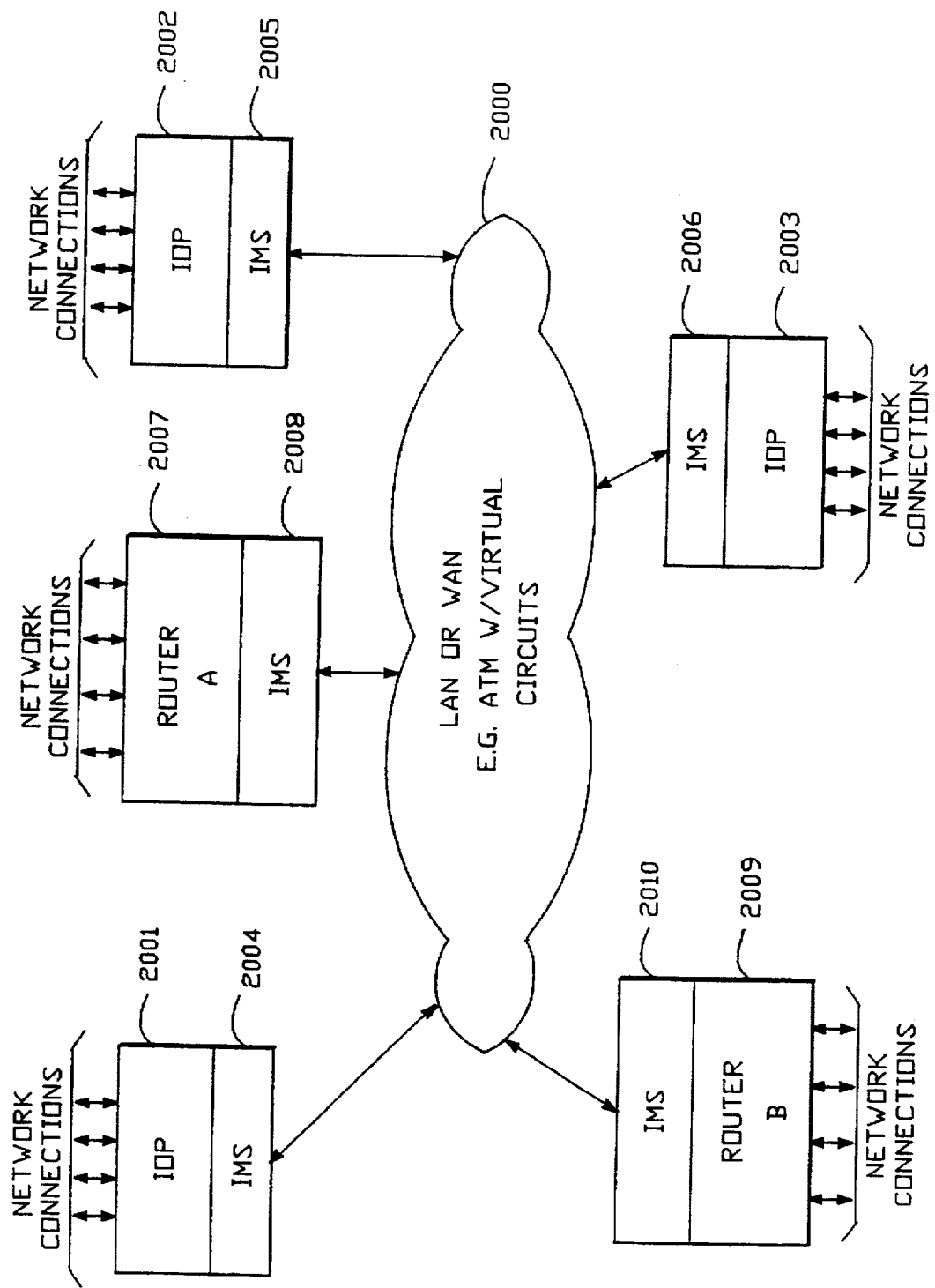
FIG. 35 illustrates application of the scalable architecture across a LAN or WAN backbone.

FIG. 33 shows an internet protocol (IP) distributed protocol module and distributed protocol module server; and FIG. 34 shows distributed protocol resources for transparent bridging according to the present invention. FIG. 35 shows use of the scalable architecture with a LAN or WAN backbone.

I. SYSTEM DESCRIPTION

Figure 1:
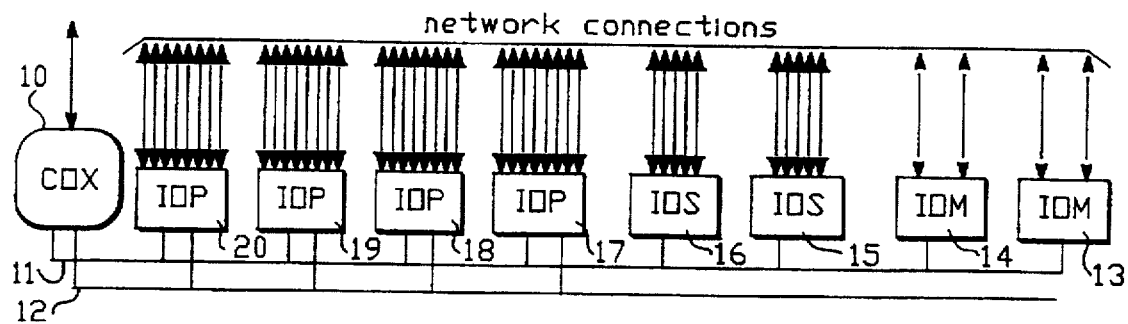
FIG. 1 provides a system block diagram for a scalable network intermediate system according to the present invention.

FIG. 1 provides a board level block diagram of a scalable bridge/router illustrating the present invention. The bridge/router includes a central control card COX 10 coupled to a first high speed parallel bus 11 and a second high speed parallel bus 12. A plurality of input/output (I/O) modules are coupled to the bus 11 to provide input/output functions for connected networks. The plurality of I/O modules includes in the embodiment described a first relatively passive type interface device IOM 13 and 14, an intermediate level semi-intelligent processing device IOS 15 and 16, and a more powerful processing system IOP 17, 18, 19, and 20. The IOP boxes 17–20 include interfaces to both high speed buses 11 and 12.

Each of the plurality of processors has at least one associated network connection. Thus, the IOM boxes 13 and 14 include two network connections each, which might be coupled to, for instance, Ethernet or token ring local area networks. The IOS boxes 15 and 16 include five connections each, coupling to local area networks (LANs), such as Ethernet, FDDI, token ring, or the like and/or wide area networks (WAN) links. The IOP boxes 17–20 have eight network connections each and handle much higher throughputs.

Figure 2:
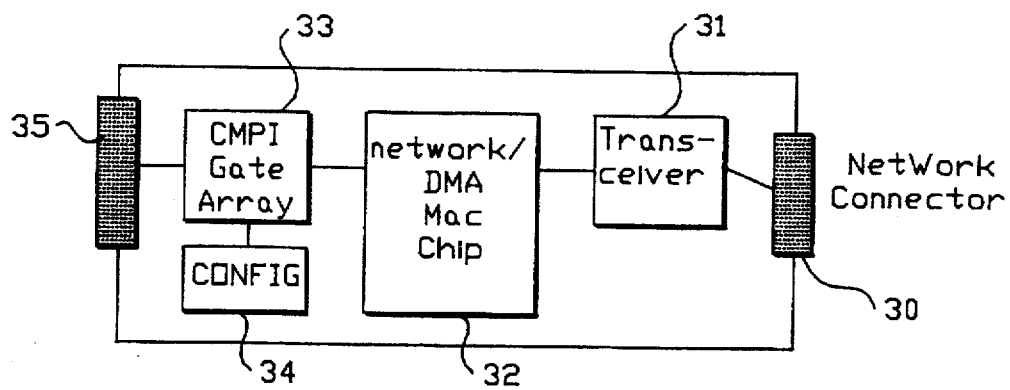
FIG. 2 provides a block diagram of a basic input/output module (IOM) which may be used in the system of FIG. 1.

The basic IOM box 13 is illustrated in FIG. 2. It includes at least one network connector 30 which is coupled to a transceiver 31 and a network/DMA MAC chip 32, such as commercially available for a given type of network. This chip is coupled to a bus interface chip 33 with associated configuration data 34, and through the interface chip 33 to a backplane bus connection 35. The IOM box shown in FIG. 2 relies primarily on the central control box COX 10 for the management of data transfer and control functions.

The bus interface chip 33 is described in detail in our co-pending U.S. patent application entitled INPUT/OUTPUT BUS ARCHITECTURE WITH PARALLEL ARBITRATION, application Ser. No. 08/033,008, filed Feb. 26, 1993, invented by Mark Isfeld, et al. Such application is incorporated by reference as if fully set forth herein to fully provide a detailed description of the bus architecture in the preferred system. However, this particular bus architecture is not intended to be limiting. The preferred system uses a 32 bit (or greater) wide bus with a least a 25 MHz clock and preferably a 50 MHz clock, for a nominal data rate of 800 MBPS (megabits per second) or 1600 MBPS. Even higher data rates can be achieved with state of the art high speed parallel bus architecture, or other data transfer techniques. Also, the backplane may be implemented using a variety of local area network technologies as discussed below with reference to FIG. 35.

Figure 3:
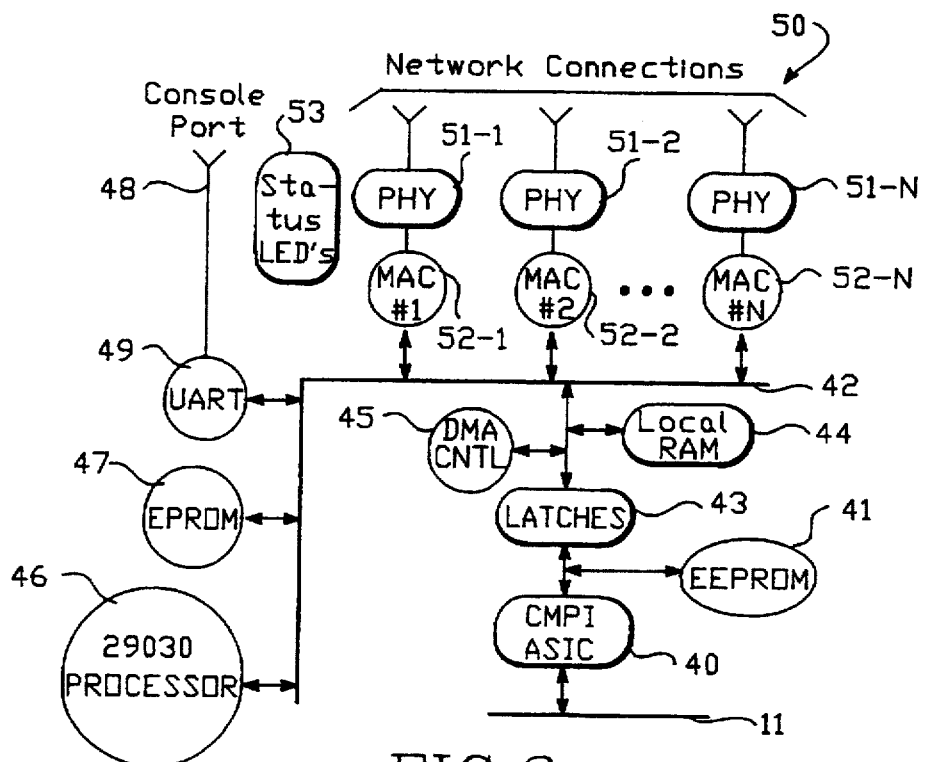
FIG. 3 provides a block diagram of a semi-intelligent I/O module (IOS) such as used in the system of FIG. 1.

The semi-intelligent I/O processor IOS, 15 and 16, is illustrated in FIG. 3. As can be seen, this system is connected to the bus 11 through the bus interface chip 40. A nonvolatile memory device 41, such as an EEPROM, stores configuration data and the like for the bus interface 40. A data interface to an intermediate bus 42 is provided through latches 43. Also, a local memory 44 and a DMA control module 45 are coupled to the intermediate bus 42 and the local memory 44. An intelligent microprocessor 46, such as the Am29030 manufactured by Advanced Micro Devices, Inc., is coupled to the intermediate bus 42. A flash programmable read only memory 47 provides storage for programs executed by the processor 46. A console port 48 is provided through a UART interface 49 to the bus 42. A plurality of network connections, generally 50, are coupled to the bus 42 through respective physical interfaces 51-1 through 51-N, and medium access control MAC devices 52-1 through 52-N. The box may include status light emitting diodes 53 connected and controlled as desired by the particular user.

Figure 4:
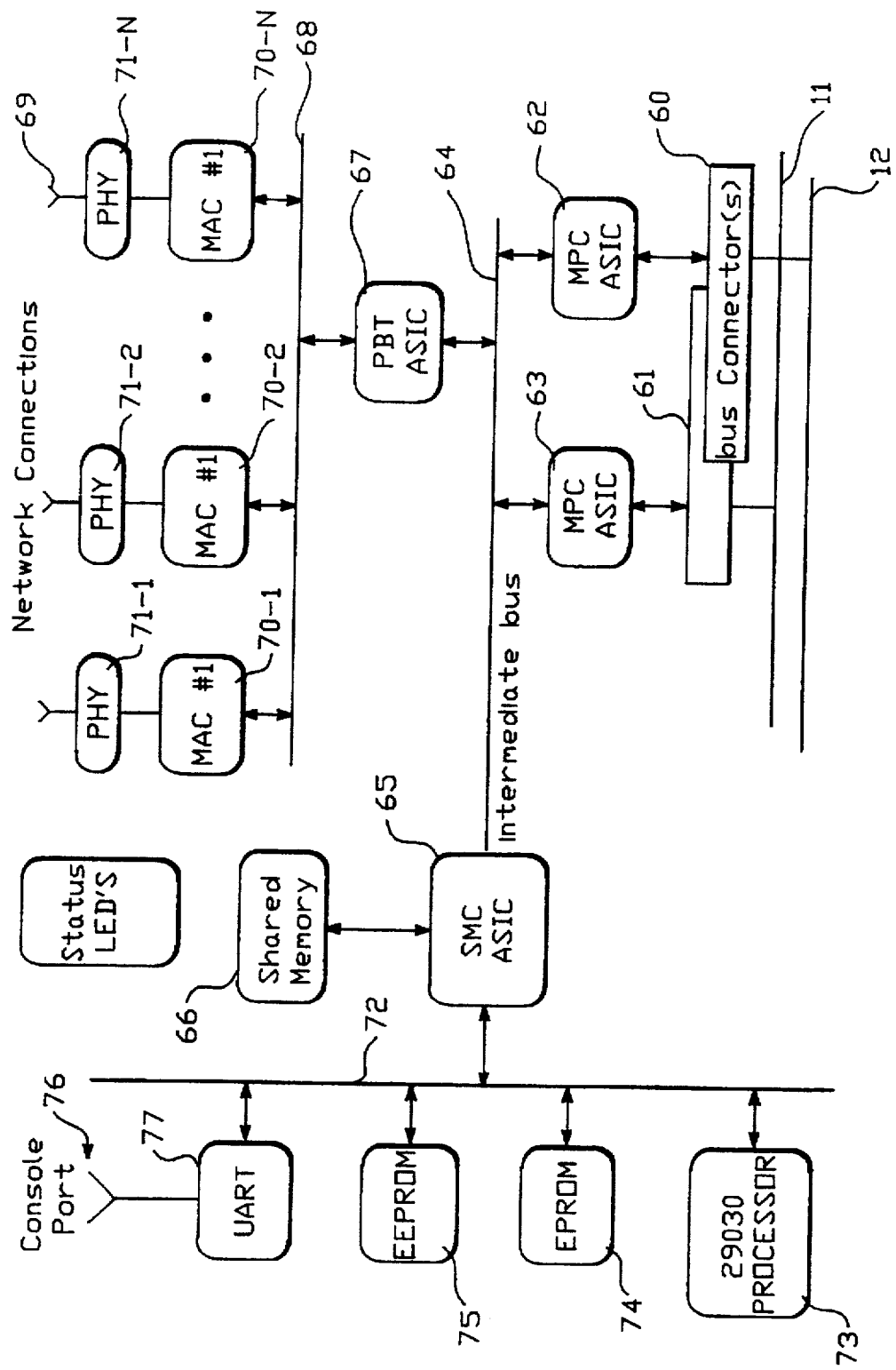
FIG. 4 provides a block diagram of an input/output module with an enhanced function processor (IOP) such as used in the system of FIG. 1.

FIG. 4 illustrates the block diagram of the higher performance input/output processor IOP of FIG. 1. This system is coupled to the first bus 11 and the second bus 12 through respective bus connectors 60 and 61. The bus connectors 60 and 61 are coupled to message passing controller ASICs 62 and 63, respectively, which are, in turn, connected to an intermediate bus 64. The intermediate bus (also called internal bus herein) is coupled to a shared memory controller 65 which controls access to a shared memory resource 66. The intermediate bus 64 is coupled through a peripheral bus interface 67 to a network data bus 68. On the network data bus, there are a plurality of network connections, generally 69, made through respective MAC devices 70-1 through 70-N and physical interfaces 71-1 through 71-N. The shared memory controller 65 is also coupled to a control bus 72, which is connected to a high speed processor 73, flash programmable read only memory 74 storing programs, nonvolatile EEPROM memory 75 storing parameters and static code, and a console port 76 through a UART interface 77.

Figure 5:
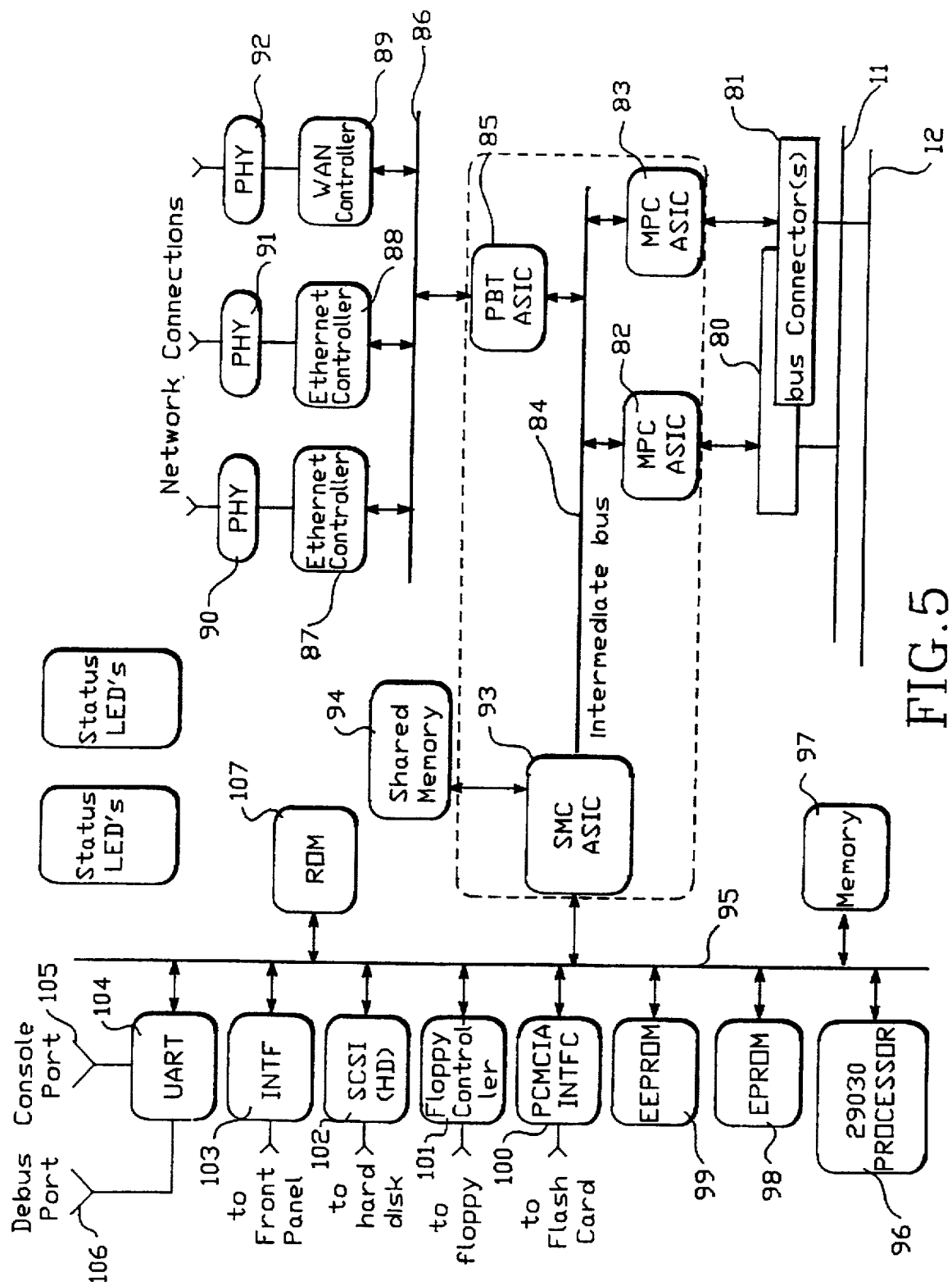
FIG. 5 provides a block diagram of the central internetworking processor (COX) used for providing a shared resource for the other processors coupled to the buses in the system of FIG. 1.

The central control box is illustrated in FIG. 5. This box is basically similar to the box of FIG. 4. Thus, the box includes a first bus connector 80 and a second bus connector 81 for the first and second buses, respectively. Message passing controllers 82 and 83 are coupled to the bus connectors 80 and 81, and to an intermediate bus 84. A peripheral bus transfer ASIC 85 is connected between the intermediate bus and a peripheral bus 86. An Ethernet controller 87, an Ethernet controller 88, and a wide area network (WAN) controller 89 are coupled to the peripheral bus 86 and to the respective networks through physical connections 90, 91, and 92.

The intermediate bus 84 is also connected to a shared memory controller 93, and through the shared memory controller 93 to a shared memory resource 94. A second shared memory resource may also be connected directly to the MPC ASIC 82 or 83. The shared memory controller 93 is also connected to a processor bus 95 which interconnects a processor 96, working memory 97 for the processor, flash memory 98 for processor code, EEPROM memory 99 for static code and parameters, a PCMCIA interface 100 for accepting flash memory cards for upgrade purposes and the like, a floppy disk controller 101 for driving a floppy disk, an SCSI interface for connection to a hard disk 102, an interface 103 for connection to a front panel providing a user interface, and a dual UART device 104 which provides for connection to a console 105 and a debug port 106. In addition, read only memory 107 may be connected to the processor bus 95. The native PCMCIA interface is provided for enabling a redundant reliable boot mechanism.

The software processing for a high performance router breaks fairly cleanly into two major pieces: the data forwarding functions and the control/management functions. The data forwarding functions include device drivers and link-layer protocols such as HDLC-LAPD in addition to the per-packet processing involved with recognizing, validating, updating, and routing packets between physical interfaces. The control and management software functions include routing protocols and network control protocols in addition to all configuration and management functions.

In general, the data forwarding functions are optimized for maximum performance with near real-time constraints, whereas the control and management functions simply run to completion on a time available basis, with some exceptions. When system performance is measured, it is primarily the forwarding capacity of the router in terms of bandwidth, packets-per-second, and fan-out that is considered, with an implicit assumption that the control and management functions will be sufficient. The control and management software comprises the vast majority of the code and can use large amounts of data space, but most of the data space consumed by these functions need not be shared with the forwarding software.

In the system of FIG. 1, the forwarding function is replicated in distributed protocol modules in the semi-intelligent and full function processors IOS and IOP, with distributed protocol module servers along with the full function routing and other centralized functions running on the single central processor COX. Thus, the forwarding functions where possible run on processors near the physical interfaces, and mechanisms, including hardware supported message passing, tie the distributed processing modules to each other and to the central control functions. This architecture allows some forwarding functions to be distributed, while others are centralized on the central control box. The message passing architecture enables significant flexibility in the management of the location of software in the router architecture. Further, backward compatibility and system scalability are preserved.

II. MESSAGE PASSING STRUCTURES AND PROCESSOR

Figure 6:
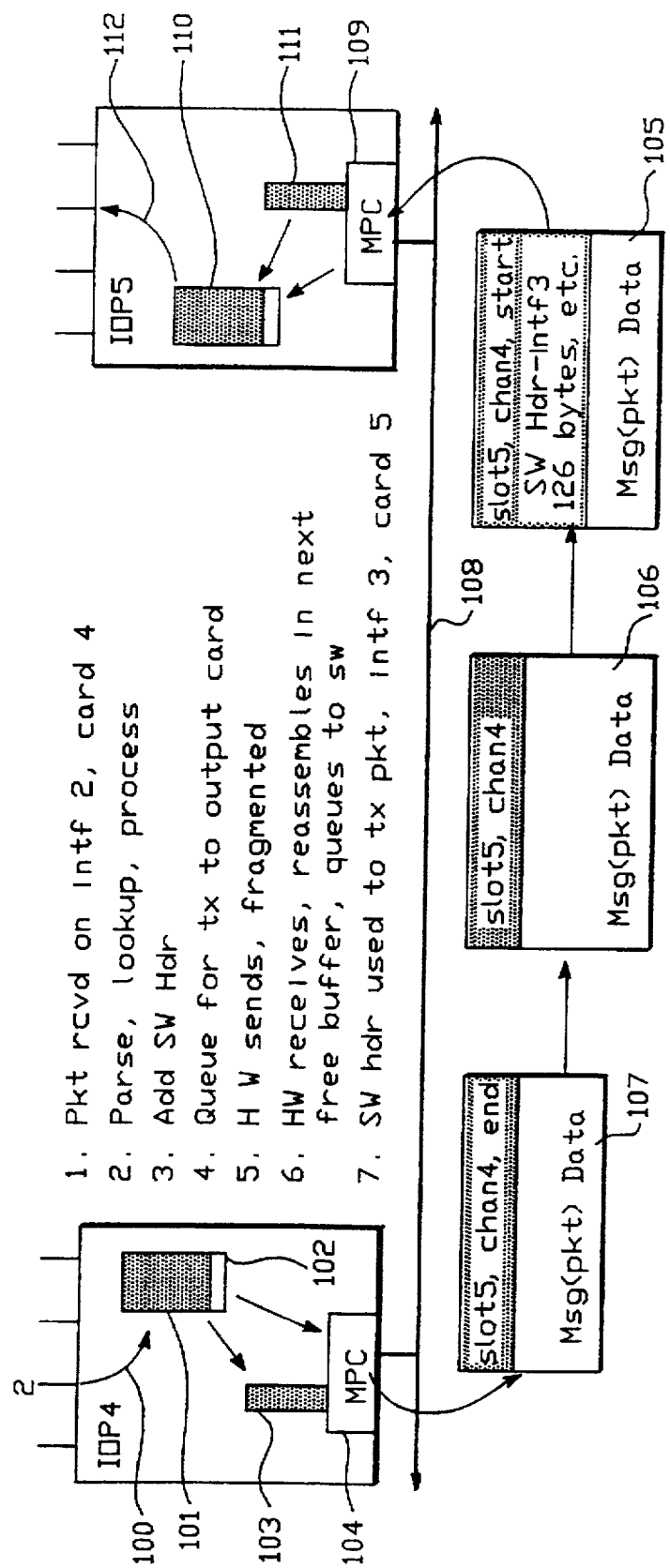
FIG. 6 is a heuristic diagram providing an example of message transmission for the system of FIG. 1.

The basic message passing technique is illustrated with respect to FIG. 6. In FIG. 6, the process of receiving a packet on interface 2 on card 4 is illustrated. Thus, the packet is received and proceeds along arrow 100 into a buffer 101 in the card. While it is in the buffer, the processor parses the packet, looks up the destination for the packet, and processes it according to the routing code. Next, a software header 102 is added to the packet. Then, the packet is added to a queue 103 for message transmission. The hardware 104 in the card sends the message in a fragmented state, which includes a first message packet 105 which has a start identifier, a channel identifier, and a destination slot identifier (in this case, slot 5, channel 3). The first packet includes the software header which identifies the destination interface as interface 3 in processor 5, the length of the packet, etc. Packet 105 includes the first part of the packet data. The next fragment of the message 106 includes a header indicating the destination slot and its channel as well as packet data. The final packet 107 includes the destination and its channel, and an indicator that it is the last packet or "end" in the message. Finally, this last packet is filled with the balance of the message data. These three fragments of the message are transferred across the high speed bus 108 to the destination slot 5. In slot 5, the hardware 109 receives the packet, reassembles it in the next free buffer 1 10, and queues the message to software in the queue 111. The software and hardware in the IOP at slot 5 transmit the packet out interface 3 in card 5 across the arrow 112.

This message passing protocol is a "push" paradigm, which has the effect of using the bus more like a LAN than a normal memory bus. This has several important features:

Receiver allocates/manages buffering independent of transmitter.

Single "address" used for all data sent in one message.

Bus addressing is per-card, port-level addressing in software header.

Bus used in write-only mode.

No shared memory usage.

Reliability not guaranteed (must be supplied at a higher level, if needed).

Messages are sent as a stream of cells, interleaved with other message transmissions.

The paradigm provides the following benefits:

Improved protection/robustness.

Reduced driver overhead.

Reduced complexity, per-destination queues not required, etc.

Improved bus utilization (about 3× previous).

Bus is not monopolized by one device during a message transmission.

Other slots can interleave cells on the bus, so they do not have to wait for a long message from another slot.

In FIG. 6, IOP4 receives a packet, and sends it to IOP5. Note that the input card simply sends the message to the output card. The sender does not need to allocate buffers or get permission from the receiver. A hardware address specifies the slot that should receive the message. A software message header specifies the message type (control, data, etc.), its actual length, output port number, etc. The output card is responsible for dropping messages if there is too much traffic.

Figure 7:
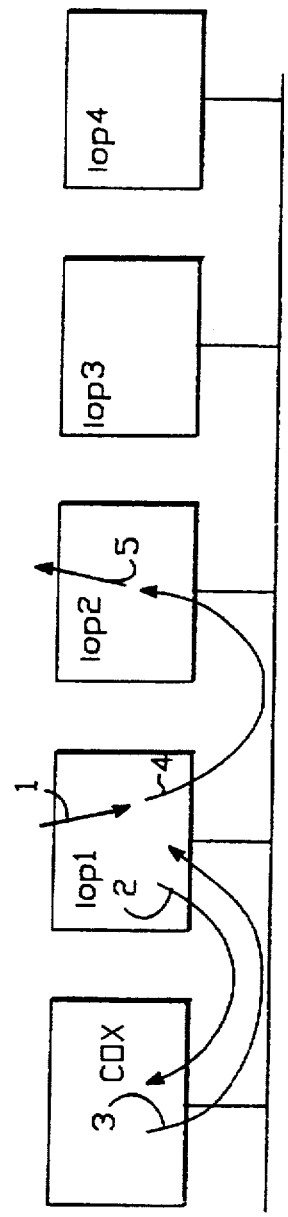
FIG. 7 illustrates message flow scenarios for a system such as that shown in FIG. 1.

FIG. 7 is an example of how messages will flow in the system of FIG. 1 in order to forward a packet. In this example, the path that a packet follows to a destination unknown by the receiver card IOP1 is shown.

Packet enters from network attached to IOP1 (transition 1). The local processor looks up the destination (whether it be bridged, or routed by various protocols), and finds it does not know what to do with this packet. It generates a high priority cache lookup request and sends it to the COX. The COX looks up the destination network in its database, and sends back the answer to IOP1(3). IOP1 adds the destination to its cache, and finds the held packet. It then directly forwards it to IOP2(4) as a message complete with instructions on what to do with the packet. IOP2 examines the message header and determines it should transmit the packet out port X(5). IOP2 DID NOT examine the actual packet in any way. It simply looked at a simple message header, and decoded the command to transmit the enclosed packet to port X.

If the packet originated from an IOM, then the IOM puts the packet in COX memory. The COX does the same functions as outlined above, for the IOM based packet. Packets destined for an IOM are sent to the COX which queues them for transmission. In other words, existing IOMs are just ports on the COX as far as the message passing paradigm goes.

Also notice that if IOP1 has the destination already stored in the local cache (normal case), then messages 2 and 3 are eliminated. In either case the packet data only travels across the bus once.

This system uses a layered architecture for communication between processors, with a common set of message passing services supporting both control and data paths. It utilizes the bus for the physical layer and either shared-memory DMA-based software or hardware-supported card-to-card transmissions to provide required services for various classes of messages. The three major classes of message are:

Internal control messages: low latency (<10 ms), high reliability, low throughput.

Network control messages: medium latency (<250 ms), high reliability, low throughput.

Normal data packets: average (best effort) latency, average (best effort) reliability, high throughput.

Note that the system is designed to require only loose synchronization between processors. There are no critical real-time constraints on any control messages between processors that would cause the system to break if they were not met. All inter-processor control functions must tolerate lost messages. Some data loss will be acceptable. For instance, a route cache update or a port down message could be lost, as long as the system continues to run smoothly.

Figure 8:
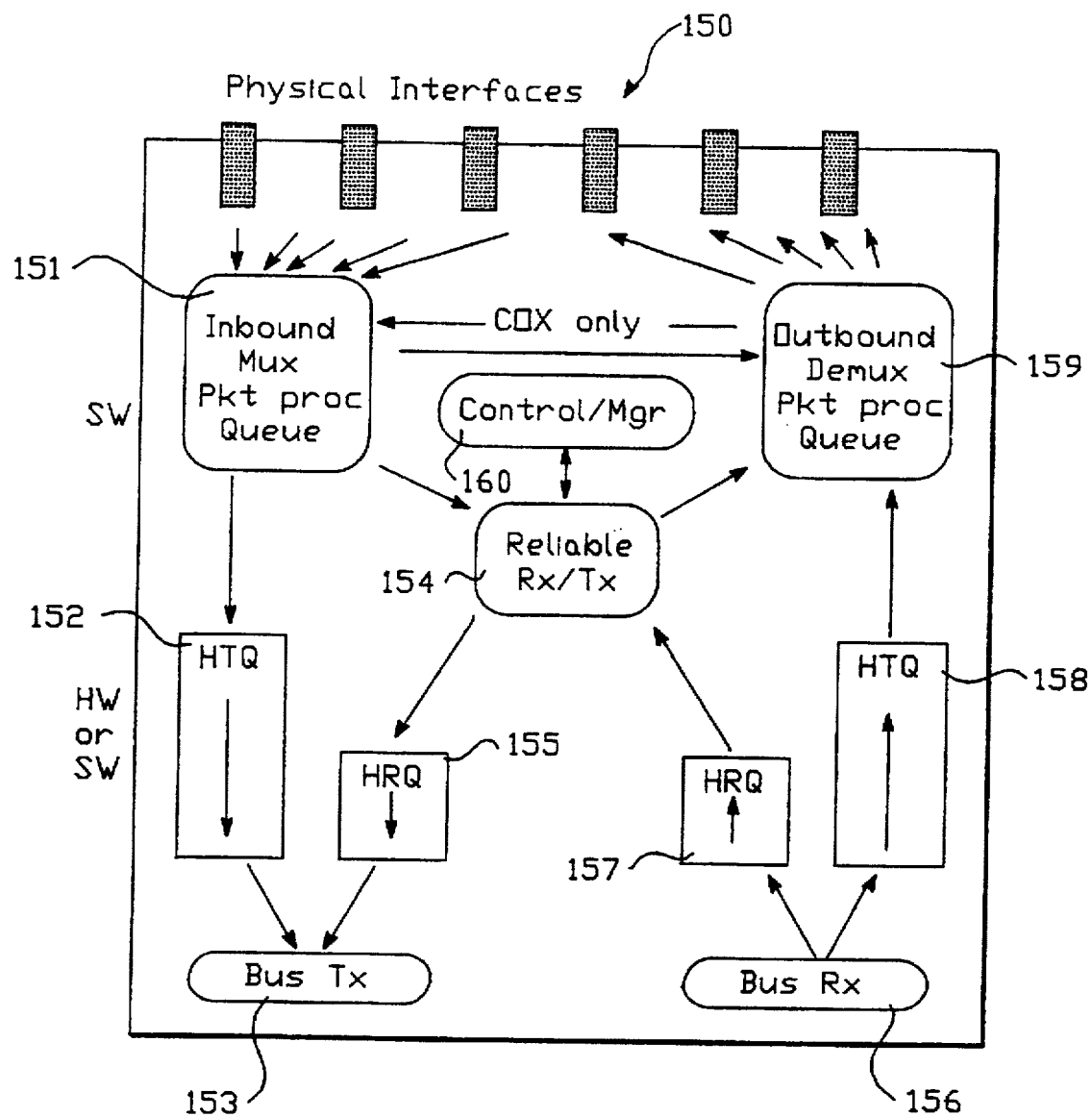
FIG. 8 provides a diagram of the dual queue structure and message paths for the bus interfaces in the system of FIG. 1.

At the lowest layer above the actual data movement function is a dual-queue structure, as illustrated in FIG. 8, which supports these message classes according to their primary service requirements. These queues may be supported in software, in hardware, or in a combination of the two. One queue is designed to provide high reliability and low latency with relatively low throughput, and is used for the first two classes of messages—internal and network control messages. The second queue is optimized for high throughput and supports the majority of the data traffic.

Both control messages and data packets are encapsulated with a standard header which conveys the message type, destination addressing (output port, control interface, etc.), and other control information associated with the message. For internal control messages this additional information might include sequence numbers, event handles, etc., while data packets might have MAC encapsulation type, transmission priority, etc.

FIG. 8 illustrates the basic dual queue structure used in the messaging paths. In this structure, the card will include a plurality of physical interfaces, generally 150. Inbound data from the physical interfaces is placed in an inbound multiplexing packet processing queue 151, generally implemented by software. This packet processing queue does the basic data transport processes as described above. From this queue 151, the packets are transferred to a high throughput queue 152 implemented at either hardware or software. From the high throughput queue, packets are transferred out onto the bus transmission path 153. Alternatively, communications which must be reliable are passed through a reliable receive and transmit block 154 where they are tagged for preferential handling at the receive end, and manually passed to a high priority, low latency queue (HRQ 155)out through the bus transmit function 153. Similarly, data received from a bus receive path 156 is passed either through a high reliability queue 157 or a high throughput queue 158. The high reliability queue is passed to the reliable receive and transmit block 154 into the outbound demultiplexing packet processing queue 159. Alternatively, control and management functions 160 receive data through the reliable path. The outbound software queue 159 sends appropriate packets to the physical interfaces 150. There may also be a path between the inbound and outbound software queues 151 and 159.

As illustrated in the figure, preferably the lower level queues 152, 155, 157, and 158 are implemented in the hardware assisted environment while the higher level queues 151 and 159 are software executed by a local processor on the board. However, in the central processor unit, the lower level queues may be implemented in software which serves the IOM blocks described above with respect to FIG. 2, and interface processors may be implemented in the particular application with these queues in software.

FIG. 9 provides a table of the various data transfers supported by the system of the preferred embodiment. The table indicates the transfer type across the top row, including a message transmit, a shared memory write, a shared memory access read, a shared memory read, a memory move, a cell transmit, a message receive, a bus input/output and bus memory write, a bus read, and a promiscuous receive transfer. The table summarizes the source of the source address, the source of the destination address, the direction of the transfer, the origin of the cycle, the receive activity, the data buffering, and the alignment and packing functions for each of the different transfers.

Thus, the system includes a number of hardware and software system buffer structures and control and management modules. Generally, data fragments are gathered and byte-wise aligned to form cells which move across the bus. At the receiving end, cells may be placed into a receive buffer as allocated by the receiving processor.

The basic structures include a command list, a free list, and a receive list.

The command list is a managed string of four word entries through which software instructs hardware to perform certain data transfers, generally across the bus. The blocks of memory to be moved may be thought of as buffers, or as data fragments. There is no hardware requirement for these chunks of data to be aligned or sized in any specific way. Implicit in the source and destination address along with the command list entries control field is the type of data transfer. The command list is built in synchronous dynamic RAM (SDRAM) and may be FIFOed (or cached) within the message passing controller hardware. Software writes entries into the command list, while hardware reads and executes those commands. The command list is managed via command head and command tail pointers.

The free list is a series of single word entries pointing to available or "free" receive buffers which may be allocated by hardware for buffering inbound bus data. The free list is maintained in SDRAM and may be FIFOed or cached within the message passing controller hardware. Software places free receive buffers into the free list so that hardware may then allocate a free buffer to a given receive channel, as required by incoming data. Once the buffer is actually filled, hardware places the buffer pointer into one of two receive lists. Only software writes entries to the free list, and those entries are known to be valid by the contents of the software based free tail pointer. Hardware may read entries from the list, and the only indication of what has been read is the value of the hardware-owned free head pointer.

The receive list is a series of two word entries pointing to full receive buffers which need the attention of software. The list itself is SDRAM resident and the list entries point to receive buffers which also reside in SDRAM. In addition to the physical address of the filled buffer, the receive list entry includes a flag and count field.

Figure 10A:
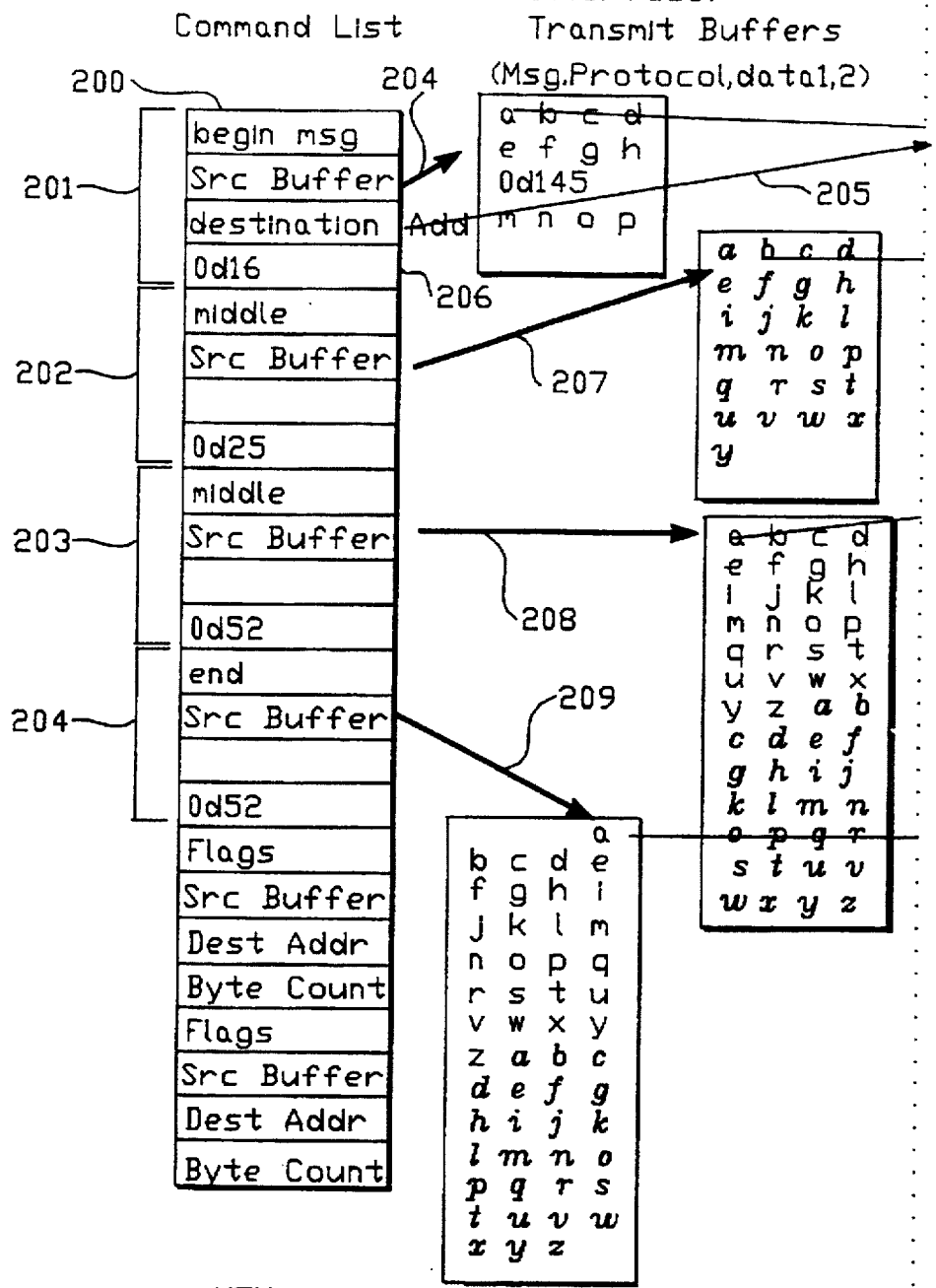
FIG. 10 illustrates the data alignment and packing for messages transferred on the bus.
Figure 10B:
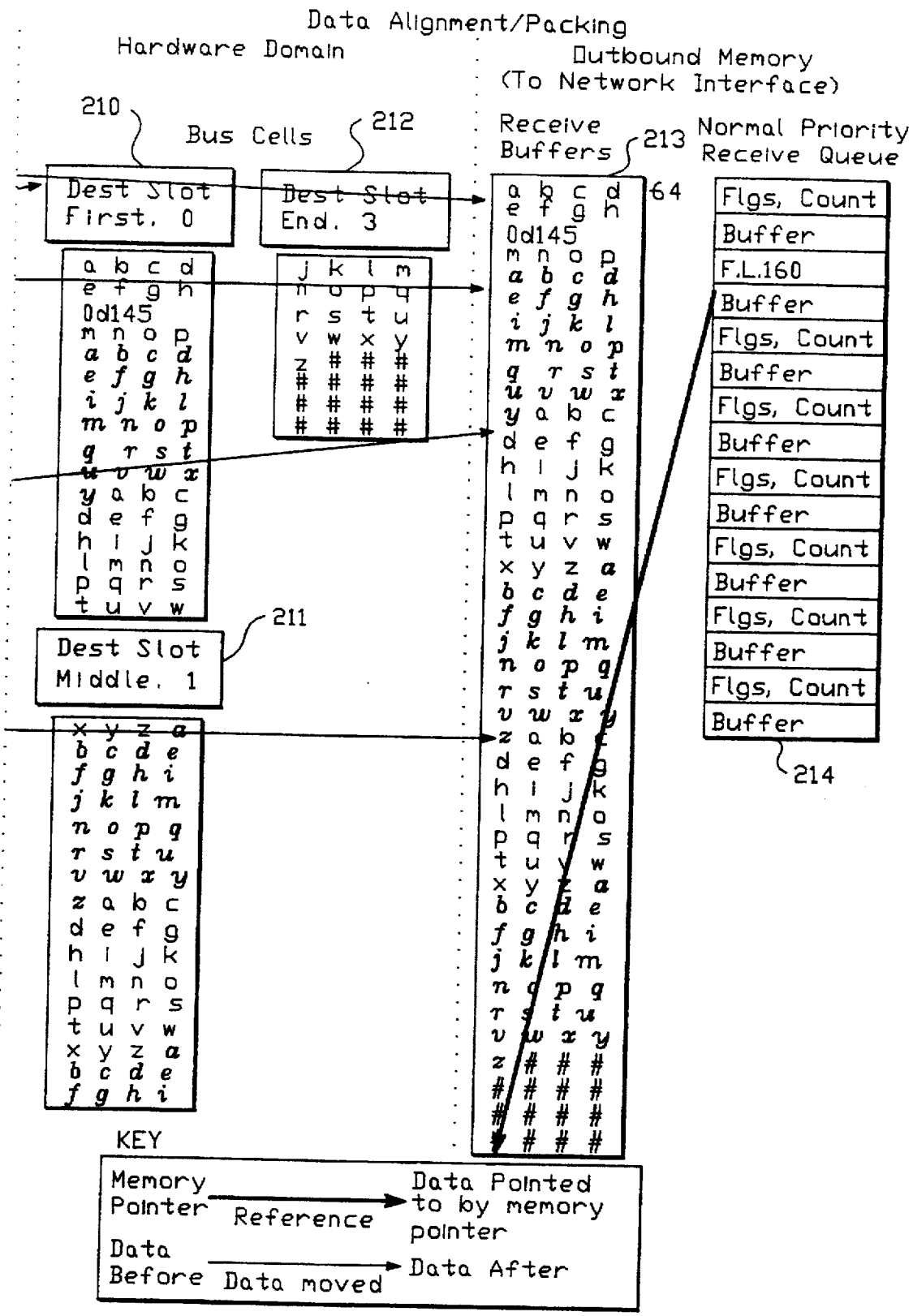

FIG. 10 shows the data flow beginning with a command list and eventually showing up on a normal priority receive list.

As can be seen in FIG. 10, a command list 200 includes a sequence of four word entries. For example, the four entries 201, 202, 203, and 204 characterize a transfer from a network interface in one processor across the bus to a network interface in a different processor. The first entry is recognized as the beginning of a message, includes a pointer 204 to a source buffer, a destination address 205 indicating the destination slot (and bus if plural busses are used) of the message, and a data length field 206. The next entry 202 includes flag indicating that it is a middle fragment, a pointer 207 to a source buffer, and a data length field. The third entry in the list 203 includes a control parameter indicating that it is a middle fragment, a pointer 208 to a source buffer, and a data length field. The final entry 204 includes a header indicating that it is the end of the message, a pointer 209 to the source buffer and a length field.

The transmit buffers pointed to by the pointers 204, 207, 208, and 209 contain the data of the message. They are concatenated according to the protocol and data length information in the first buffer pointed to by the pointer 204. The message packing buffers are used to generate a first bus cell generally 210 which includes a destination slot address, an indicator that it is the first cell in a message, and a count. The first cell in this example includes the contents of the buffer from pointer 204, the buffer from pointer 207, and a portion of the buffer at pointer 208.

The balance of the buffer at pointer 208 and the first portion of the buffer at pointer 209 are combined into the second cell 211. The balance of the buffer at pointer 109 is placed into the last cell 212.

The outbound path in the receiving processor loads the incoming data into the receive buffers 213 and creates an entry in the normal priority receive queue for the receive buffer.

Figure 11:
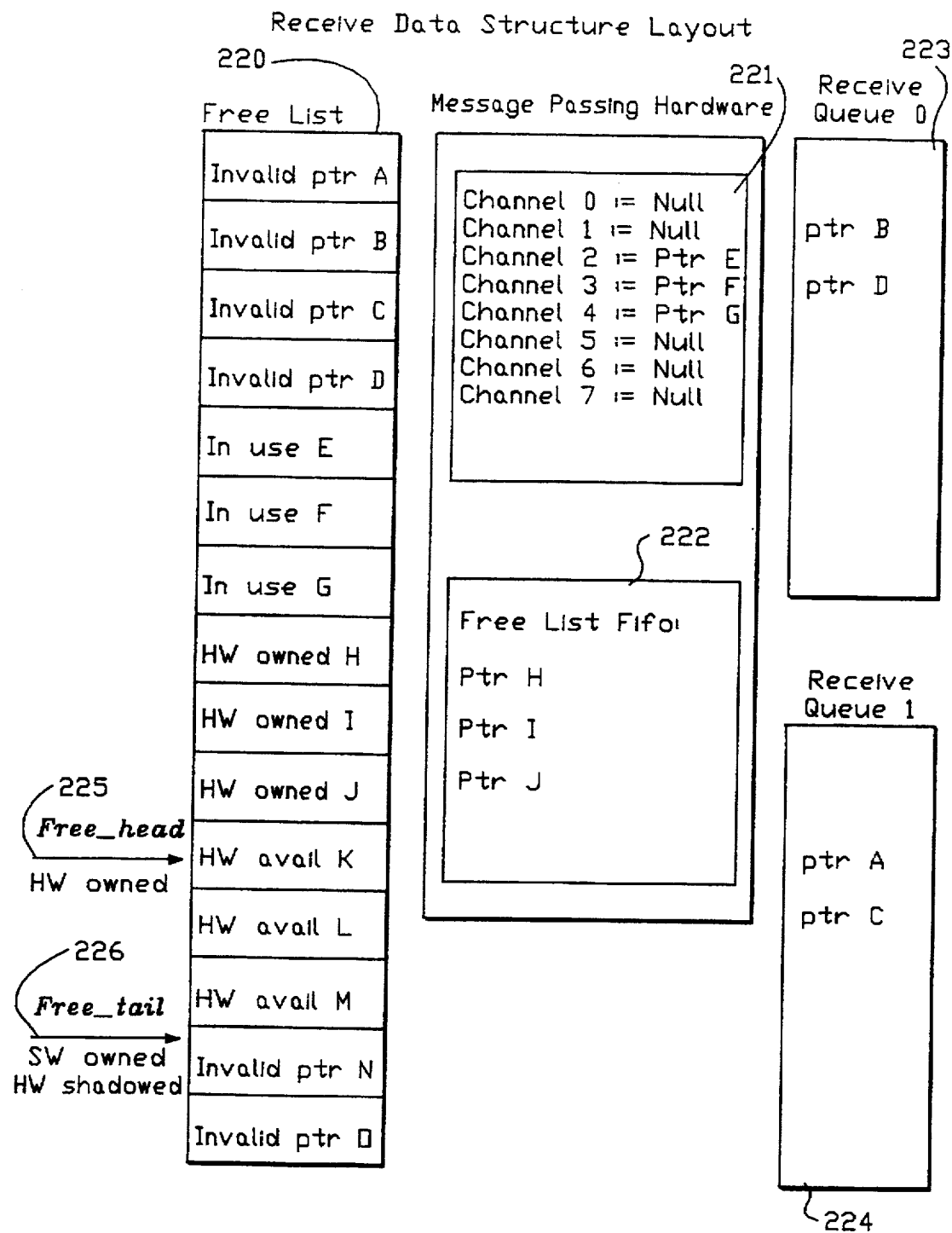
FIG. 11 illustrates the receive data structure layout for the bus interfaces.

The receive data structure is illustrated in FIG. 11. Basically, an incoming data stream is allocated to receive buffers using the free list 220, the channel status SRAM 221, the free list FIFO 222, and the high and low priority receive queues 223 and 224.

The hardware keeps state information for 32 receive channels. Each channel allows one message to be assembled into a cohesive message in memory. The channel keeps pointers to the next place to store the cell as well as a count and status information associated with the message. In one embodiment, receive channels are allocated to particular slots. Thus, slot zero on the bus will be given channel zero, for every processor on the bus; slot one will be given channel one; and so on.

The free list 220 is managed with a free head pointer 225 and a free tail pointer 226. Basically, buffers between the hardware owned free head pointer 225 and the software owned free tail pointer 226 are available for the hardware. Buffers pointed to by pointers above the free head pointer are either invalid because they contain data from previously received messages yet to be processed, are in use by a particular channel, or have been taken over by the hardware and loaded into the free list FIFO 222. In the example illustrated in FIG. 11, the invalid pointer N and invalid pointer 0 represent pointers to buffers which have been processed, and would be available for hardware when the free tail pointer is moved by the software.

Figure 12A:
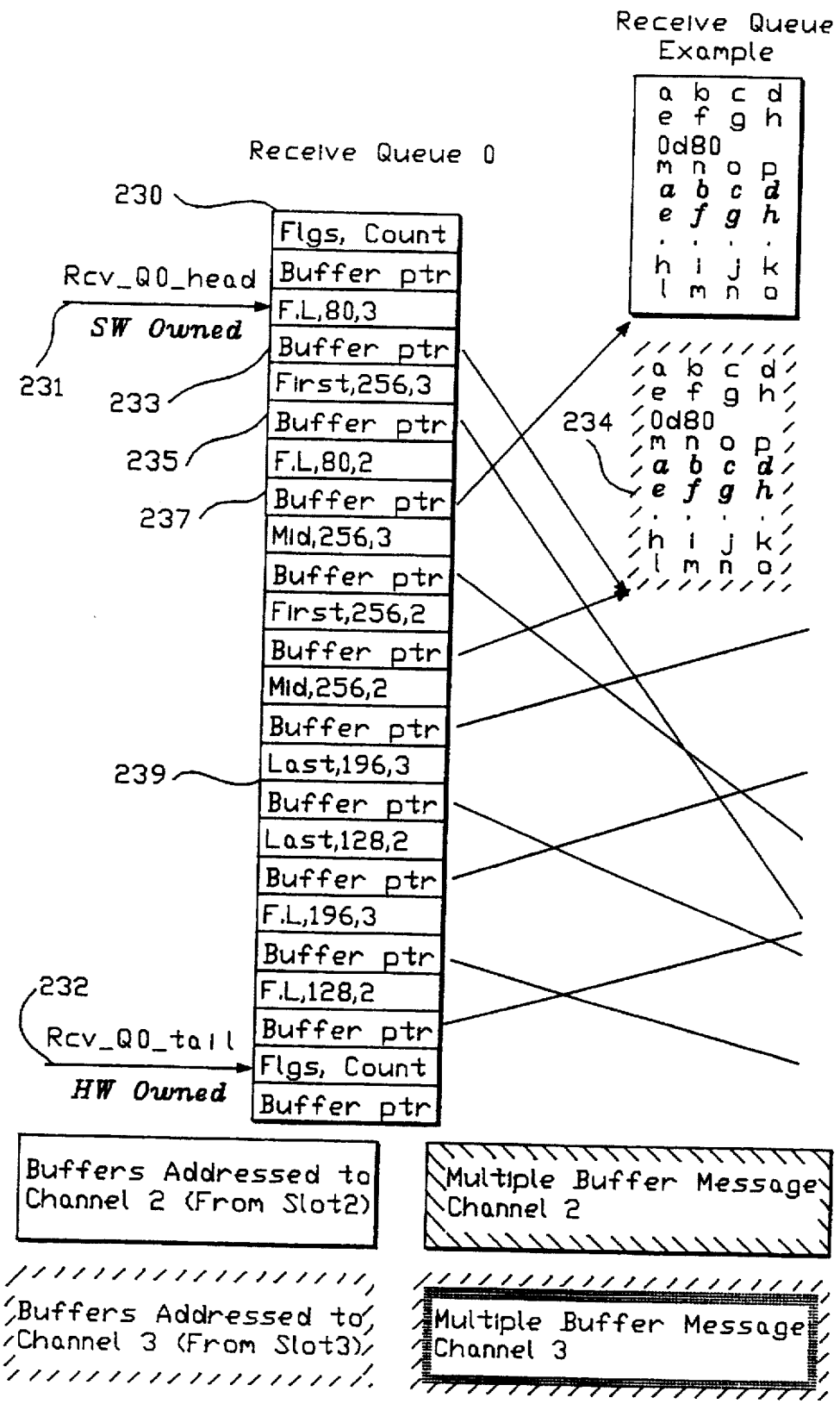
FIG. 12 provides a receive queue example for the bus interface according to the present invention.
Figure 12B:
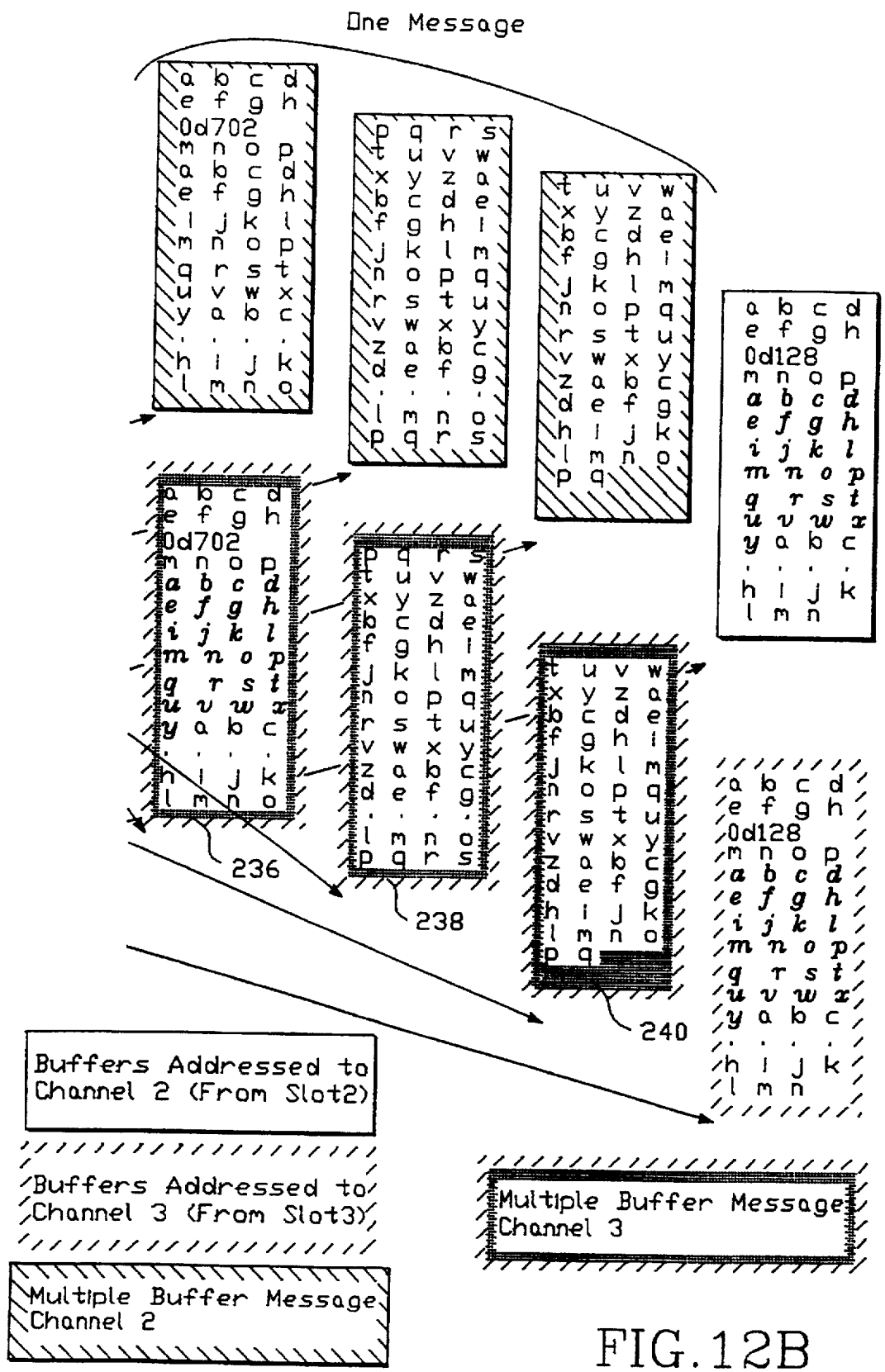

FIG. 12 provides a receive queue example. The receive queue 230 is managed using a receive queue head pointer 231 and a receive queue tail pointer 232. Each entry in the receive queue includes flags, count, and a buffer pointer for a specific buffer. Thus, those entries between the head 231 and the tail 232 contain pointers to buffers in use. Thus, an entry 233 includes a flag indicating that it is both the first and the last cell in a particular message, a length value, and a channel identifier. Entry 233 also includes a buffer pointer to the end of buffer 234. In an alternative embodiment, the buffer pointer points to the beginning of the buffer, as can be seen, this is a pointer to a buffer in channel three of length 80.

The next entry 235 is the first buffer in a 256 byte transfer in channel three with a pointer to buffer 236. The next buffer in this message is characterized by entry 237. It includes a pointer to buffer 237 and a parameter indicating that it is the middle transfer in the message. The last cell in this message is characterized by entry 239, which includes a pointer to buffer 240. The other examples shown in FIG. 12 include transfers that are characterized through a second channel, channel two, as described in the figure.

Hardware calculates the difference between the free head and the free tail pointers and uses that value to decide when to drop buffers in the receive queue to free up space to accept additional messages. This mechanism provides higher reliability to high reliability queue, and a lower reliability to high throughput transfer queue which are found in the receive list. Hardware will provide a number of watermarks that can be used to determine whether to accept new high throughput queue messages, or whether to drop them. The high throughput messages will be dropped so that the free list will not become depleted and high reliability queue messages can always be received. The source of the high reliability queue messages either has to have exclusive permission to send X number of frames, or get new permission occasionally through a handshake protocol, or the sender can rate limit requests to some number/second that the receiver must be configured to handle.

This mechanism will also be used to provide several levels of priority to provide some level of fairness among the high throughput traffic. The concept is to mark a small number of packets per second as high priority, and the rest as normal priority. The receive hardware will start dropping normal priority messages first, and this should guarantee that each slot can get data through, even in the case of another sender trying to hog the bandwidth.

Figure 13:
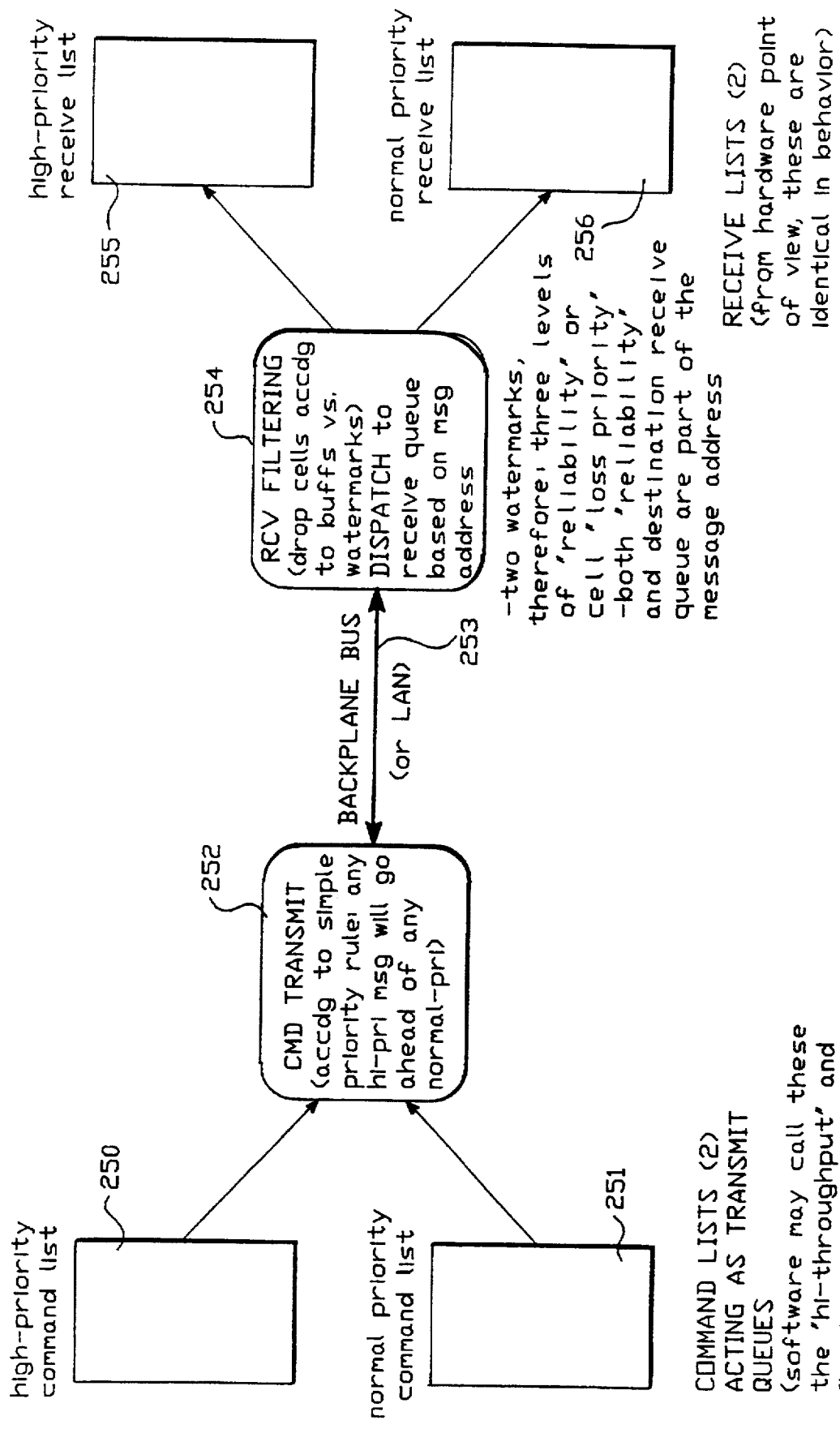
FIG. 13 illustrates the data flow from the high and normal priority command lists to the high and normal priority receive lists according to the present invention.

FIG. 13 illustrates the command list and receive list processes according to one embodiment of the present invention. As can be seen in the figure, the transmit side includes a high priority command list 250 and a normal priority command list 251. In the message passing process, a command transmit function 252 is included which is coupled with both the high priority command list 250 and the normal priority command list 251. This transmit function 252 transmits commands across the backplane bus 253, or other communication media such as a LAN, to a receive filtering process 254 at the receiving end of the message transfer. Receive filtering process 254 also includes dispatch logic which dispatches the messages to either a high priority receive list 255 or a normal priority receive list 256.

In operation, these functions are managed by software according to latency, throughput, and reliability of the messages being transmitted. For example, software may write commands for messages that require low latency into the high priority command list 250, while writing the majority of commands which require high throughput into the normal priority command list. According to this approach, the command transmit function 252 can select commands for transmission according to a simple priority rule: any high priority message goes ahead of any normal priority message. More complex priority schemes, including fairness concepts and avoiding lockouts could be utilized as suits a certain implementation. Messages transmitted across the backplane 253 are accepted by the receive filtering function 254. The filtering function drops the cells according to the available buffers as measured against watermarks based on reliability tags in the message header, and routes the received messages to either the high priority receive list 255 or the normal priority receive list 256, based on a control bit in the message header. For example, in a system with two receive buffer watermarks, there will be three levels of reliability (or cell loss priority) established. All those cells in a first class will be dropped if the number of available receive buffers falls below a first watermark. Messages in a second class will be dropped when the number of available buffers falls below a second watermark. Messages in the final class are dropped only if there are no receive buffers left to receive the message. Both the watermark class, which establishes the reliability of transfer, and the destination receive queue to which the message is dispatched, are specified in the message address, as control bits in a preferred embodiment. Thus, from the hardware point of view, the receive lists 255 and 256 are identical in behavior. Software manages the processing of messages listed in the high priority receive list and the normal priority receive list as desired in a particular implementation. For example, the software may process all high priority receive list messages first, so that so called low latency messages can achieve lowest latency available. High throughput messages will be routed into the normal priority receive list, and managed as quickly as possible by the receiving processor.

Figure 14:
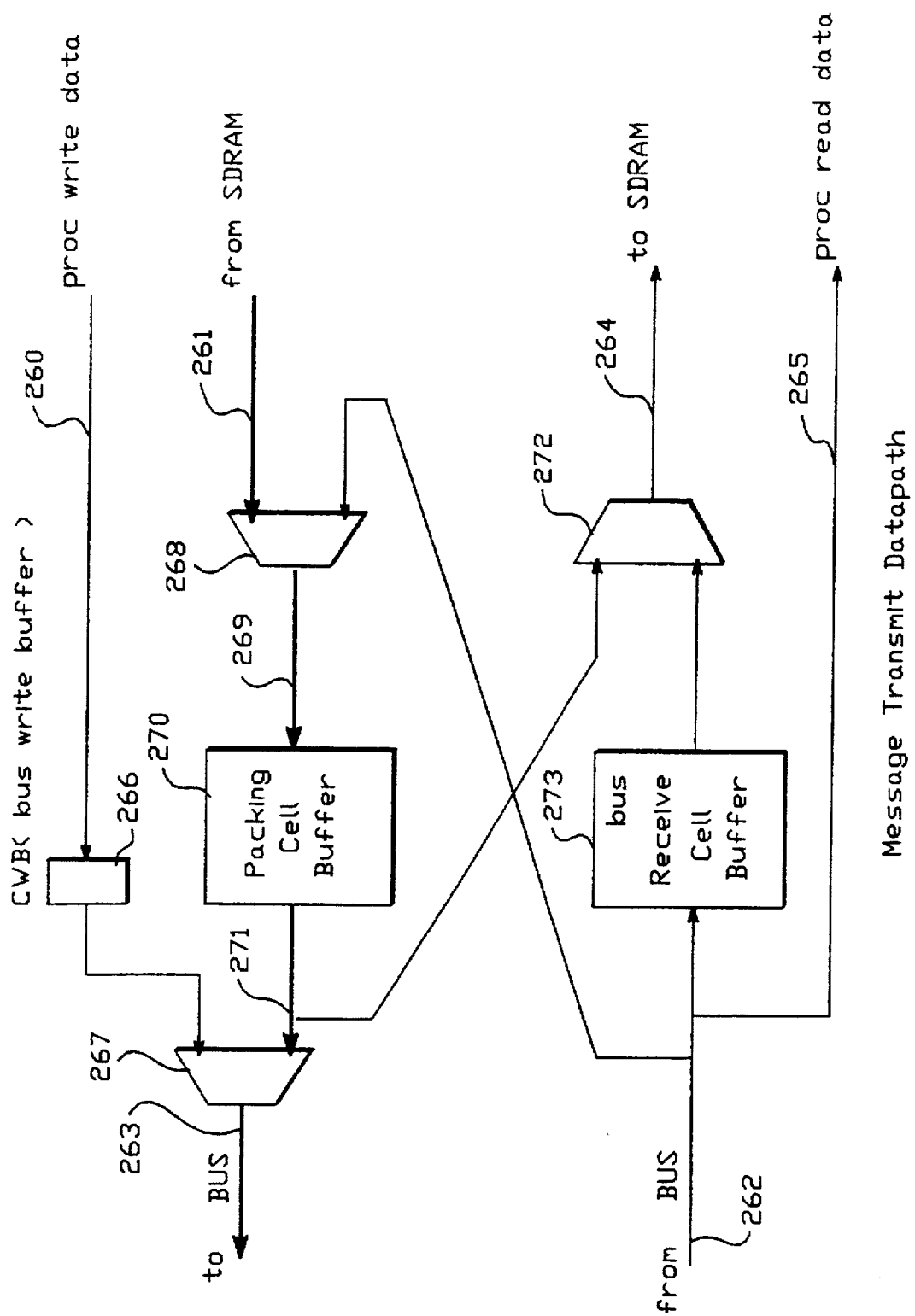
FIG. 14 illustrates the message transmit data path in the bus interface.
Figure 15:
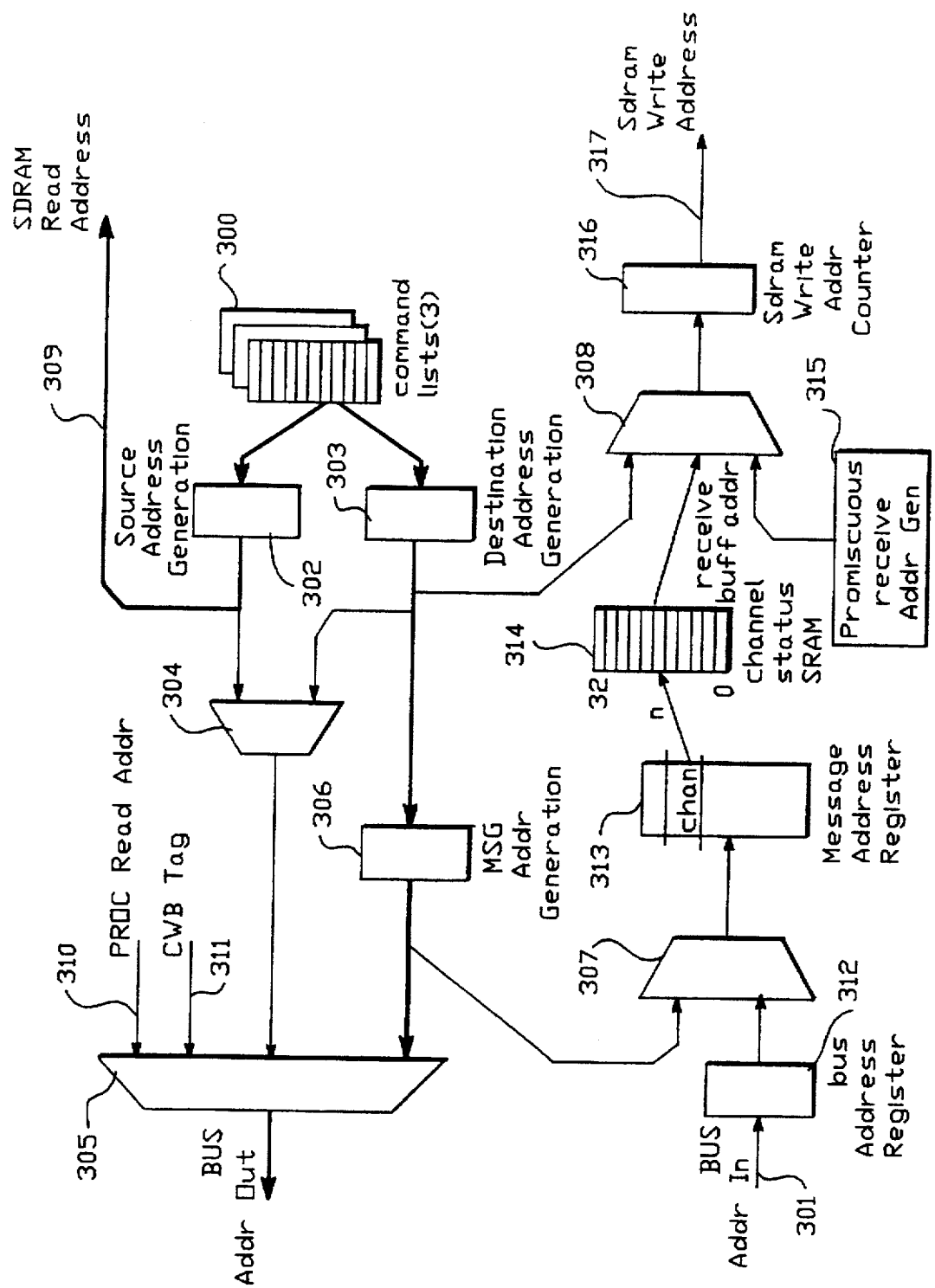
FIG. 15 illustrates the message transmit address path in the bus interface.

FIGS. 14 and 15 illustrate the data paths and address paths for message passing controller hardware. The message transmit data path is illustrated in FIG. 14. The possible sources of the data include a processor write data on line 260, data from the local synchronous DRAM (SDRAM) on line 261, and data from the bus on line 262. The path on line 260 which provides processor write path is not used in one embodiment of the invention. Data is directed to the bus on line 263, to the local synchronous DRAM on line 264, or to the local processor directly during a processor read operation on line 265. The processor write data is supplied through a bus write buffer 266 to an output multiplexer 267. Data from the SDRAM on line 261 is supplied through multiplexer 268 across line 269 to a packing cell buffer 270. The output of the packing cell buffer 270 is supplied on line 271 to the output multiplexer 267. It is also supplied in feedback to the inbound multiplexer 272.

Data from the bus on line 262 is supplied to a receive cell buffer 273, the output of which is supplied as a second multiplexer 272. Also, data from the bus is supplied as a second input to the multiplexer 268 which supplies input to the packing cell buffer 270. Further, data from the bus is supplied on line 265 directly to the processor read path.

As can be seen in the figure, the message transmit data path is sourced from the SDRAM on line 261, and selected through multiplexer 268 into the packing cell buffer 270. From the packing cell buffer 270, it is supplied through multiplexer 267 out onto the bus.

FIG. 15 illustrates the address path structures, and the message transmit address path. As can be seen, the addresses are generated in response to the command lists 300, and from the bus address in line 301. Addresses from the command list drive a source address generation block 302, and a destination address generation block 303. The output of the source address generation block is supplied through multiplexer 304 to the address out multiplexer 305. The output of the destination address generation block 303 is supplied through the message address generator 306 to the bus address output multiplexer 305, and to the multiplexer 307 in the inbound path. Also, the destination address generation output is supplied as a second input to multiplexer 304 in the output path, and as an input to multiplexer 308 in the input path. The source address generation block also sources the synchronous DRAM read address line 309.

Other inputs to the multiplexer 305 include a processor read address directly from the local processor on line 310, and a tag address on line 311.

The bus address register 312 is driven by the address in on line 301. The output of the register 312 is supplied through multiplexer 307 to the message address register 313. This address register identifies the channel for the message which is used to access the channel status RAM 314. The channel status RAM supplies a receive buffer address as an input to multiplexer 308. The mechanism also includes a promiscuous receive address generator 315 which supplies a third input to the multiplexer 308. The output of the multiplexer 308 is the synchronous DRAM write address counter 316, which drives the synchronous DRAM write address on line 317.

As can be seen, the message transmit address path originates with the command list 300. The command list drives the source address generation block 302 to supply a synchronous DRAM read address on line 309. Also, the command list drives the destination address generation block 303 to supply a message address generator 306. This basically supplies the slot number and channel number for the message to be supplied on the output bus.

Hardware initiates message transmit from a command list maintained in SDRAM. The message may consist of multiple fragments stored in SDRAM memory which are then packed into double-buffered outbound cells. The bus transfer address is really a message control field containing such things as a field identifying the cell as part of a message, the destination slot and logic channel, first and last cell control bits, and the cell sequence number within the message.

To transmit a message fragment:
read command list entry, decode as outbound msg fragment (for addr generation).
recognize first, middle, last fragment of a message (for outbound buffer control purposes).
request SDRAM read access (and check packing cell buffer availability).
wait for granting of SDRAM resource.
if buffer available, begin transferring data bytes/words from SDRAM to cell buffer.
continue to move data to cell buffers (with data flow control).
maintain cell buffer byte count and buffer status to implement flow control.
pack and align data within cells.
generate message address for bus (including first, last, sequence information).
generate bus transfer byte count field (depends on size of buffer flush).
queue cell for flush (i.e., bus transmit).
arbitrate for bus interface resource (other functions may request bus transfer).
wait until bus interface granted.
arbitrate for ownership of bus.
move data words from cell buffer to bus interface (with flow control).
generate or check outbound data parity.
complete burst write on bus.
log cell transmit status (success/fail).
free cell buffer for more outbound data.
move more data from SDRAM into cell buffer.
continue this process until fragment move is complete.
update command list pointer (indicates transfer complete).
To transfer a complete message:
process multiple fragments from command list as detailed above (a message may be a single fragment).
pack fragments into continuous cells without gaps.
flush partial cell buffer when message ends.
notification of message sent.

Figure 16:
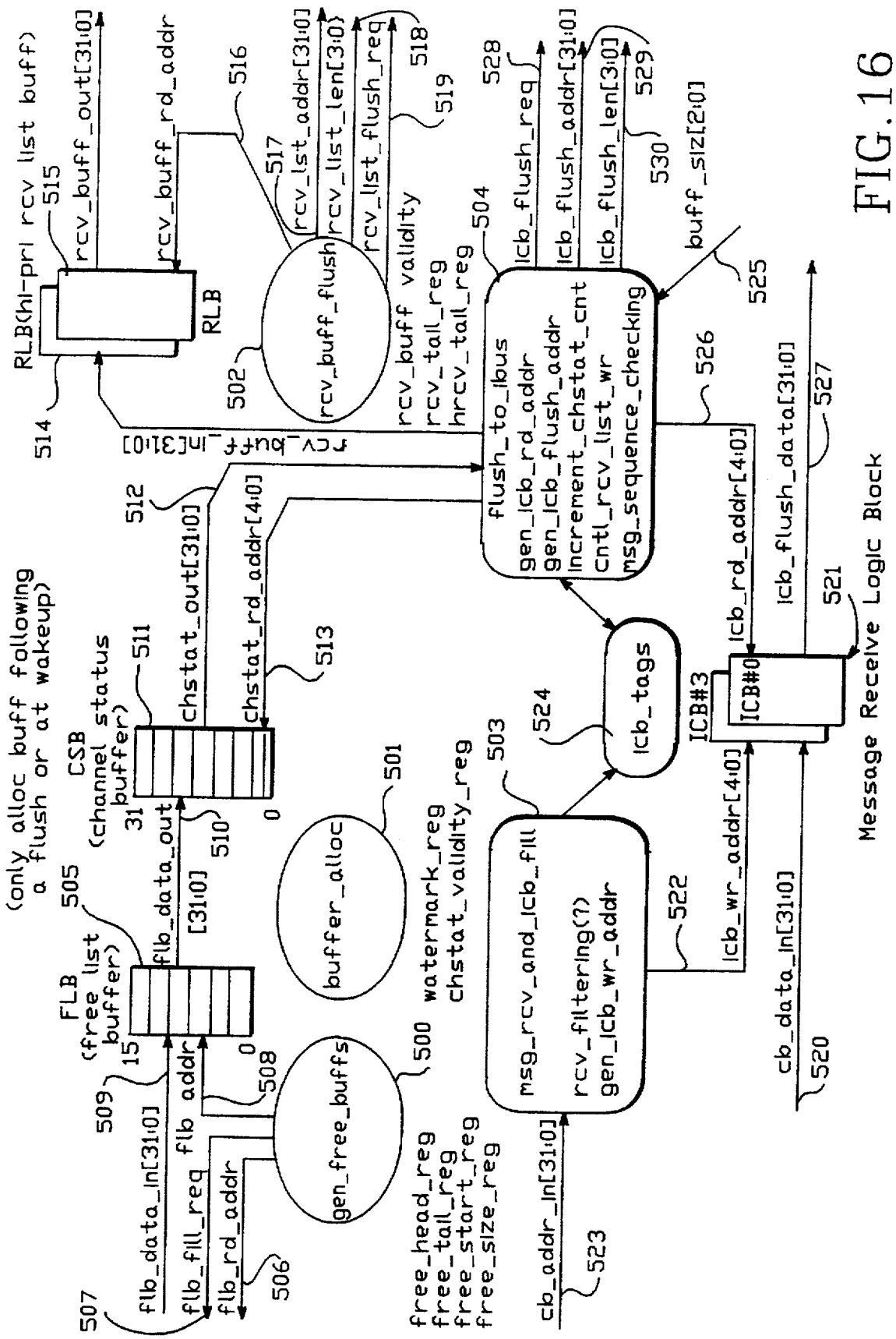
FIG. 16 illustrates the message receive logic in the message passing controller.

FIG. 16 shows the structure of the Message Receive Logic Block 410 of FIG. 35. Any data transfer bound for SDRAM moves through this logic. Message and non-message transfers are treated differently: cells which are part of a message transfer are moved into the SDRAM receive buffer structure, while non-message cells do not move into receive buffers—they are written to a specific physical SDRAM address.

Quite a bit of the logic in this section is associated with management of the receive buffers and bus logical receive channels.

The major functional blocks are summarized as follows:
get_free_buffs 500
Maintain status of the double-buffered free list buffer FLB. Post ibus read requests and manage movement of data into the FLB from IBUS. Contains free_head_reg, free_tail_reg, free_start_reg, and free_size_reg registers.
buffer_alloc 501
Allocate buffers from the FLB to logical receive channels. Read the next sequential FLB entry and write it into the channel status buffer CSB along with a zero count field. Maintain the Channel Status validity register. This module is necessarily quite intimate with an icb_flush module 504 which needs to mark CSB entries invalid as they are flushed to receive buffers and which needs to check for a valid channel status entry before flushing an ICB message cell to SDRAM.
rcv_buff_flush 502
Manages the queuing and flushing of completed receive buffers onto the two receive lists maintained in SDRAM. Buffers and status are moved into the rcv and hrcv list buffers (RLB and HLB) by the flush_to_ibus function. Then, the rcv_buff_flush function manages posting requests to the ibus and the associated flushing of the RLB and HLB.
msg_rcv_and_icb_fill 503
Moves data from bus into the ICBs. Writes the ICB tags. Performs receive filtering (perhaps).
flush_to_ibus 504
Reads ICB tags and performs ICB flush to IBUS. Updates CSB cell count field and determines when an entry moves from the CSB to the RLB or HLB. Writes RLB entries based on CSB and ICB tags. Checks cell sequence and maintains channel status—may drop ICBs and report error conditions.
gen_icb_flush_addr (within flush_to_ibus 504)
This function takes the bus channel status RAM contents and conditions them to create an ibus address for flushing one of the ICBs. At the same time, the cell count associated with the logical bus receive channel is incremented for write back into the channel status RAM or into the rcv_list buffer RAM. Some registering logic may be required in this path, since the CSB is being modified as the flush occurs.

The get_free_bufs block 500 generates addresses and requests for management of the free list buffer 505. Thus, outputs of the block 500 include the free list buffer read address on line 506, the free list buffer fill request on line 507, and the free list buffer addresses on line 508. In response to requests from the get_free_bufs block 500, the free list buffer data is supplied from the intermediate bus on line 509 to the free list buffer 505. Data from the free list buffer is supplied on line 510 to the channel status buffer 511. This process is managed by the buffer allocation block 501, which maintains the watermark registers and the channel status validity registers. The channel status buffer outputs are supplied on line 512 to the flush_to_ibus block 504. Also, addresses from the flush_to_ibus block 504 are supplied on line 513 to the channel status buffer for accesses to it.

The rcv_buff_flush block 502 manages the high priority receive buffer 514 and the normal priority receive buffer 515. This block manages the receive buffer validity, and the tail registers for the receive buffers. Outputs of this block include receive buffer addresses on line 516, the receive list addresses on line 517, receive list length value on line 518, and a receive list flush request on line 519.

The incoming data path from the system bus is driven across line 520 to the incoming cell buffers generally 521. Write addresses for the incoming cell buses are supplied on line 522 from the msg_rcv_and_icb_fill block 503. Block 503 receives the addresses from the system bus on line 523 and generates the incoming cell buffer addresses on line 522. Also, the block 503 manages the incoming cell buffer tags 524.

Data from the incoming cell buffers are flushed to the internal bus under control of the flush_to_ibus block 504. This block receives the channel status on line 512 and buffer size information on line 525. It generates the read addresses for the incoming cell buffers on line 526 and causes a flush of data on line 527 to the local SDRAM. This block also generates the incoming cell buffer flush request on line 528, the flush address on line 529, an the flush length value on line using two control signals 530 for management of the flush to the local memory.

Figure 17:
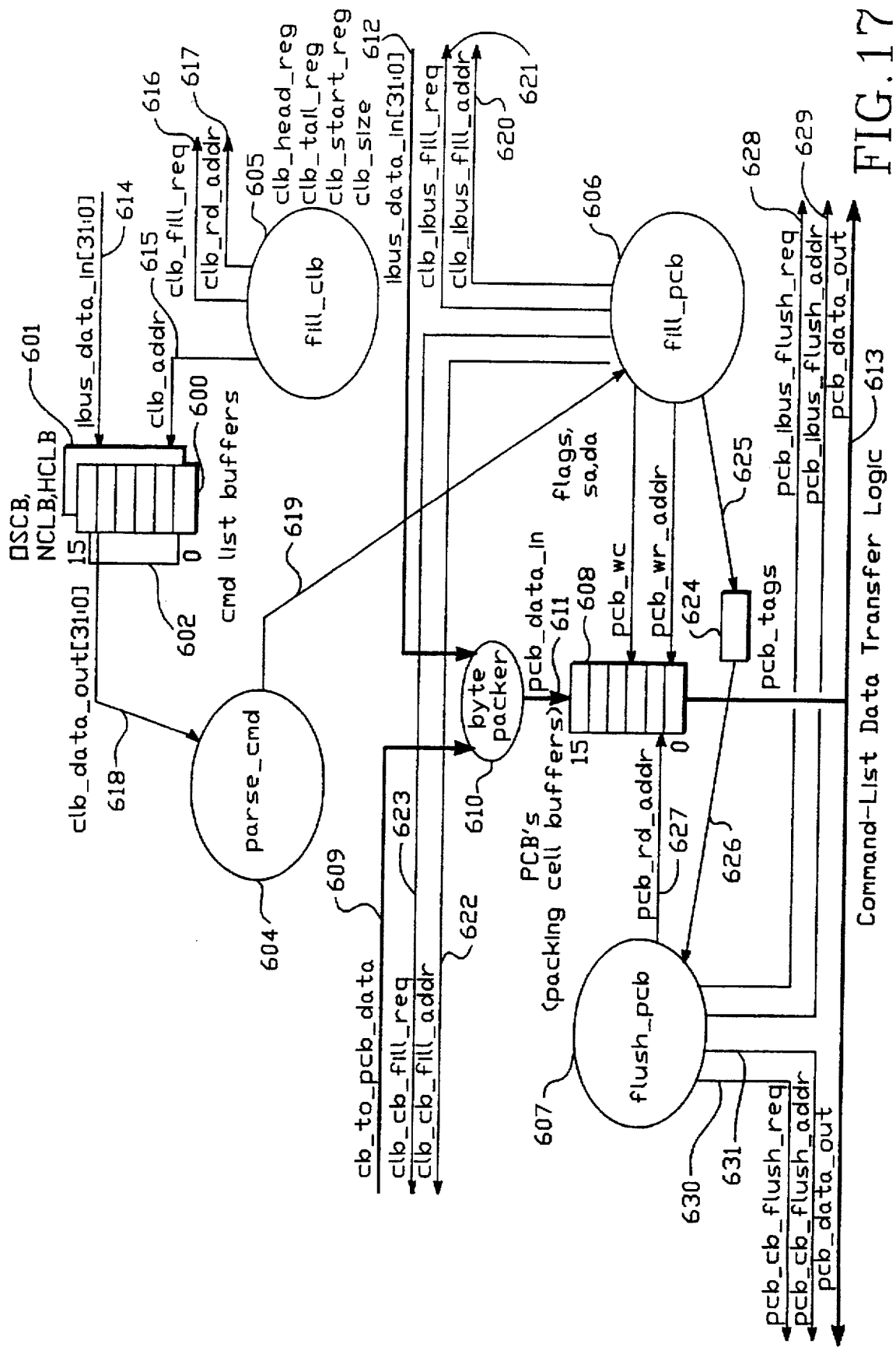
FIG. 17 illustrates the command list data transfer logic within the message passing controller.

FIG. 17 shows the structure of the Command List Data Transfer Logic. The MPC transfers data according to commands placed by software onto one of two command lists (NCLB 600, HCLB 601) or onto a high priority one-shot command buffer (OSCB 602). All data transferred under command list flows through the packing cell buffers 608 PCBs, and both source and destination (fill and flush) may be either system bus or internal bus.

The major functions of this block are summarized as follows:

parse_cmd 604

Read entries from the CLBs 600, 601 and OSCB 602. Determine which command to next process. Associate multiple CLB entries and handle as a single message (cause packing to occur). Move address entries to fill_pcb module 606. Write CLBs invalid once entries are processed. Flush entries for a message that hits an error condition.

fill_clb 605

Generate ibus request to get next block of CLB entries. Mark CLBs valid as they are successfully filled.

fill_pcb 606

Generate request to either ibus or bus to read data (through byte_packer) into PCBs. Flow-control filling of PCBs. Write PCB tags.

flush_pcb 607

Read PCB tags. Generate request to either ibus or system bus to flush PCBs. Write PCB tags empty once transfer completes.

Data from the system bus comes into the packing cell buffers across line 609 into a byte packing mechanism 610. From the byte packing mechanism, the data is supplied on line 611 into the packing cell buffers 608. Also, data may be supplied to the packing cell buffers from the internal bus across line 612 which is coupled to the byte packer 610 and across line 611 into the packing cell buffers. Data may be supplied from the packing cell buffers on line 613 either to the system bus or to the internal bus, as required.

The command list buffers are filled from the internal bus across line 614 at addresses supplied on line 615 from the fill_clb module 605. The fill_clb module 605 also generates the fill requests on line 616 and the read addresses on line 617 to support fills and reads of the command list buffers. Also, the fill_clb module 605 manages the clb head register, the clb tail register, the clb start register, and the clb size registers.

Command list data comes out of the command list buffers across line 618 into the parse_cmd module 604. This module supplies the source and destination addresses and necessary flags on line 619 to the fill_pcb module 606. The fill_pcb module 606 generates the internal bus fill address on line 620 and the internal bus fill request online 621. Also, it generates system bus fill addresses on line 622 and fill requests online 623. Further, it loads the packing cell buffer tags 624 with appropriate data across line 625. These tags are read by the flush_pcb module 607 which manages flushing of the packing cell buffers. This module 607 supplies the read addresses for the packing cell buffers on line 627, and issues the internal bus flush requests and flush addresses on line 628 and 629, respectively. Also, system bus flush requests and flush addresses are supplied on lines 630 and 631 from the flush_pcb module 607.

The message passing controller acts as a channel device on the internal bus operating according to the protocol of that bus. The types of message passing controller initiated transfers on the internal bus are detailed in Table 1.

TABLE 1

MPC-initiated IBUS transfer types

| type of transfer | expected length | priority factors | priority |
| --- | --- | --- | --- |
| read command list(s) [there are two or three cmd lists] | always 16-word (4 entries) | if cmd list not filled, then we cannot transmit full rate on bus, no real problem | REQ |
| read free list | always 16-word (16 entries) | free list buffer needs to always have valid entries for allocation to new receive activity | HREQ |
| write receive lists [there are two, normal and hp] | min 2-word, max 16-word | needs to flush to make room for completed buffers, less frequent than cell buff flush | HREQ |
| flush inbound cell buffer (write to SDRAM) | generally 16-word xfers, always 16-word aligned partial cells at end of message | critical need to flush cell buffers to keep available for bus receive at full rate (worst case, not sustained) | HREQ |
| fill outbound packing cell buffer (read SDRAM) | non-aligned and random length dependent on transmit buffers - large buffers will mean most transfers burst full 16 words | bus transmit data takes back seat to receive activity | REQ |

TABLE 1-continued

MPC-initiated IBUS transfer types

| type of transfer | expected length | priority factors | priority |
|---|---|---|---|
| event | single-word write to SMC | latency of intr/event to processor is a factor, but there is no danger of loss or overrun here | REQ |

Event/interrupt signals from the MPC are supplied to the local processor through the shared memory controller SMC, according to the internal bus protocol.

The conditions set out in Table 2 send an "event" from the MPC to the SMC (causing a bit-set operation in the SMC's out-of-band event register):

TABLE 2

IBUS out-of-band event codes

| event code | condition | synchronous with data xfer |
|---|---|---|
| 0 | no event | n/a |
| 1 | command list entry complete (when notification bit set) | if data write to sdram involved |
| 2 | receive list write (new receive tail) | yes |
| 3 | uart_trap assertion (system bus cycle) | no |
| 4 | out of receive buffers | no |
| 5 | system bus error condition | no |
| 6 | dropped hi-cell-priority system bus cell | no |
| 7 | spare | — |

The MPC makes efficient use of the SDRAM memory system. This means that the MPC will read up to 16-words across the internal bus and the transfers may cross 16-word-aligned boundaries. Any number of words up to 16 may be read from any word-aligned address. The SMC is expected to deal with SDRAM page crossings, so the MPC need not account for or track that case. If the SMC needs to put ibus wait-states out to deal with page crossings then the MPC will implement ibus wait-states (as instructed via a wait command code from the SMC chip). In the case when a long transmit buffer is to be read, the MPC will shorten the first ibus burst read so that subsequent bursts for that buffer will be 16-word aligned bursts.

The following categories of events and interrupts are implemented in the MPC:

uart_warn

This is a non-maskable trap signal to the local processor. A bus write to the MPC's uart_warn register causes the MPC to assert a $\overline{warn}$ signal directly to the local processor. The MPC simply sources a signal which, at the board-level, is connected to the processor. This signal bypasses the IBUS and SMC.

uart_trap

Used for out-of-band debug, a bus write to the uart_trap register causes the MPC to send an event to the SMC (via out-of-band event mechanism on the ibus), which in turn asserts a trap signal to the local processor.

channel_device_interrupts

This class of events uses the ibus out-of-band event mechanism including the event_tag field in the upper nibble of the ibus address. This is used by the MPC to notify the local processor of command completion, dropped cells, bus error, illegal command entry, etc. In the SMC, each event may be set as a polled event or summed into an $\overline{Intr}$ signal to the processor.

in-band interrupts and events

This amounts to a register access from a channel device to the SMC (the SMC sums events and interrupts into registers providing up to 32 bits per channel device). The MPC does not use this mechanism, but would do so if bus interrupt and event receives were implemented.

Registers in the MPC are listed below with detailed description of their function. The name will be given first, then in parentheses the address offset is stated in hexadecimal. The size of each register will be given along with a description of the register's function. Unless stated otherwise, assume that the register is R/W. Unless stated otherwise, assume that all registers are set to zero when the MPC comes out of reset.

1. System Registers

Slot Number (0000)

This is a 4-bit register providing the encoded slot number, from 0 to 16.

Arbitration and Priority ID (0004)

This 4-bit register provides a device with an encoded arbitration ID. The priority bit used by the device is determined by adding 16 to the arbitration ID. This use of priority is enabled by device specific means.

Arbitration Mask (0008)

This 16-bit register is used to mask (AND) arbitration/priority levels on the bus. Thus, 0's are set in every bit corresponding to non-existent cards, and 1's are set in every bit corresponding to existing cards. Thus, all devices must drive both arbitration and priority lines during every arbitration phase.

Revision Register (000C)

This 4-bit read-only register gives a revision number for the Core bus device.

Core Bus Device Type (0010)

This 8-bit register gives a hard coded bus device type. Different core bus devices will have different register configurations, so software must check the value in this register before attempting to program the device. The CMC is set to 0, CMPI is set at 1, and the MPC will be set at 2.

Backoff Timer (0018)

This 3-bit register indicates how long to wait when a backoff indication is received.

Parity Error Byte Flags (001C)

This 5-bit register has one or more of its four bits set to indicate which bytes of the data at the affected address caused a parity error. The appropriate bits in this register are written by a core bus device receiving core bus data with bad parity. These flags are read only. The lowest 4-bits indicate a data parity error, while the highest bit indicates an address parity error. The lowest bit is associated with the data byte on D0–D7, and the fourth lowest with the data on D31–D24.

Address Generating Parity Error (0020)

This 32-bit register holds the address which had parity error problems.

Backoff Counter (002C)

This 4-bit read/write register gives a count of the number of backoffs received by this chip. An error is generated by the chip when 16 backoffs in a row are received.

Corebus Device Configuration (0030)

This 5-bit register holds the reset and enable bits shown in Table 3:

TABLE 3

Corebus Device Configuration

| Bits | Description |
| --- | --- |
| 4 | BRES - This bit is used to reset IOP board (See the "Reset" chapter for additional detail) |
| 3 | SCRES - When this bit is set it initiates a cold reset. A cold reset reinitializes all values to be identical to power-up except that the error state information is saved. This bit can also be set as a side effect of the Corebus ERR bit being set more than 24-clock period. |
| 2 | SWRES - When this bit is set it initiates a warm reset. A warm reset stops operation of the device and returns it to a known free and idle state, disabling operation, but does not reinitialize the values of registers. The SWRES bit can be set by the ERR signal being asserted more than 12 clock periods. |
| 1 | ARBE - This enables the device to drive its arbitration bit on the Corebus. Note that driving its arbitration bit is not the same as asserting its arbitration bit. |
| 0 | CBE - This enables the device to transmit over the Corebus. When disabled the device may still participate in arbitration. |

Core Bus Error Status (0128)

This 10-bit register provides error bits to guide the software when it receives an error interrupt as shown in Table 4. Any bit set causes the error interrupt to be requested.

TABLE 4

Error Status Register

| bits | Description |
| --- | --- |
| 0 | This bit indicates that a Core bus time out occurred. |
| 1 | This bit indicates that a backoff retry sequence was not successful. |
| 7:4 | These bits indicate a parity error occurred on data sourced from the Core bus. If these bits are set it may be in tandem with bit 9 (processor read) or Core bus agent write. |
| 8 | This bit indicates that an address parity error occurred. |
| 9 | This bit indicates whether the last cycle that had an error was a write from another device or a read by this device. |

2. List Registers

There are a group of registers which can be described as list registers. There are registers for the free list, normal priority command list, high priority command list, normal priority receive list, high priority receive list. Each will have start, size, head, and tail registers. The start and size registers will be set during initialization by software. Initially both the head and tail registers will be set to 0. The MPC will be continually updating the head register. The software will occasionally read the head register and set the tail register (not necessarily at the same time). From the perspective of the MPC the head pointer will always be current while the tail pointer may be stale (being stale does not mean that it cannot be used, it means that the current tail pointer may be old).

2.a. Free List Registers

Figure 18:
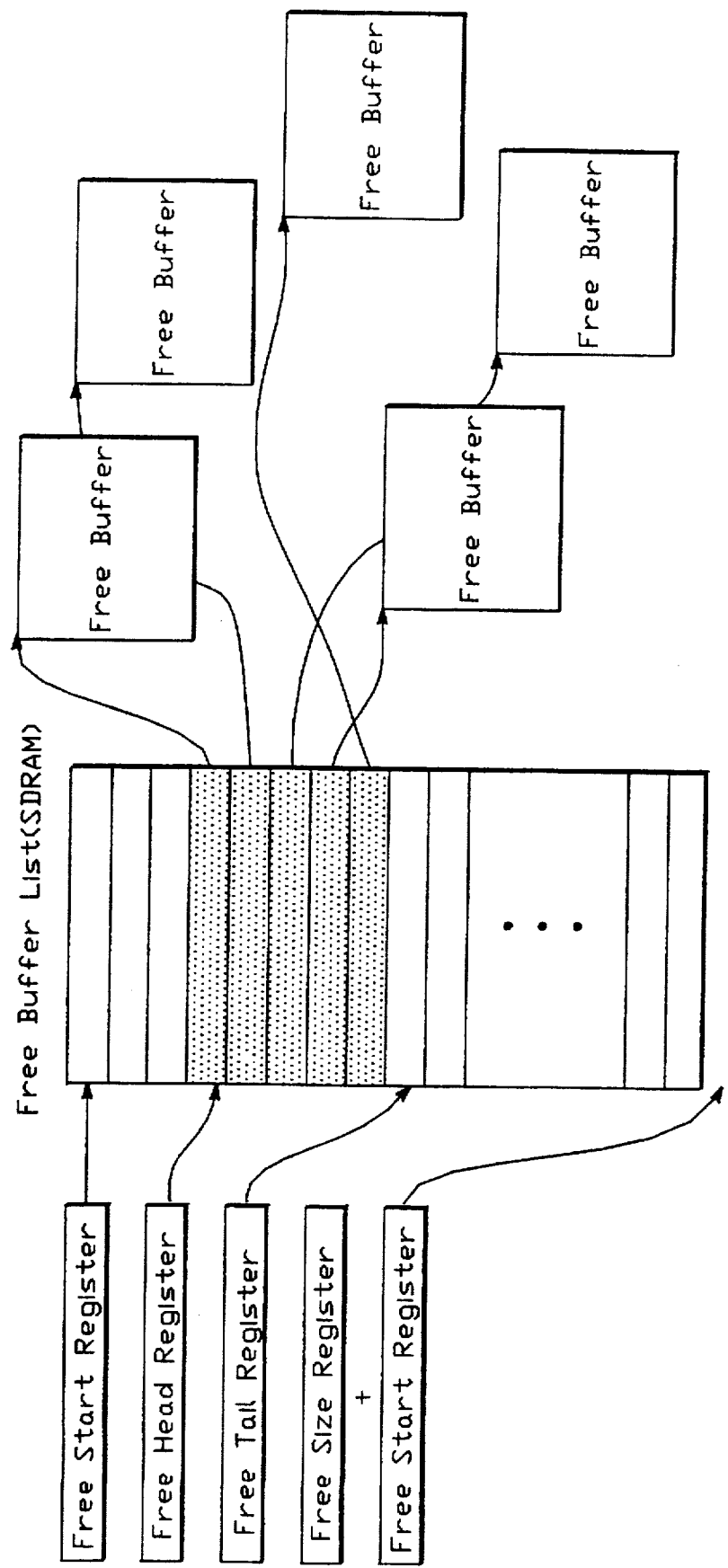
FIG. 18 illustrates the free list structure and its associated registers in the MPC and the free buffers in the SDRAM.

The free list registers have a series of pointers associated with it. The start pointer points to the beginning of the free list. The start+size will point to the location just below the bottom of the free list. The head pointer indicates the location in memory where the hardware removes the entries from the list. This pointer is set by the hardware. The software will have to query the hardware to get this information. The tail pointer points to the next location that software will allocate new free list pointers. FIG. 18 shows the free list structure and its associated registers in the MPC and the free buffers in the SDRAM.

Free Head Register (0200)

This is an 11-bit register which holds part of the address of a pointer in the free buffer list (in SDRAM) which points to the next free receive buffer (in SDRAM) to be loaded into the free list buffer (in MPC). The bottom 6 bits of the 32 bit address are not included because the free list entries are transferred in 16-word aligned blocks. The top 15 MSB's of the address are not included because it will never change and is specified by the free start register. The value of the free tail register must be 1 or more higher than the value of the free head register for the MPC to use the entries specified by the free head register. If they are equal it means that there are no valid entries available. If the free tail register is smaller than the free head register, it means that the free tail register must have already wrapped around the bottom of the free buffer list and started from the top again. This means that it is alright to transfer the pointers to the free buffers into the MPC's free buffer list. Reads to this register will behave differently than writes because during writes the entire 32 bits of the address will be valid. This address is generated by concatenating the bits [31:17] from the free start register, the merge of bits [16:10] of the start with bits [16:10] of the free head, the bits [9:6] of the free head register and bits [5:0] are padded with 0's.

Free Tail Register (0204)

This is an 11-bit register which holds a portion of the address of a pointer in the free buffer list (in SDRAM) which will point to the next free buffer as determined by software. Like the free head register, the bottom 6 bits of the 32-bit address are not needed since software will be assigning 16 buffers at a time and the top MSB's of the address will not be needed since they will always be the same as the free start register. Once again, the reads to this register will behave differently than writes (see the free head register definition for additional information).

Free Start and Size Register (0208)

This is a 30-bit register which holds the 22 MSB's of the address of the top of the free buffer list (in SDRAM) and 8 bits of size information. A size value of 00000001 will correspond to the minimum normal priority command list size of 256 entries, 00000010 corresponds to 512 . . . 10000000 corresponds to the maximum normal priority command list size of 32768.

Free Watermark 0 Register (020C)

This 11-bit register stores the count (×16) of valid entries in the free list below which the hardware will have different characteristics knowing that the number of entries in the free list is getting low. The MPC will start dropping medium and low reliability cells when the free buffers are less than the number indicated by this register.

Free Watermark 1 Register (0210)

This 11-bit register is similar to the free watermark 0 register; just replace "0" with "1". The MPC will start dropping low reliability cells when the free buffers are less than the number indicated by this register.

2.b. Command List Registers

The command list registers are very similar to the free list registers. Both need to get information off a list while keeping track of where to get the next element of the list and the location of the end of the list. For the command list registers a watermark register will not be necessary. (Thus generating the difference between the head and tail register will not be necessary, just an equality check to see if we are out of commands.) The MPC will assume that the software will update the command lists 4 commands (16 words) at a time. If the software cannot fill the 4 commands, it will put the null command in the next empty command field.

Normal Priority Command Head Register (0214)

This 11-bit register is identical to the free head register; just replace "free" with "normal priority command."

Normal Priority Command Tail Register (0218)

This 11-bit register is identical to the free tail register; just replace "free" with "normal priority command."

Normal Priority Command Start and Size Register (021C)

This 30-bit register id identical to the free start and size register; just replace "free" with "normal priority command."

High Priority Command Head Register (0220)

This 11-bit register is identical to the free start and size register; just replace "free" with "high priority command."

High Priority Command Tail Register (0224)

This 11-bit register is identical to the free start and size register; just replace "free" with "high priority command."

High Priority Command Start and Size Register (0228)

This 30-bit register is identical to the free start and size register; just replace "free" with "normal" priority command.

Normal and High Priority Command Head Register (022C)

This 22-bit register holds the contents of both the normal priority command head register and high priority command head register. This is to allow transfers of the command head registers in one 1-word transfer. This register is a "phantom" register which points to the two "real" registers which actually holds the information.

Normal and High Priority Command Tail Register (0230)

This 22-bit register holds the contents of both the normal priority command tail register and high priority command tail register. This is to allow transfers of the command tail registers in one 1-word transfer. This register is a "phantom" register which points to the two "real" registers which actually holds the information.

2.c. Receive List Registers

The receive list registers are similar to the command list registers. Hardware writes the receive list entries to the location pointed to by the receive tail register. The receive list register's head register is not needed because software will never give hardware enough receive list entries for the tail to overrun the head. The receive list tail register must have a higher resolution than the other list tail registers since there will no longer be requirement of the 16 word transfers.

Normal Priority Receive Tail Register (0234)

This is an 11-bit register which holds a portion of the address of a pointer in the normal priority receive list. The top 15 bits of the 32 bit address are not needed since they will be the same as the normal priority start register. The bottom 3 bits are not needed since they will always be 0 since the descriptors to the receive buffers will always be sent in 2 word increments. This register will wrap around back to 0 when it has exceeded the size of the list.

Normal Priority Receive Start and Size Register (0238)

This is a 32-bit register which holds the 22 MSBs of the address of the beginning of the normal priority receive list space (in SDRAM) and 8 bits of size information. A size value of 00000001 will correspond to the minimum normal priority command list size of 256 words, 00000010 corresponds to 512 . . . 10000000 corresponds to the maximum normal priority command list size of 32768 words.

High Priority Receive Tail Register (023C)

This 14-bit register is identical to the normal priority receive tail register; just replace "normal priority" with "high priority."

High Priority Receive Start and Size Register (0240)

This 30-bit register is identical to the normal priority receive start and size register; just replace "normal priority" with "high priority."

Receive Buffer Size Register (0244)

This 8-bit register (N) holds the information about the size of the receive buffers in the SDRAM. The size of the buffer will be N*64 bytes except when N=0. When N=0 the size of the buffer is 16348 bytes. Table 5 provides the encoded values stored in the register and the corresponding size represented by that encoded value.

TABLE 5

Receive Buffer Size Register Decode

| Encoded Value | Size of Buffer in Bytes |
|---|---|
| 00000001 | 64 |
| 00000010 | 128 |
| 00000011 | 192 |
| 00000100 | 512 |
| . . . | . . . |
| 11111110 | 16256 |
| 11111111 | 16320 |
| 00000000 | 16384 |

3. Miscellaneous Registers

Immediate Bus Error Status Register (0248)

This 32-bit register holds the error status information.

Miscellaneous Register (024C)

This 7-bit register holds the txe, rxe, pxe, cmd_check_enable, set_cb_reset_reg_, cb_master_reg, and loopback_thru_cb bits having the functions described in Table 6 below.

TABLE 6

Receive Buffer Size Registers

| Bit Name | Description |
|---|---|
| 0 loopback_thru-cb | 1 means that loopback occurs through the Core bus interface, 0 means that the Core bus interface is bypassed. |
| 1 cb_master_reg | 1 indicates that this MPC is the master of the Core bus. |
| 2 set_cb_reset_reg | If this bit is set, it will source a cb_reset. |
| 3 cmd_check_enable | If this bit is set, error checking on the commands will be enabled. |
| 4 pxe | This bit indicates whether the last cycle that had an error was a write from another device or a read by this device. |
| 4 rxe | This bit is the receive enable. If it is set then the MPC willing to accept data transfers. |
| 4 txe | This bit is the transmit enable. If it is set then the MPC is able to send data transfers |

UART Registers

The uart_register function provides a path for "out-of-band" communication between cards across the corebus. This feature requires software driver support (call it a remote monitor function, or whatever). Another card may access registers in the MPC's corebus init space. The local processor also has access to this register set, facilitating board-level communication.

TABLE 7

Error Status Register

| bits | Description |
|---|---|
| 0 | This bit indicates that a Core bus time out occurred. |
| 1 | This bit indicates that a backoff retry sequence was not successful. |
| 7:4 | These bits indicate a parity error occurred on data sourced from the Core bus. If these bits are set in may be in tandem with bit 9 (processor read) or Core bus agent write. |
| 8 | This bit indicates that and address parity error occured |
| 9 | This bit indicates whether the last cycle that had and error was a writed from another device or by a read by this device. |

4. Pointer Lists and Address Fields

Pointer lists and memories reside within the MPC. Three types of pointer lists exist: the command list, the free list, and the receive list. These lists allow software to communicate to hardware the whereabouts of various buffers within SDRAM.

The SDRAM memories within the MPC, aside from the cached pointer lists, provide a storage area for inbound and outbound data as well as address buffer locations.

Each cell transferred over the bus has an address field. The information within these fields relates to information software supplies to the hardware via the command list.

The pointer lists and memory structures of the MPC as well as information contained in a cell address field are outlined below.

4.a. The Pointer Lists
  The Command List

The command list consists of an array of four-word entries stored in SDRAM which contain instructions from the software to the hardware. The instructions may ask hardware to gather, pack, and move data between SDRAM and COX shared memory, source an interrupt or event to the bus, or read/write a word of data to bus I/O or memory space. A portion of the command list will be cached within the MPC. The cache spans two groups of 2×16×32 bits.

The possibility exists for three types of command list entries. One type of command list entry points at data in a message fragment buffer for incorporation into a message transfer. A cell which is part of a message transfer is prepended with a message address field. The second type of command list entry points at data in a non-message fragment buffer for incorporation into a non-message transfer. A non-message transfer cell uses a non-message address field as its prepended cell header. The third type of transfer is a type of non-message transfer except in this case there is no fragment buffer. One word of data is written to the bus memory or I/O space. The word for writing is actually specified within the command list entry. These transfers are called embedded-data transfers. Embedded-data transfers, being a type of non-message transfer, use non-message address fields as their prepended cell header.

Table 8 below shows the first six bits in a command list entry given a particular type of transfer. FIG. 9 gives a short description of each type of transfer. Tables 9 and 10 state the meaning of the Destination and Source Code bits in Table 6. These bits indicate whether data is transferred to/from the IBus/system bus and whether the transfer is in memory space or in I/O space. It is intended that CBIO WRITE and CBMEM WRITE (the embedded-data transfers) move only one word at a time onto the bus. Therefore, no source address is needed and the data to be written may be imbedded in the command list in place of the source address. This is indicated with a source address code of 2'b00.

Special care must be taken when a command list entry specifies the movement of data with a destination address in local SDRAM. Software needs a reliable method for determining that that type of transfer has actually completed (the data is actually in local SDRAM). To do this, the MPC hardware will automatically block command list processing (not bump the head pointer) until data bound for SDRAM via a non-message transfer has successfully flushed across the ibus. Also, any event associate with this entry (specified by a command list notify bit; see below) will not be sent until the write to SDRAM is completed. This allows the software event handler to read head pointers to determine which entries are actually complete once an event is received (since there could be several entries causing events quite close together, head pointer management is critical).

TABLE 8

Allowed Command List Transfers

| Transfer | Type | C | Dest. Code | Dest. Code | Src. Code | Src. Code | |
|---|---|---|---|---|---|---|---|
| MSG XMIT | 1 | 0 | 1 | 0 | 0 | 1 | msg transfer |
| SMA READ | 1 | 0 | 0 | 1 | 1 | 1 | msg transfer |
| SMEM READ | 0 | 0 | 0 | 1 | 1 | 1 | non-msg trans |
| SMEM WRITE | 0 | 0 | 1 | 1 | 0 | 1 | non-msg trans |
| MEM MOVE | 0 | 0 | 0 | 1 | 0 | 1 | non-msg trans |
| CELL XMIT | 1 | 1 | 1 | 0 | 0 | 1 | msg-transfer |
| CBIO READ | 0 | 0 | 0 | 1 | 1 | 1 | non-msg trans |
| CBIO WRITE | 0 | 0 | 1 | 0 | 0 | 0 | embedded-data trans |
| CBMEM WRITE | 0 | 0 | 1 | 1 | 0 | 0 | embedded-data trans |

TABLE 9

Source Codes

| Source Code | Source Code |
|---|---|
| Word 1 = DATA | 0 | 0 |
| I-Bus Memory Space | 0 | 1 |
| CB I/O Space | 1 | 0 |
| CB Memory Space | 1 | 1 |

TABLE 10

Destination Codes

| | Destination Code | Destination Code |
|---|---|---|
| Illegal Code | 0 | 0 |
| I-Bus Memory Space | 0 | 1 |
| CB I/O Space | 1 | 0 |
| CB Memory Space | 1 | 1 |

Command List Priorities

Two command list caches exist within the MPC. Servicing priorities between the two lists varies: normal priority (HTQ: high-throughput queue) and high priority (HRQ: high-reliability queue).

Normal Priority Command List (software: HTQ)

The normal priority command list resides in SDRAM. Thirty-two words from this list may be cached in SRAM in the MPC ASIC normal priority command list buffer. Entries written by software to this list receive the lowest priority attention in regards to hardware processing. This list may contain pointers to both message and non-message fragment buffer entries as well as hold embedded-data transfer instructions.

High Priority Command List (software: HRQ)

As with the normal priority command list, the high priority list also resides in SDRAM. Thirty-two words of this list may be cached in SRAM in the MPC ASIC high priority command list buffer. Entries written by software to this list receive a higher priority attention by hardware than entries on the normal priority list. This list may also contain pointers to both message and non-message fragment buffer entries as well as hold embedded-data transfer instructions.

Command List Entries

Command List Entry—Message Fragment Buffer

FIG. 19 defines the bits in a command list entry pointing at data which will become part of a message transfer.

A description of the fields found in FIG. 42 follows:

The T in bit 31 of Word 0 stands for Type. If Type is set to a one, the command list entry specifies a message transfer; if type is set to a zero, the command list entry specifies a non-message transfer.

The C in bit 30 of Word 0 indicates to hardware that this particular command list entry specifies a CELL XMIT transfer. Hardware will know not to change the "Y" bits in Word 2 but to copy them directly to the message address field.

The D CODE[29:28] of Word 0 indicate to hardware whether a transfer is destined for the bus of the ibus and whether or not that transfer is in I/O space or memory space. These bits refer to the address in Word 2, the destination address.

The S CODE[27:26] of Word 0 indicates to hardware whether the data transfer is sourced from the system bus or the ibus and whether the address is in I/O space or memory space. In the case of an embedded-data transfer, these two bits will indicate that the data to be written is held in Word 1. These bits, then, refer to the address in Word 1, the Source Address field.

F stands for First in bit 25 of Word 0. If the memory location to which this command list entry points is the first buffer in a series of buffers which will combine to form one data transfer, then F will be set to a one. Otherwise, F will be zero.

Likewise, the L in bit 24 of Word 0 stands for Last. If the buffer to which this command list entry points is the last in a series of buffers which combine to form one data transfer, then L will be set to a one. Otherwise, L will be zero.

The V in bit 23 of Word 0 holds the valid bit. This bit indicates that a command list entry requires hardware processing. (V=1 indicates processing needed; V=0 indicates processing not needed). If a particular command list entry shows a valid bit of V=0, hardware will assume that the remaining command list entries in the same cell are also invalid. Hardware will resume valid-bit checking at the beginning of the next cell of command list entries.

The lower two bytes in Word 0 contain the number of bytes of data in the buffer to which this command list entry points.

Word 1 specifies the physical memory address where the data buffer resides. This address may be either local SDRAM or shared memory on the COX card.

The top 28 bits of Word 2 contain fields which are bit-aligned to those in the message address field. The hardware will append the bottom four bits to this 28-bit field thereby creating the message address for all transfers besides the CELL XMIT. In this case, whatever software specifies in the command list entry will be directly copied into the message address field. The individual fields in Word 2 are described in detail with reference to FIG. 44.

Word 3 will not be processed by the MPC ASIC.

Command List Entry—Non-Message Fragment Transmit Buffer

Figure 20:
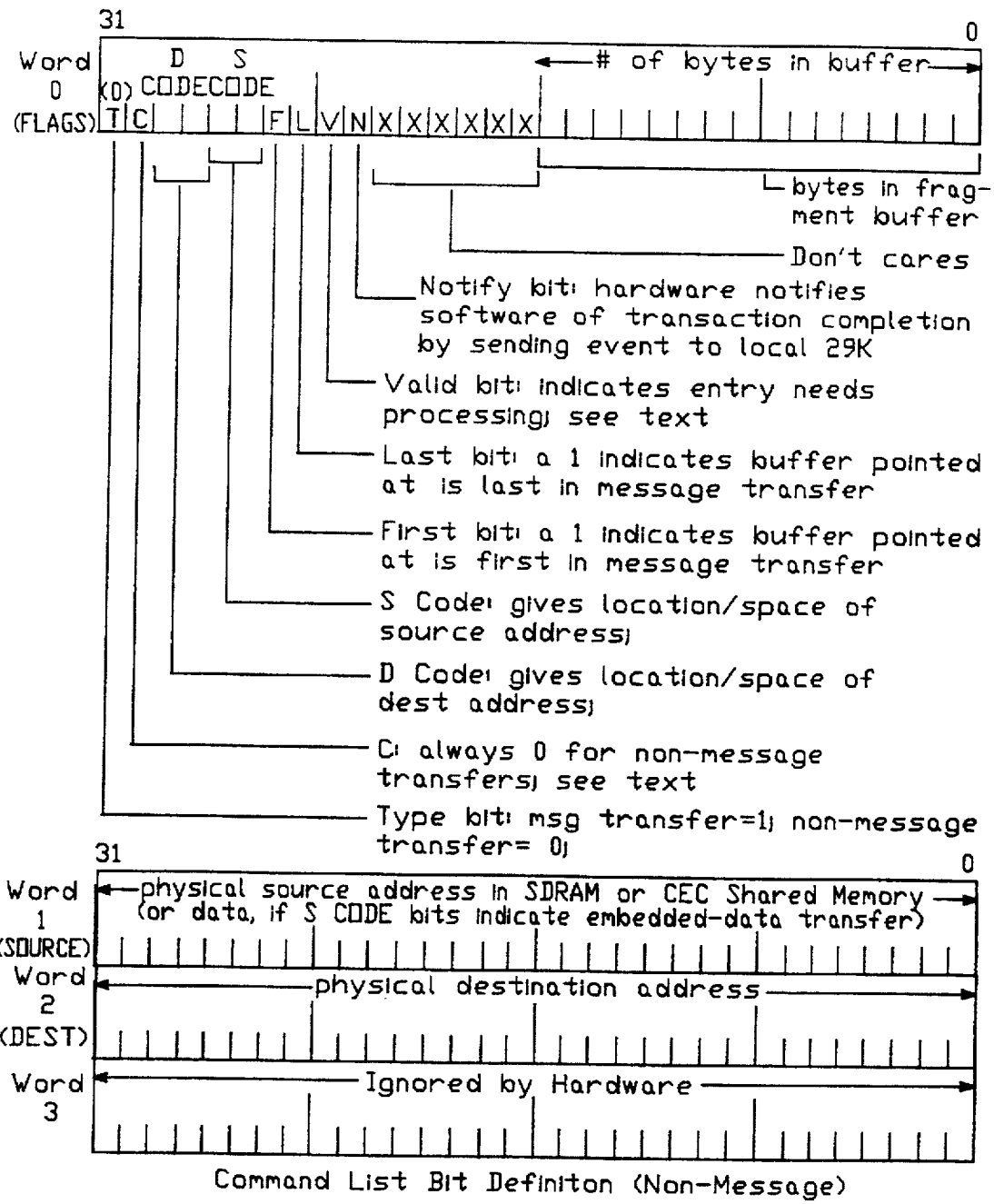
FIG. 20 illustrates the command list bit definition for a non-message type transfer.

FIG. 20 defines the bits in a command list entry pointing at data which will become part of a non-message transfer.

The command list entry for a non-message data transfer resembles that of a message transfer. Note that the Type bit (Word 0, bit 31) will be set to zero for a non-message transfer and Word 2 will be a physical memory location in SDRAM or shared CEC memory. The other fields in FIG. 20 remain the same as those of FIG. 19.

Recall that an embedded-data transfer is really a type of non-message transfer (meaning that the Type bit—bit 31, Word 0—is set to 0). An embedded-data transfer may be distinguished from other types of non-message transfers by decoding the S CODE bits which will be set to 2'b00. With this type of transfer, Word 1 will contain the data for writing instead of a physical source address.

Command List Transfers

This section summarizes the types of transfers initiated by command list entries as introduced with reference to FIG. 9 above. The information given below for each type of transfer refers to fields found in the command list entry as described above. Write and read are in relation to the bus, i.e., one writes to the bus or one reads from the bus.

Message Transfers

The following transfers are referred to as message transfers because their destination address is in message format (Word 2 of command list entry). Address decoding maps bus I/O space addresses 0x(8 or 9) XXXXSSS as message addresses. The S CODE bits within the command list flags indicate whether to retrieve the source data from the core bus or from the I-Bus (see Table 16).

MSG XMIT—

MSG XMIT transfer request on the command list asks for the transfer of data from the SDRAM of the local IOP to the SDRAM of another IOP. The command list entry points to a message fragment transmit buffer.

Word0[31:26]=6'b101001

Source address (Word 1)=local SDRAM: 0x9XXXXXXX (I-Bus memory space)

Destination address (Word 2)=message address: 0x(8 or 9)XXXXXXX (system bus I/O space)

SMA READ—

This type of transfer moves data from shared memory on the CEC to local SDRAM on the IOP. Data is massaged by the MPC to resemble a MSG XMIT transfer, i.e., incoming data is prepended with a message address field so hardware will utilize the receive list for notifying software of data entry.

Word0[]31:26]=6'b100111

Source address (Word 1)=COX shared memory: 0xXXXXXXXX (system bus memory space; limited by 4 MB of addressable memory on COX)

Destination address (Word 2)=message address: 0x(8 or 9)XXXXXXX (system bus I/O space)

CELL XMIT—

A CELL XMIT data transfer is much like a MSG XMIT except software has explicit control over the message destination address and may only transmit up to sixteen words per command list entry (one cell). This implies that hardware will not alter the bottom four bits of Word 2 in the message fragment buffer command list entry when placing them into the message address field. This type of transfer is used for diagnostic purposes only. Note that bit 30 of Word 0 in the command list entry will be set to C=1 as an indication to hardware that the entry is a CELL XMIT entry.

Word0[31:26]=6'b111001

Source address (Word 1)=local SDRAM: 0x9XXXXXXX (I-Bus memory space)

Destination address (Word 2)=message address: 0x(8 or 9)XXXXXXX (system bus I/O space)

Non-Message Transfers

The following transfers are referred to as non-message transfers because the destination address of each command list entry refers to a physical location in either local SDRAM or COX shared memory.

SMEM WRITE—

This transfer moves data from the SDRAM of the local IOP to shared memory on the COX.

Word0[31:26]=6/b001101

Source address (Word 1)=local SDRAM: 0x9XXXXXXX (I-Bus memory space)

Destination address (Word 2)=shared memory: 0xXXXXXXXX (bus memory space; limited by 4 MB of addressable memory on COX)

SMEM READ—

The SMEM READ data transfer moves data from shared memory on the COX to local SDRAM on the IOP. Data bypasses receive list mechanism in the MPC and is written directly to SDRAM.

Word0[31:26]=6'b000111

Source address (Word 1)=COX shared memory:
0xXXXXXXXX (bus memory space; limited by 4 MB of addressable memory on COX)

Destination address (Word 2)=local SDRAM: 0x9XXXXXXX (I-Bus memory space)

MEM MOVE—

This type of transfer moves data out of and back into local SDRAM on the IOP. Data transfer, therefore, bypasses the bus.

Word0[31:26]=6'b000101

Source address (Word 1)=local SDRAM: 0x9XXXXXXX (I-Bus memory space)

Destination address (Word 2)=local SDRAM: 0x9XXXXXXX (I-Bus memory space)

CBIO WRITE

This type of non-message transfer is termed an embedded-data transfer since one word of data is written to the bus memory space by placing this data in Word 1 of the command list entry.

Word0[31:26]=6'b001000

Source address (Word 1)=data for writing (unrestricted)

Destination address (Word 2)-bus I/O space: 0xXXXXXXXX

CBMEM WRITE

This type of non-message transfer is termed an embedded-data transfer since one word of data is written to the bus memory space by placing this data in Word 1 of the command list entry.

Word0[31:26]=6'b0001100

Source address (Word 1)=data for writing

Destination address (Word 2)=COX shared memory: 0xXXXXXXXX (memory space; limited by 4 MB of addressable memory on COX)

The Free List

The MPC must place data entering an IOP into the SDRAM. The software communicates to the hardware locations in SDRAM where data may be placed. These locations are called receive buffers. The free list consists of one-word elements which point to the receive buffers. The length of the receive buffers is fixed at N * 64 bytes where N ∈ (1, 2, . . . , 256). Each receive buffer is 64-byte aligned. The specific length used is latched in a register called receive buffer size.

Thirty-two 26-bit entries reside in the free list in the MPC arranged as two 16×26 bit, dual-ported SRAMs. Entry data are cached from the fill free list held in SDRAM.

The Receive List

Standard Receive Mode (RXE=1; PXE=0)

After hardware finishes loading incoming data into receive buffers as allocated by the free list, the data becomes ready for processing by software. The hardware informs the software that a receive buffer needs attention by placing a pointer to that receiver buffer, as well as other information, onto one of two receive lists. One receive list indicates data needing normal-priority attention and the other receive list indicates data needing high-priority attention. As with the command list and the free list, the entire receive list resides in SDRAM. The MPC buffers receive-list data in four, dual-ported, 16×32 bit SRAMs. Two of these SRAMs are dedicated to normal-priority entries and two are dedicated to high-priority entries.

The following describes the entries shown in the receive list bit definition:

If the start bit (Word 0, bit 31) equals one, then the particular buffer pointed to by this receive list entry is the first buffer in a series of buffers which form a message.

Likewise, if the end bit (Word 0, bit 30) equals one, then the particular buffer pointed to by this receive list entry is the last buffer in a series of buffers which form a message. Note that this implies that if neither bit 31 or bit 30 is set to one, then the buffer pointed to by the receive list entry is a middle buffer. If both bits 31 and 30 are set to one, then the message is one buffer in length.

Bits 16 through 23 contain the count field indicating how many cells are stored in a particular receive buffer.

Bits 10 through 15 determine the channel over which the IOP received the message. Each incoming message is granted a channel number unique during its transmission time.

Bits 6 through 9 relate to error checking. Bit 0 will be set to one by hardware if any type of error occurs during the transmission of the message. Bit 1, labeled seq, equals one if the error which occurred during transmission is a cell sequence error, i.e., cells were lost, duplicated, or rearranged. Likewise, bit 2 corresponds to a parity error and bit 3 is currently reserved for a future error status indicator.

Word 1 points to the location in SDRAM corresponding to the first byte of the receive buffer. Note that since all receive buffers in SDRAM are 64-byte aligned, only 26 bits are required to specify the receive buffer address.

Promiscuous Receive Mode (RXE=X; PXE=1)

During promiscuous receive mode all bus cycles are captured by the MPC. Via the receive list, hardware will convey to software the bus address, the bus byte count, the MEM/IO bit, an error bit, and the location of the receive buffer in SDRAM.

The bits in this entry are defined as follows:

Word 0 holds the address read off the bus during the address phase of the bus cycle.

Word1 [31:6] holds the top twenty-six bits of the receive buffer location in SDRAM where the data associated with this bus cycle has been written. Note that receive buffers are 64-byte aligned in SDRAM therefore the bottom six bits of the address are zero.

Word1 [5:3] indicates the byte count read off the bus.

Bit 2 of Word 1 is the memory bit from the bus indicating whether data transfer is in either bus memory space; (mem=1) or bus I/O space (mem=0).

Bit 0 of Word 1 will be set to one if an error occurs during the bus cycle.

4.b. The Cell Address Field

Since the command list dictates the formation of cells traversing the bus, the address field associated with each cell is intimately related to information found on the command list. The address field on a cell destined for the bus varies with the type of data transfer. MSG XMIT, SMA READ, and CELL XMIT use message address fields. SMEM WRITE, SMEM READ, MEM MOVE, CBIO READ, CBIO WRITE, and CBMEM WRITE use non-message address fields.

The Message Address Field

Figure 21:
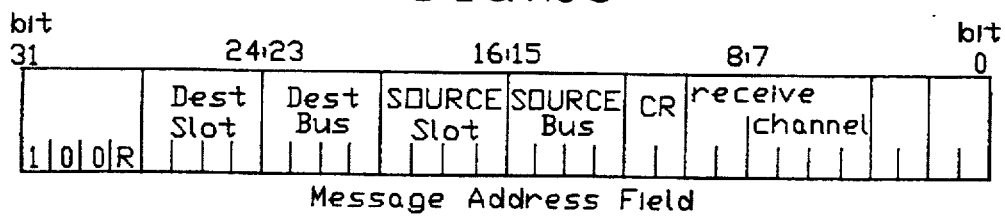
FIG. 21 illustrates the message address field for a message transferred on the bus.

FIG. 21 defines the bits found in the one-word message address field, as explained below.

Any cell which has the upper nibble of its header set to 8 (1000) or 9 (1001) will be identified as a cell which is part of a message.

The R in bit 28 indicates to which receive list the cell should be directed. A value of "1" indicates the high-priority receive list (HRQ) and a "0" indicates the low-priority receive list (HTQ).

Bits 24 through 27 define the destination slot. The cell routes to this physical slot in the chassis.

Bits 20 through 23 indicate the bus over which the message will be routed.

Bits 16 through 19 define the source slot. The cell originates from this physical slot in the chassis.

Bits 12 through 15 indicate the bus over which the message originated.

Bits 10 and 11 show cell reliability. The cell reliability bits work against two watermark registers, implementing three levels of reliability for bus messaging as shown in Table 11.

TABLE 11

MSG address cell_reliability bit definition

| cell reliability [1:0] | reliability | loss condition |
|---|---|---|
| 00 | hi | no free buffers |
| 01 | medium | free buffers less than watermark 0 |
| 10 | low | free buffers less than watermark 1 |
| 11 | rsvd | no receive activity |

Bits 4 through 9 determine the channel over which an IOP is receiving a message. Each incoming message is granted a channel number unique during its transmission time.

A one in bit 3 indicates that this is the first cell in a message.

A one in bit 2 indicates that this is the last cell in a message.

Bits 0 and 1 allow room for a sequence number applied to each cell in a message. Cell sequencing takes place module 4.

The Non-Message Address Field

Cells which combine to form a non-message data transfer use physical memory locations in SDRAM or COX shared memory for their address fields.

III. INTERPROCESSOR MESSAGING SYSTEM (IMS)

The system description and message passing controller technique described above supports a very flexible and scalable architecture for the router, with the distributed protocol modules on intelligent I/O modules, centralized resources shared by all the I/O modules, and the ability to provide data link layer processing for basic input/output modules on the system. This ensures backward compatibility as well as flexibility and scalability for the system.

Figure 22:
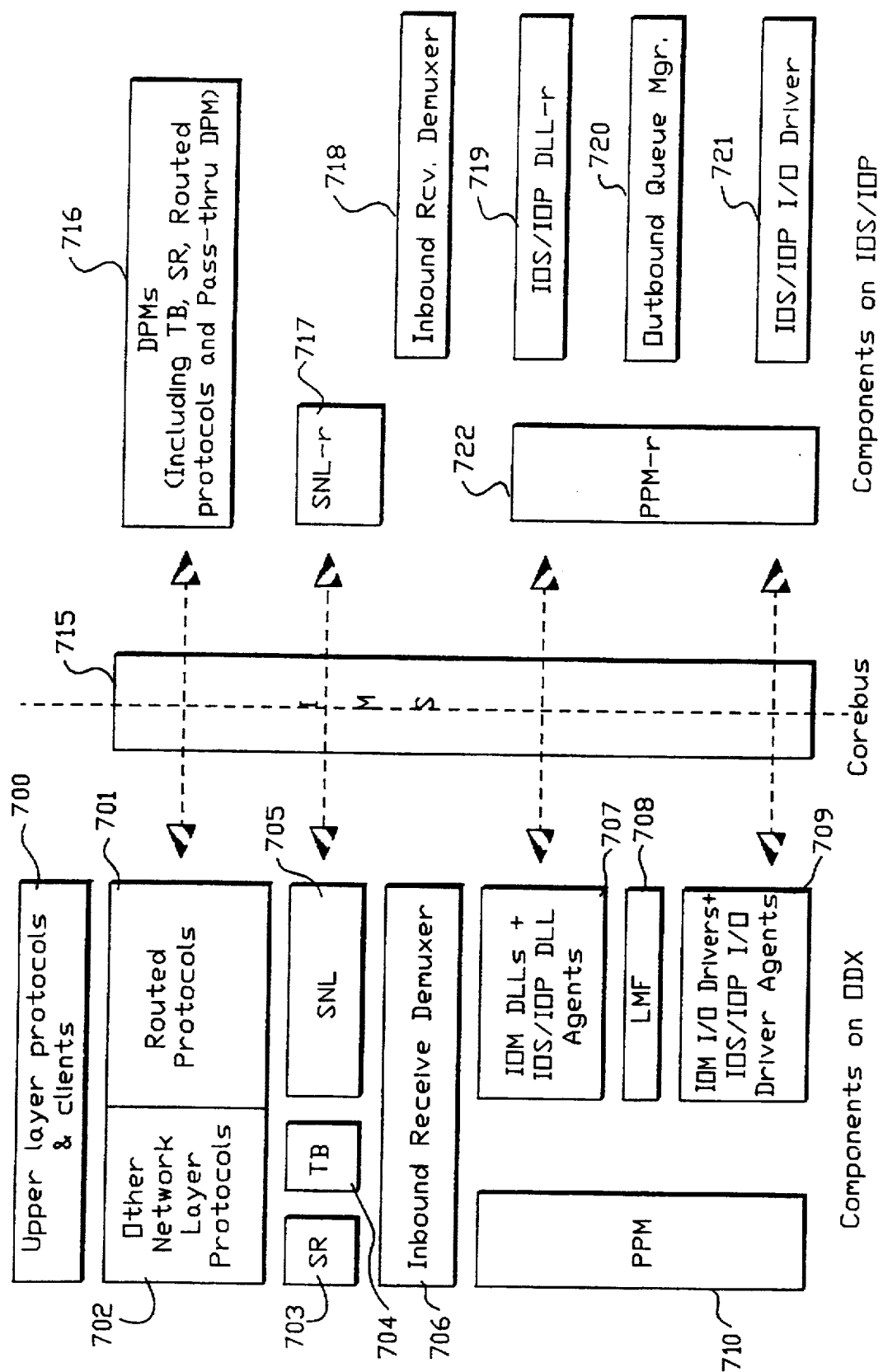
FIG. 22 is an overview of the major components in the centralized internetworking engine and the intelligent input/output modules according to the present invention.

FIG. 22 provides highlights of major functional components of the software according to one embodiment of the present invention as distributed on the centralized processor COX and the intelligent input/output system IOS, which communicate at a logical layer by means of an interprocessor messaging system IMS 715.

In FIG. 22, flow within each processor, either the COX or the IOS/IOP can be considered vertical in the figure, while communication between the units is primarily horizontal and peer-to-peer. Thus, on the central networking resource COX, software for upper layer protocols is illustrated in block 700. The routed protocols are represented by block 701, with other network layer protocols 702 supported as necessary. Below the routed protocols 70 1, are the source routing resources 703, transparent bridging resources 704, and the SNL support 705.

The SNL is the sub-network layer which handles parsing of headers to determine the next layer of protocol, dispatching of packets to appropriate higher layer protocol handles, protocol dependent transmit routines to add/update and replace sub-network layer headers including MAC headers for LAN ports, and headers for serial ports according to such protocols as PPP, FR, X.25, and SMDS.

Below the SNL support 705, transparent bridging 704 and source routing 703 are found the inbound receive demultiplexing resources 706. These resources direct the packets received from the lower layers into the appropriate upper layer modules. On the COX, the data link layer servers for the IOM input/output modules without remote intelligence are provided. Also, data link layer agents for the intelligent I/O modules are supported (block 707). Also, a link management function module LMF 708 provides queuing services for serial interfaces. The I/O drivers which support network events on the basic input/output modules, and the I/O driver agents which provide services to the I/O drivers on the intelligent input/output modules such as the IOS and IOP are also included on the centralized processor in block 709. A port and path manager PPM 710 is included, which handles mapping between logical ports and physical paths. These modules communicate with resources distributed across the interprocessor messaging system IMS 715 to components located on the input/output modules. For the IOS or IOP modules with intelligent resources located on card, they communicate with the modules illustrated in FIG. 22. Thus, in the upper layer distributed protocol modules 716 are found, which include transparent bridging, source routing and routed protocol support, and also pass through resources so that packets not supported locally can be passed through the IMS 715 to the centralized processor. A SNL remote driver 717 is also included on the IOS/IOP. The distributed protocol module 716, and the SNL remote driver 717 receive data through the inbound demultiplexer 718. The data link layer resources 719 which are executed on the remote devices supply the inbound receive demultiplexer 718. An outbound queue manager 720 is used for managing transfers out of the local card. I/O drivers 721 drive the input/output devices coupled to the IOS/IOP card. A port and path manager PPM 722 for the remote device is also included on the remote card.

The interprocessor messaging system (IMS) 715 provides a logical platform which allows communication between the central resource COX and a wide variety of remote resources across the common logical layer interface. Thus, the intelligence of the cards within the routing system can be varied and flexible as suits the need of particular installation.

Figure 23:
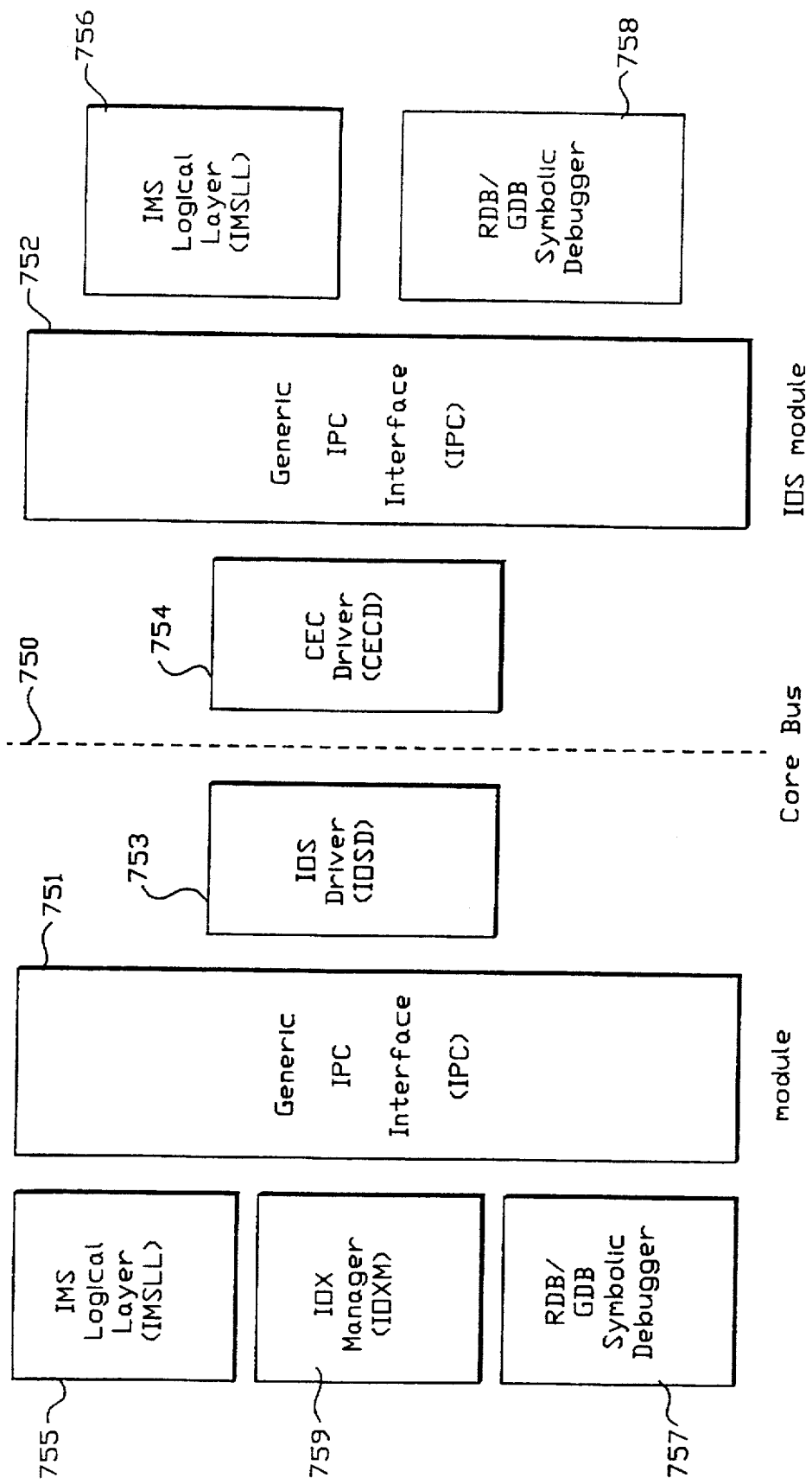
FIG. 23 provides an overview of the interprocessor communication components for use in the system described in FIG. 22.

FIG. 23 breaks down the interprocessor messaging system into additional components which are centered across the core backplane bus represented by dotted line 750. A generic interprocessor communication service 751 for the central module, and a generic interprocessor communication service 752 for the remote module are provided. This service provides an interface to all other processor modules in the system. The generic IPC interfaces with one or more bus drivers 753 on the central side and one or more bus drivers 754 on the remote side. This way, communication between specific modules can be handled in the system. Also, the IPC interface 751/752 interfaces with one or more special services, such as the IMS logical layer 755 on the central side, and IMS logical layer 756 on the remote side. A debugging service 757 is found on the central side and 758 on the remote side. A board manager 759 on the central side provides centralized management of the remote modules.

The interprocessor messaging system logical layer module 755/756 is a significant part of the IPC services available. The IMS provides a message based interface between processor modules. An IMS subsystem on each processor module is composed of a logical layer that interfaces with client components, the physical layer that interfaces with external processor modules and a generic IPC layer between the two.

Figure 24:
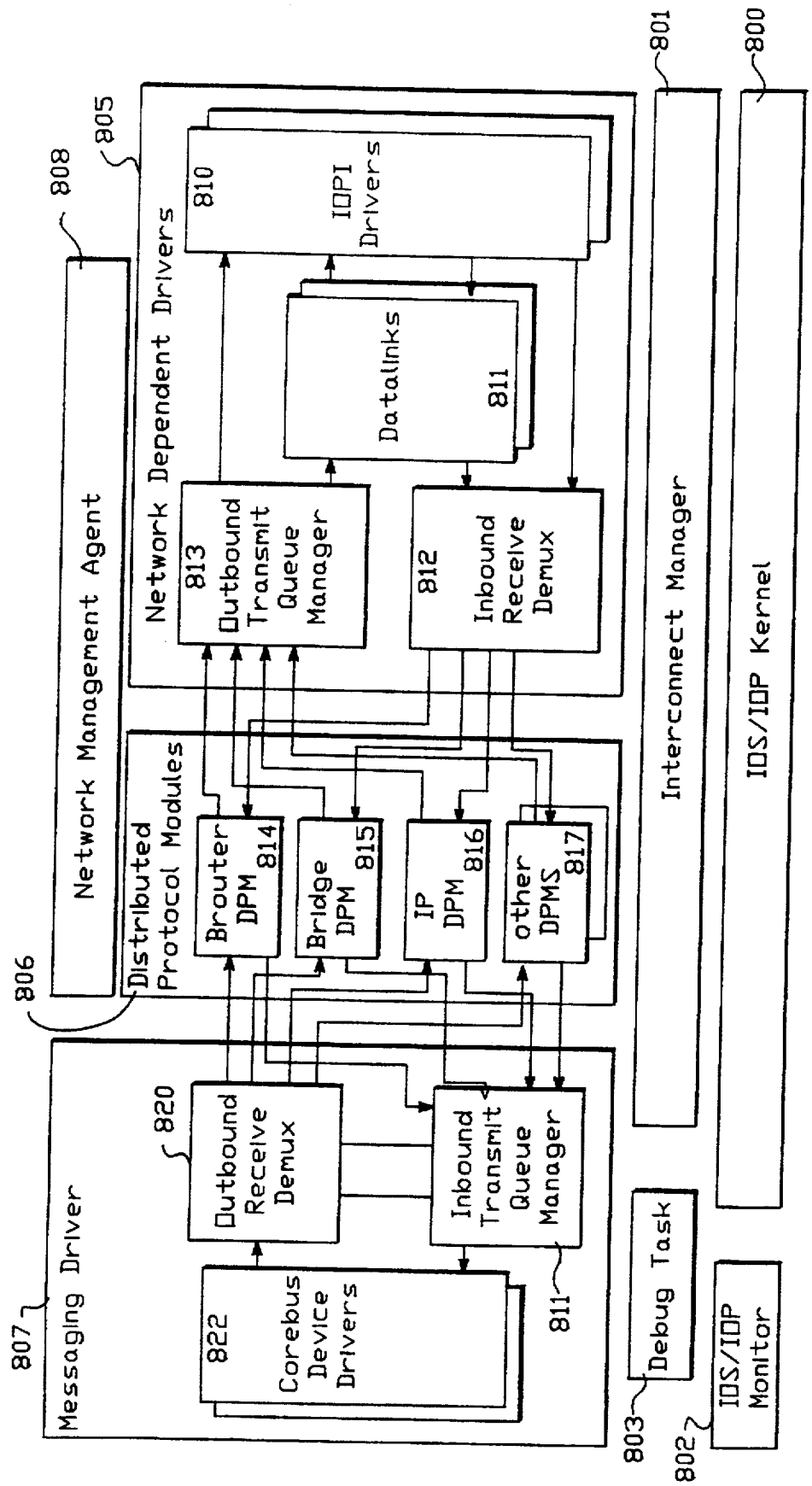
FIG. 24 provides a perspective of the data paths in the intelligent input/output modules for the system of FIG. 22.
Figure 26:
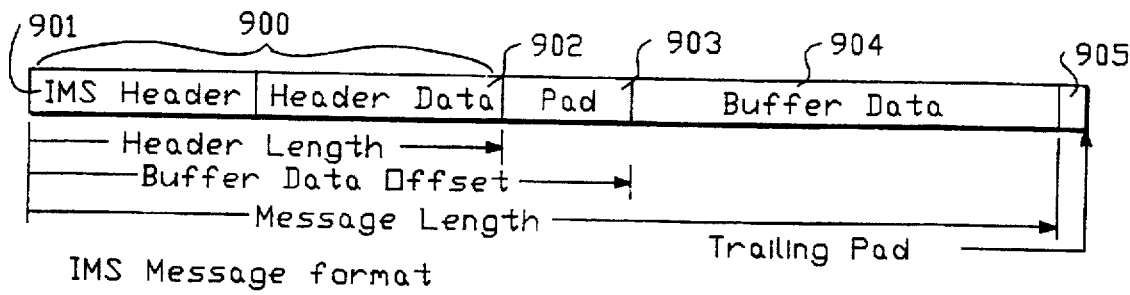
FIGS. 26 through 29 illustrate the message formats supported by the interprocessor messaging system according to one embodiment of the present invention.

FIG. 24 illustrates data paths on a remote input/output module such as an IOS or IOP. In FIG. 24, the remote system includes a basic kernel module 800 and an interconnect manager 801. A monitor module 802 and a debug task 803 may be provided for system management. The system includes a plurality of network dependent drivers 805, a plurality of distributed protocol modules 806, and a messaging driver 807. Also, a network management agent 808 may be included. The network dependent drivers 805 include physical network drivers (IOPI) 810, data link layer drivers 811, an inbound receive demultiplexer 812, and an outbound transmit queue manager 813.

The distributed protocol modules include the basic Brouter distributed protocol module 814, a bridge DPM 815, and internet protocol (IP) distributed protocol module 816, and other DPMs 817 as suits the particular implementation. The distributed protocol modules are coupled with the messaging driver 807 which includes an outbound receive demultiplexer 820, and an inbound transmit queue manager 821. Core bus drivers 822 are also included, coupled with the outbound and inbound paths for driving one or more core busses to which the device is connected. The messaging driver 807 implements the IMS layer modules as discussed above under the control of the interconnect manager 801.

The interprocessor messaging system is specifically designed to meet the needs of control and data-in-transit traffic patterns in the scalable, flexible distributed router system according to the present invention. For each message type, based on the traffic pattern anticipated for the system, an IMS message queue for high throughput or high reliability and IMS drop priority are assigned. The table shown in FIG. 25 is a summary of the various IMS message types according to one embodiment of the invention, their service requirements and the quality of service assigned to them as a result. Note that the drop priorities and other parameters associated with these messages can be modified to suit the needs of a particular environment.

In FIG. 25, HRQ stands for high reliability queue, and HTQ stand for high throughput queue.

Thus, the IMS offers three types of transport services—(1) high throughput service using the HTQ, (2) high reliability, low latency service using the HRQ, and (3) guaranteed delivery service also using the HRQ. For a given queue, the IMS guarantees that packets will be delivered on the recipient processor module in the same order in which they were supplied to the IMS. Messages in the HRQ are given priority over messages in the HTQ for transmit as well as receive processing. However, the volume of traffic on the HRQ is supposed to be substantially smaller than that on the HTQ. Hence, messages on the HRQ are processed in small numbers and messages on the HTQ are processed in large batches for better throughput.

On the transmit side, the IMS provides quality of service registration based on transmit list fullness thresholds in software to ensure fairness and protection against overloading by any one message type. Each IMS message type is assigned a drop priority. A message of a certain priority will be dropped from being added to transmit list if the count of empty command list entries is below an eligibility threshold (or watermark) set for that message priority. In other words, the quality of service is a transmit side drop mechanism to assure fair queuing. A message with the highest drop priority (lowest reliability class) will have high threshold for free transmit list entries and hence the highest probability of being dropped. A message with a lower drop priority (higher reliability class) will have a lower threshold for free transmit list entries and hence the lowest probability of being dropped. Quality of service registration is not required for message types using "guaranteed" service, because the message will not be dropped if any free entries are available in the transmit list.

On the receive side, the IMS demultiplexes a large batch of IMS messages into smaller batches by IMS message type and has a receive function invoked for each message type received. The IMS is responsible for converting buffer data type messages into buffer data and data areas, and collecting segments and putting them together as a single chain of buffers and batching these buffer chains together by their message type. The IMS provides a variety of receive function registration services based on IMS message header type and IMS message type.

Each client provides a receive function that must be invoked for a specific message identification. When two clients register for the same message identification, with two different receive functions, the last registration takes effect. In order to ensure that no two clients assign the same values for two different message type symbols, all message type symbols must be centrally located in the header file in the IMS logical layer component. The reception of messages, whether on high throughput queue or high reliability queue, is transparent to clients. Registered receive function is invoked no matter which queue a message came in on. It is expected that a message is always sent on the same type of message queue.

The high throughput service and high reliability/low latency service are intended primarily for transport of buffer data, that is Buffer Data (BD) descriptors, and data pointed to by BD descriptors. The IMS message header type 0 is used to transport buffer data. Buffer data can be just a single buffer, a chain of buffers or a batch of chained buffers. IMS subsystem on the local processor will convert these buffers into messages and transfer the messages over to remote processors through the IMS. The data messages may be selectively dropped based on quality of service assigned to the message type. The IMS maintains statistics of messages transmitted, discarded, and failed.

Guaranteed message service is provided on top of high reliability, low latency IMS message service using the HRQ. Messages that could not be queued for sending will be queued internally for retrying at a later time instead of dropping. IMS guarantees that data supplied to local IMS subsystems will be delivered by the recipient IMS in exactly the same order in which is was supplied and without replication. In one preferred implementation, the retry attempts are made at a minimum rate of every 100 milliseconds.

The IMS message type header 02 is used for transport of kernel messages and header type 04 is used for transport of frame driver type messages. However, header types used by the IMS are not limited to these and may grow as suits the needs of a particular installation.

FIGS. 26 through 29 illustrate the IMS message and header formats. Each IMS message shown in FIG. 26 has a header, generally 900, which includes an IMS header 901 and header data 902. The header data 902 includes, for example, portions of a buffer descriptor for a frame in transit which sets out status information about the frame. A pad 903 may be used to fill in an area between the beginning of the packet and a buffer data offset. Buffer data is carried in the region 904 and may be padded with a trailing pad 905.

Figure 27:
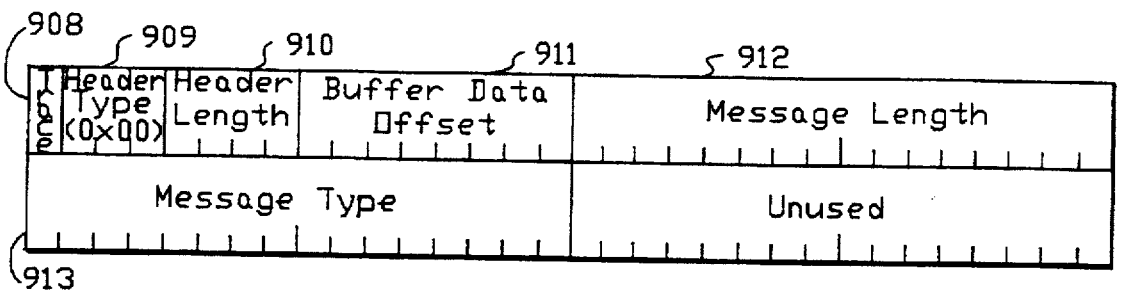
Figure 28:
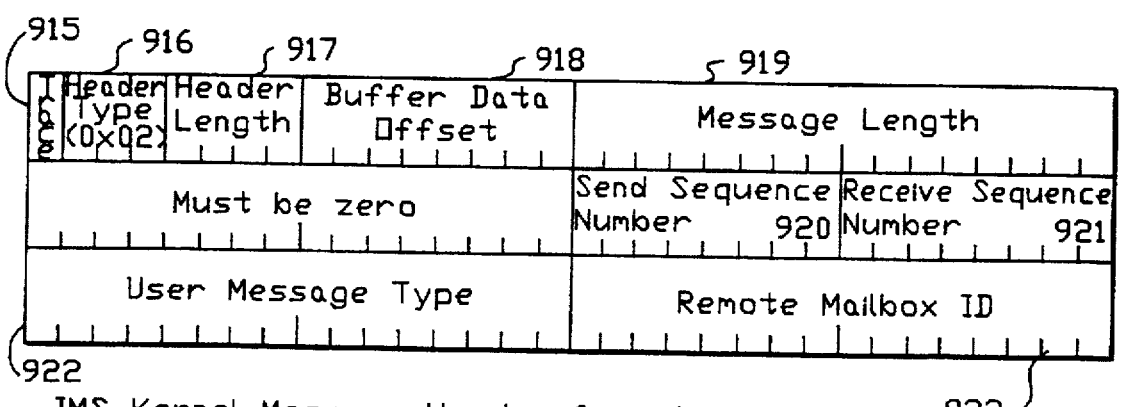
Figure 29:
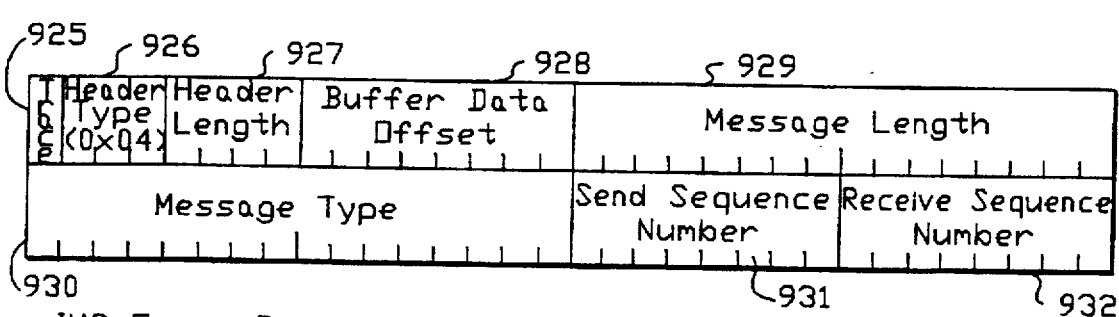

In one system, the IMS may support three categories of messages as shown in FIGS. 27, 28, and 29. Each of these messages have IMS headers with fields indicating the header type, the header length in words, the message length in bytes, and the buffer data offset in bytes at a minimum. In FIG. 27, the BD message header format includes a trace bit 908, a header type field 909, and a header length field 910. The buffer data offset is stored in field 911. A message length is specified in field 912. A message type is specified in field 913. The last segment is unused.

The IMS kernel message header format shown in FIG. 28 begins with a trace field 915, includes the header type field 916, and a header length 917. The buffer data offset is stored in field 918. The message length is stored in field 919. The next word must be all zeroes, followed by a sequence number field 920 and a receive sequence number 921. The next field identifies the user message type 922, and the last field provides a remote mailbox identification 923 for kernel messages.

FIG. 29 illustrates the IMS frame driver message header format. Again, this format begins with a trace field 925 and includes the header type field 926 and the header length field 927. The buffer data offset is provided at field 928. The message length is provided in field 929. The message type is set out in field 930. The last two fields provide the send sequence number, field 931, and the receive sequence number, field 932.

Figure 30:
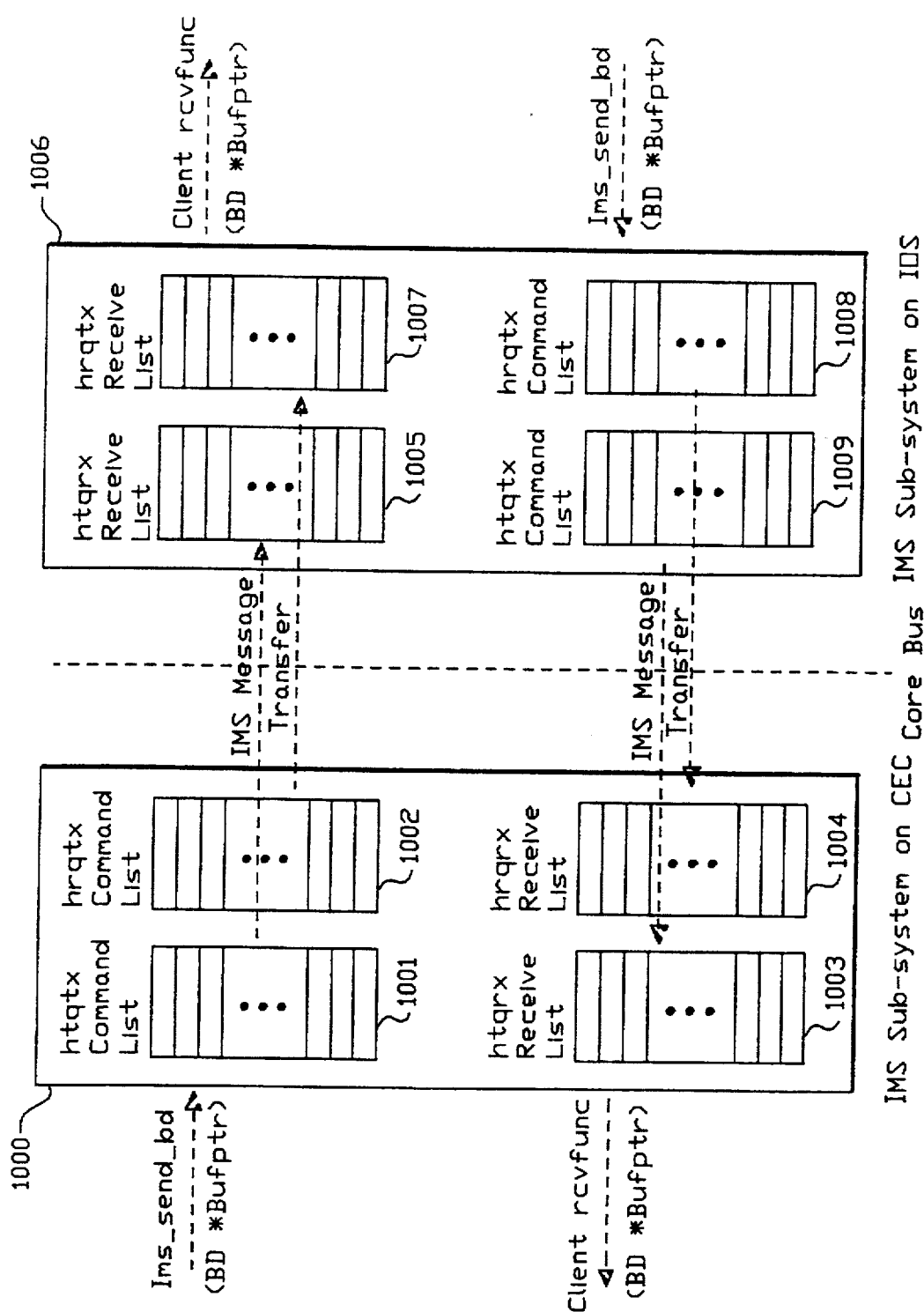
FIG. 30 shows the functional operation for the interprocessor messaging system buffer data type message transfers.

FIG. 30 summarizes the interprocessor messaging system using the two types of queues for buffer descriptor type messages. Thus, on the centralized processor, or another intelligent processor, illustrated at block 1000, a high throughput queue htqtx 1001 and a high reliability queue hrqtx 1002 for transmitting commands are provided. Also, a high throughput receive list queue htqrx 1003 and a high reliability receive list queue hrqrx 1004 are included. The send buffer descriptor command from the logical layer system for the interprocessor messaging system stores a command in the appropriate list. The high throughput queue sends the IMS message to the high throughput receive list 1005 on the destination input/output module 1006. Also, high reliability commands are transferred to the high reliability queue receive list 1007 on the remote device. A similar path exists from the high reliability command list 1008 and the high throughput command list 1009 on the remote device 1006. These messages are transferred to the high reliability and high throughput receive lists on the central processor, or another input/output processor depending on the destination of the packet.

Figure 31:
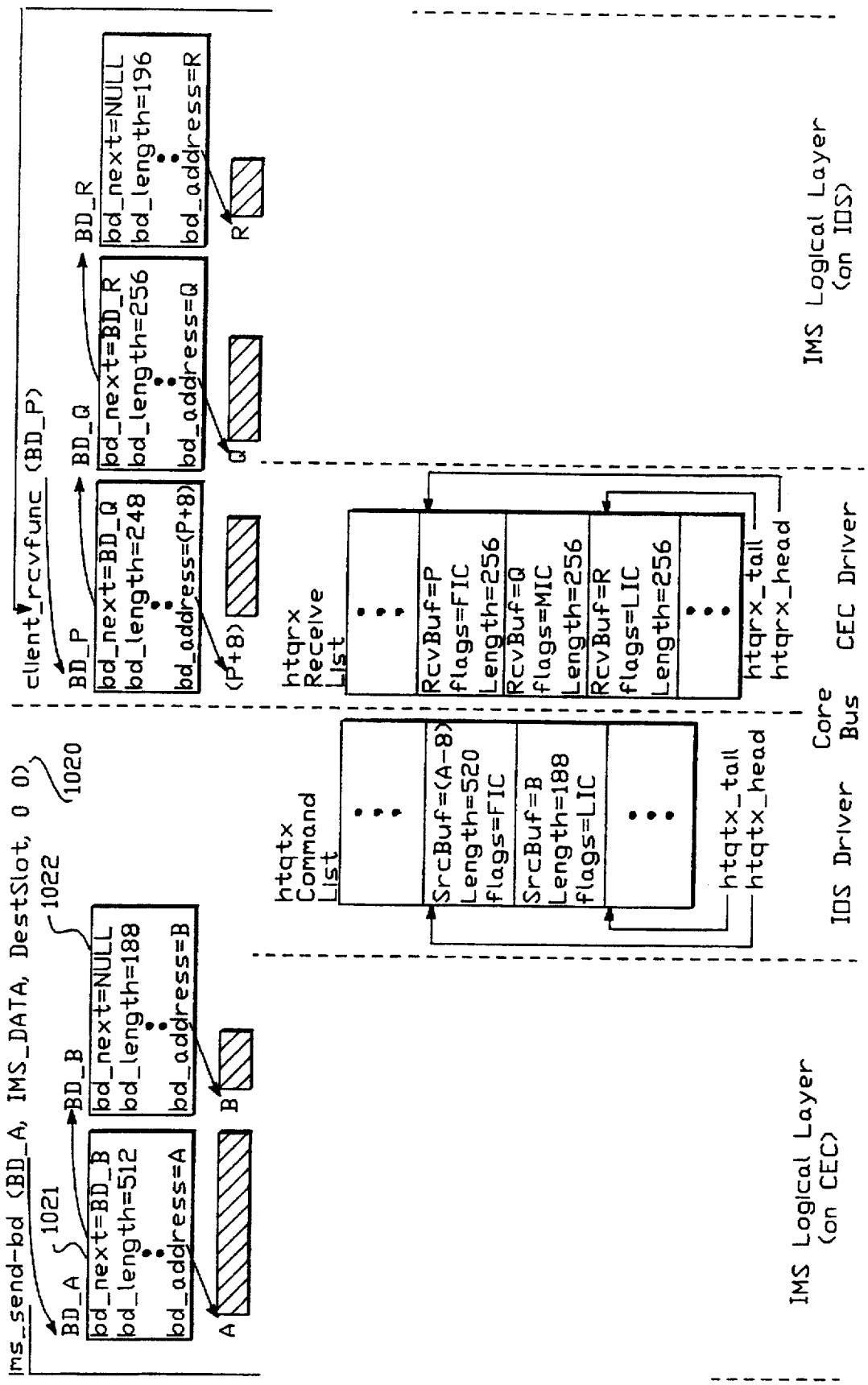
FIG. 31 shows the interprocessor messaging system logical layer processing for data transfers from the central engine to the input/output modules.
Figure 32:
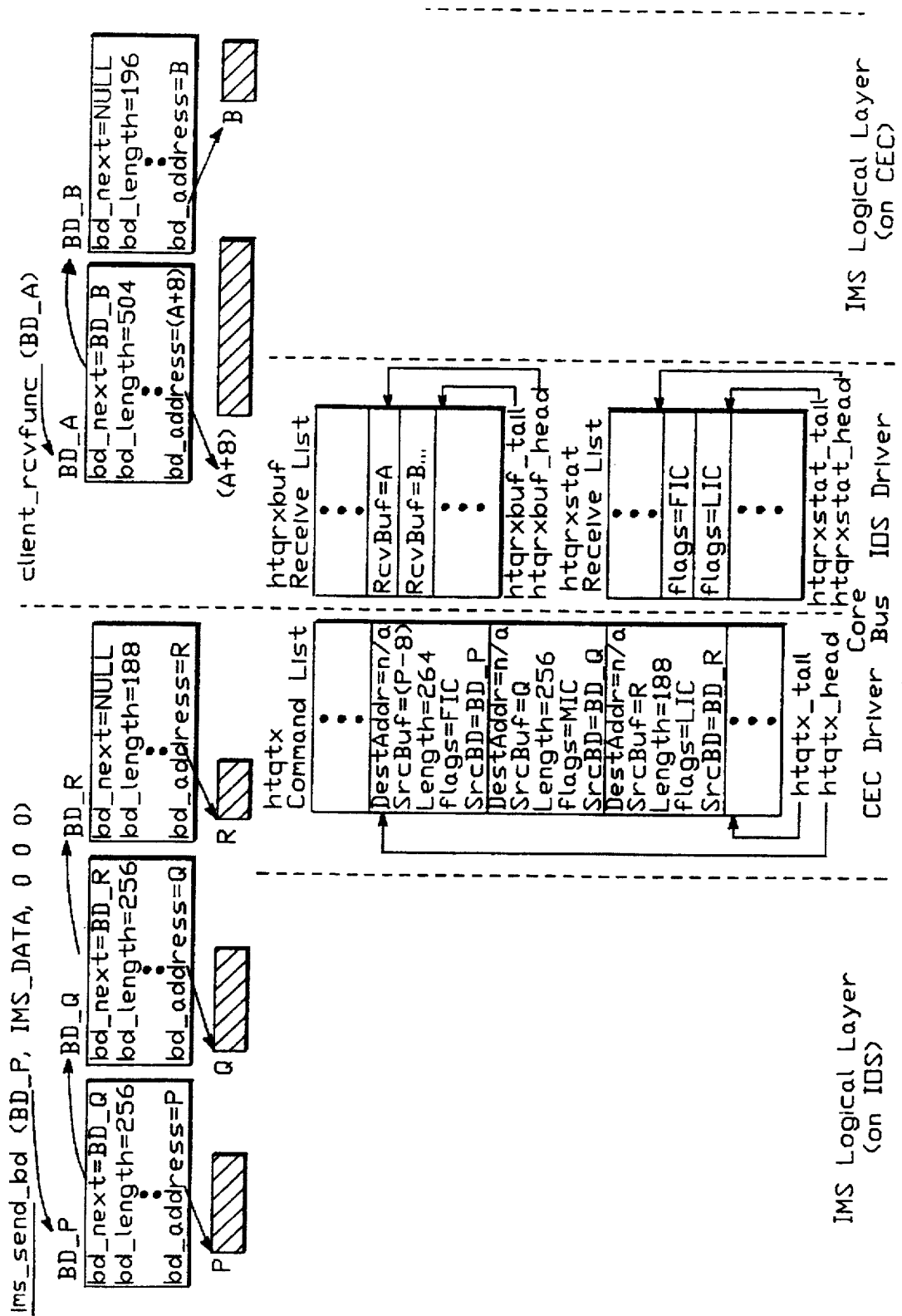
FIG. 32 shows the interprocessor messaging system logical layer processing for data transfers from an input/output module to central internetworking engine.

FIGS. 31 through 32 provide an example of the interprocessor messaging system logical layer processing for transfers from the central resource to a remote processor, and from the remote processor to the central resource respectively. Assuming that message buffers on the centralized resource are 512 bytes long and that buffers on the remote systems are 256 bytes long, the examples will operate as described. Also, in this example, a single packet per batch is used. The sample packet type is IMS data, the packet is 700 bytes long, and when transmitted through the interprocessor messaging system, a header of 8 bytes (assuming for this example that there is no header data (902 of FIG. 26)) is prepended without any additional padding to the message, thus the message size become 708 bytes. Thus, a message of size of 708 bytes is transferred over the high throughout queue from the central processor to the remote input/output module in FIG. 31, and from the remote input/output module to the central processor in FIG. 32.

Thus, a logical layer issues a command (e.g. 1020) to send to the buffer descriptor beginning with buffer descriptor BD-A, with an IMS data message type to a destination slot 00. Thus, the buffer descriptor BD-A is accessed and includes the fields as shown at block 1021. The first line in the buffer descriptor BD-A is a pointer to the next buffer descriptor, buffer descriptor B-DB which includes the fields shown at block 1022. The 708 byte packet thus includes a buffer of length 512 bytes, and a buffer of length 188 bytes. The address for the buffer data is stored in the descriptors as shown.

For all the packets in a batch, the message header is prepended preceding the data buffer of the first segment at the desired data offset, and the address of the start of the IMS message header is set. Thus, the message type is IMS data, the message header size is 8 bytes, the data offset within the message is 8 bytes, and the message link is 708 bytes. Next, the logical layer determines the transmit list drop threshold, based on drop priority or quality of service of the IMS message type. Next, the algorithm determines which interprocessor controller transmit service to use , either the high throughput or high reliability queues. Finally, the appropriate interprocessor communication transmit function for the destination slot based on the transmit service required is invoked. In this example, the command for transferring IMS data to the high throughput queue is called for the destination slot beginning with buffer descriptor BD-A with a quality of service threshold specified. The IOS driver located on the source processor, that is the central processor in this example, executes the transfer using its high throughput command list when the header for the command list reaches the appropriate entry in the command list.

On the receive side, the logical layer demultiplexes a batch of receive messages into sub-batches by individual IMS message type. A client receive function is called for the batch of received messages beginning with the buffer descriptor of the first buffer for the batch. In this case, it is buffer descriptor BD_P. Thus, a first buffer in the receiving device is loaded with 256 bytes, the first 8 bytes of which are the header, which can be discarded. Thus, the buffer descriptor includes a pointer to the next buffer BD-Q, a buffer length field and a buffer data address with an 8 byte offset to discard the header at address P+8. A buffer descriptor BD-Q points to the next buffer descriptor BD-R, stores the full 256 bytes at address Q. Buffer descriptor BD-R indicates that it is the last buffer in the batch by a null next field, has the balance of the data in it, beginning at buffer data address R. The demultiplexing occurs in response to the high throughput queue receive list, when the header for that list reaches the appropriate entry.

The IOS driver on the central processor adds entries to the transmit queue and updates the transmit tail pointer. Then it issues an event to the remote IOS which is to receive the data transfer. When the transmit head pointer is updated later on, the IOS driver frees up the transmit buffers from the last transmit head until the new transmit head pointer. On the receiving device, the central device driver queues up a DMA control block (DCB) which contains the source address, target address, length of the data to be copied, the data transfer type, and the status of the DMA transfer. The significant transfer bit is set in the DCB. The DCB is used to fetch the set up of the transfer from the central processor. When the DCB is complete, the transmit cache tail is updated to match the transmit tail pointer in the set up. Then one or more DCBs is queued up to copy newer entries in the transmit list to the end of the transmit cache list. When the transmit cache list in the central device driver on the remote processor is complete, the transmit cache tail pointer is updated. Next, a batch of transmit cache entries is processed to transfer data into receive buffers. A DCB is then queued for each contiguous data transfer. For each receive buffer, when the last DCB using an address from that buffer is enqueued, receive buffer and flag fields are sent to the receive list. Then, the transmit cache head pointer is updated to the next entry for processing. When the process completes, the transmit cache head pointer in the shared memory for the central processor is updated to match the transmit head in the cache on the local device. Next, a DCB is queued up to transmit the set up data from the IOS to shared memory, in the central processor.

FIG. 32 illustrates the process in reverse from the remote intelligent processor to the central processor. This system receives an IMS send buffer data command at the logical layer identifying the first buffer descriptor for the batch, the message type, and the destination. Thus, for all packets in a batch, the message header is prepended, preceding the data buffer of the first segment at a desired data offset, and the buffer data address at the start of the IMS message header. This header indicates the message type as IMS data, and that the message header size is 8 bytes, the data offset within the message id 8 bytes, and the message length is 708 bytes. Next, the logical layer determines the transmit list drop threshold, based on drop priority or quality of service of the IMS message type. Finally, the transmit service to use is determined based on the message type, either high throughput or high reliability. Finally, the appropriate IPC transmit function is invoked for the destination slot based on the required transmit service. This results in a command indicating a high throughput transmit function indicating the destination, the source buffer, and the quality of service threshold. This message is added to the high throughput command list as shown with a first entry for buffer descriptor BD-P, a second entry for buffer descriptor BD-Q, and a third entry for buffer descriptor BD-R. On the receive side, the receive buffers are loaded by the hardware, and the logical layer demultiplexes a batch of received messages into sub-batches by individual IMS message type. The client receive function is invoked for each IMS message type received, and executed when the receive list head reaches the appropriate entry. Thus, the client receive function writes the incoming batches to buffer descriptor BD-A indicates that the next buffer descriptor buffer descriptor BD-B, and the buffer data length and the offset. Again, for 512 byte buffer the first 8 bytes are header which may be discarded. Thus, the buffer data address is 8 bytes past the beginning of buffer BD-A as indicated in the figure. Buffer descriptor BD-A points to buffer descriptor BD-B which stores the balance of the data at the address at the beginning at point B.

In the central device driver on the remote processor, a DCB is queued up with a bit set indicating a transfer across the IMS to the central system. The shared memory set up is fetched from the central system using this DCB. When this is completed, the receive cache tail in shared memory, and the receive status cache tail in shared memory pointers in the receive manager are set to manage the receive buffer tail pointer which was retrieved from the central processor. A DCB is queued up to copy newer entries in the receive buffer list in the central processor to the end of the receive buffer cache list in the remote processor. When the list has been updated, the receive buffer cache tail and receive status cache tail are updated. Then a batch of transmit entries are processed to transfer into the receive buffers listed in the receive buffer cache. A DCB is queued up for each contiguous data transfer. For each receive buffer, when the last DCB using an address from that buffer is en queued, status for the buffer is set in the receive status cache. Next, the receive status cache entry at the head pointer is triggered, and the next receive status cache entry is updated. Once the trigger DCB is completed, a DCB is queued up to copy the newer status cache entries to the central processor. Also the receive buffer cache pointers are updated to their trigger pointers, and the corresponding structures in shared memory are updated.

IV. DISTRIBUTED PROTOCOL PROCESSING

As mentioned above, the flexible architecture supported by the interprocessor messaging system, the high speed buses, and the variety of architectures which may be connected using this system support distributed protocol processing. According to the present invention, the general distributed protocol module (DPM) model operates with a cache of recently accessed addresses maintained in each of the intelligent input/output modules. The cache contains a subset of the information contained in a routing table maintained in the central processor. Packets received in the DPM for destinations which are in the local cache are forwarded directly without consulting the DPM server on the central processor. Packets received for destinations which are not in the cache result in a query from the DPM to the central DPM server to determine an appropriate destination.

The scalable high performance system according to the present invention provides the interprocessor messaging system interconnecting intelligent input/output modules known as IOPs and IOSs in communication with the central internetwork processor, and with other IOPs and IOSs, and through the central processor to IOMs. Interprocessor messages may be up to 64K bytes long according to one embodiment. They convey data packets, state information, and control information between data processing functions or process instances on different cards in the system. Messages to and from IOPs/IOSs and the central processor are passed through data structures in the central processors shared memory. IOP/IOS to IOP/IOS messages are passed directly from memory of one IOP to that in another IOP/IOS message passing controller. Distributed protocol modules according to the present invention are clients of the interprocessor messaging system. FIGS. 32 and 33 are used to describe two representative distributed protocol processing systems relying on the interprocessor messaging system. It will be understood that any logical layer processor messaging system can be utilized for the distributed processing model discussed. However, the high throughput and flexibility according to the IMS described above is used in the preferred system.

FIG. 33 illustrates a distributed internet protocol (IP) process with a distributed protocol module, generally 1100 on an IOS card, and a central IP process, generally 1101, on the central processor. As mentioned above, an IMS driver 1102 on the remote card and an IMS driver 1103 on the central card are utilized for communicating. Basic components of the distributed protocol module 1100 include the receive protocol dependent processing module 1104, a protocol address cache 1 105, and a packet disposition process 1106. The data coming in on the I/O ports 1107 for the remote card are coupled to the receive protocol dependent processor 1104. This processor utilizes the protocol address cache 1105 to attempt to route the packet. The packet is passed through the packet disposition process 1106 if possible, for communication either back out the ports 1107 or across the IMS to the appropriate destination. If the receive protocol dependent processor 1104 cannot route the packet, then it uses the IMS service 1102 to request an update to its protocol address cache 1105. The IMS module 1103 on the IOS routes a packet to the distributed protocol module server 1108 in the central processor. Using protocol address cache support services 1109, data to update the protocol address cache 1105 of the remote processes is taken from the complete protocol routing tables 1110 in the central processor and forwarded to the cache 1105 across the IMS system.

If the receive protocol dependent processing 1104 determines that it has received a type of packet which cannot be routed using the distributed protocol service, then it is passed through the IMS 1102, 1103 to the complete protocol processing services 1111 in the central processor. These services rely on the complete protocol routing tables 1110, and forward the routed packet to packet disposition services 1112 which utilizes the IMS to route the packets to appropriate destination if possible. If the destination is an IOM module without IMS services, then local drivers for the IOM ports 113 are utilized by the packet disposition system 1112 to drive the packet out the appropriate port in the IOM module. Packets incoming from the IOM module are supplied to the complete protocol processing resources 1111. A central DPM server which emulates the DPM interface for the protocol routing processing 1111 can be utilized for the IOM ports as illustrated at block 1114. Also, the central processor can execute remote DPM configuration services 1115 utilizing the IMS messaging system through the DPM server 1108 if desired.

Thus, a distributed protocol module provides protocol specific processing on an intelligent I/O card. In the present architecture, all packet processing is done in the centralized code residing in the central processor, unless DPMs are located on the receiving processor. With DPMs, protocol processing is distributed to the intelligent I/O cards, which rely on the central resource for many functions. The basic goal is to perform packet forwarding computations for the majority of packets on the intelligent I/O card, rather than sending all the packets to a full function routing processor. This can be achieved by implementing some or all of the packet forwarding fast path on intelligent cards while keeping the control functions including higher protocol layers centralized on the central processor. Intelligent I/O cards will maintain routing caches for a distributed protocol. The DPM will try and make the switching decision locally. This is done by looking up in the local cache for a destination address. In the case there is no cache entry, then the packet will be queued in a local memory, and a protocol cache query (PCQ) is sent to the central processor. The code in the central processor will reply with a protocol cache reply (PCR) or may not respond at all. Based on the PCR, or the lack of one, the DPM will either route the packet to the destination port, send it to the central processor for routing there, or discard it. In the case the DPM cannot process the inbound packet because processing is required which is not supported by the DPM, the packet is sent to the central processor to be processed in the normal data path. For IP routing in the scalable platform of the present invention the following cases illustrate data flow.

Case 1: Unicast, known or unknown destination, received and sent on the same input/output module the IOM style. In this case there are no distributed protocol modules involved. The packet is always sent to the central processor for processing, even if the destination port is on the same I/O card.

Case 2: A unicast packet, destination not in cache, received and sent on the same intelligent I/O module. The DPM on the intelligent I/O module will route the packet locally. A PCQ/PCR exchange will take place with the central processor to determine the route for the packet. The data packet will never cross the bus.

Case 3: A unicast packet, destination in cache, received and sent on the same intelligent I/O card. The packet contains information that the DPM cannot process (for example options in the header). The packet will be forwarded to the central processor for processing by the normal path.

Case 4: A unicast packet, destination in cache, from one intelligent I/O card to another intelligent I/O card. The distributed protocol module on the receiving intelligent I/O card will take the routing decision to route the packet to a remote intelligent I/O card. The IP code in the central processor is not involved.

Case 5: A unicast packet, known destination from an I/O module to an intelligent I/O card. The IOM card receives the packet and sends it to the central processor. The routing decision is made in the central processor. The packet is sent to the intelligent I/O card for transmission. In this case, there is no distributed protocol module involved.

Case 6: A unicast packet, with the destination in the cache is sent from an intelligent I/O card to an IOM card. The packet is received on the intelligent I/O card. The DPM makes a routing decision and send the packet to the central processor. The protocol code on the central processor is not involved. The packet is place directly in the output queue in the central processor for the destination port.

There are several logical components involved in supporting routing when distributed protocol modules are involved. In the intelligent I/O cards, there is an IP distributed protocol module. This receives inbound packets from the ports. It is responsible for routing the packets to the destination or forwarding them to the central processor for further processing. On the central processor there is an internet protocol module which provides the IP normal path and quick path, and routing table maintenance for all the configuration functionality. The "normal" path, sometimes called slow path, processes with more complexity. The "quick" path, sometimes called fast path, is optimized for the majority of packets which do not need complex routines that handle several exceptions and special cases, like the slow path. Also, since there is no DPM on the central processor, a component is involved in the data path for packets routed by the IP DPM in one intelligent I/O card to a port on a IOM card. Further, a DPM server is located in the central processor which serves as a central server for the various DPMs in the system. Its primary responsibility is to process cache related messages to and from the DPM.

The inbound receive protocol dependent processing server 1104 in the DPM performs basic header validation based on versions, check sums, links, et cetera. In one embodiment, fast switching for the IP DPM will only apply to IP version for packets with no options. All other packets are forwarded to the central processor for the routing decision. Of course the DPM may be enhanced to provide services for other kinds of packets if desired.

The inbound receive protocol dependent processing also determines whether local routing or a transfer to the central processor must be made by the DPM. Also the inbound receive protocol dependent processing does routing lookups in the cache and does next hop determinations for the packet. Thus the local cache will be searched to find the next hop for the packet. If not entry is found, the packet will be queued and a protocol cache query will be sent to the central processor. Based on the response, or the lack of one, the packet will either be forwarded to central processor, routed to a destination port, or discarded. Finally, the inbound receive protocol dependent processing performs the full IP filtering functionality. This involves maintaining multiple copies of the IP filtering configuration, one on the central processor and one on each of the intelligent I/O cards which has an active IP DPM. Filtering will be applied in the DPM only if it has been determined that the DPM can route the packet. That is if the packet has to be sent to the central processor for protocol processing, then no filtering action is taken by the DPM.

After it has been determined that the packet needs to be routed, the following actions may be performed in module 1104. The TTL and check sum fields of the packet can be updated in the header. The IP DPM can perform all necessary MAC header conversions. For example, if the encapsulation of the inbound packet is Ethernet and the destination encapsulation is SNAP, it is the responsibility of the IP DPM to format the header before the packet is forwarded. For instance, one implementation of an IP DPM will support conversion to the following MAC headers: any LAN type, such as Ethernet, Token Ring, FDDI, et cetera and the point-to-point protocol PPP wide area link. For all other cases the packet is forwarded to the central processor for processing by the main path. Of course, other DPMs can support additional MAC layer header conversions.

Packet disposition is handled as follows:
A. The incoming receive packet will be disposed of in one of the following ways.
1. Discarded The incoming packet can be discarded. This can happen for the following reasons:
  a. No response was received from the Protocol Cache Query for the requested route. This does not indicate that there is not route to the destination. It means that either the PCQ or PCR was dropped somewhere in the system.
  b. Filtering. The filtering database contained a matching condition with the action of discarding the packet.
2. Forwarded to central IP resources Since the IP DPM contains a subset of the complete IP routing functionality, the DPM may not be able to fully process the packet. For such cases, the packet will be forwarded to the central processor for processing. The packet may be sent to the central processor for processing by the IP normal path or the IP quick path.

B. The packet may be forwarded to the central processor IP normal path are for the following reasons.
1. Packet destination IP address is unicast and is the router itself. These are end system packets and are usually handed off to the upper layers. Packet is forwarded using the IMS high reliability queue HRQ.
2. Packet destination IP address is broadcast/multicast. These are usually network control packets. Packet is forwarded using the IMS high throughput queue HRQ.
3. IP Security Options processing is enabled. Packet is forwarded using the IMS HTQ.
4. Packet contains IP options. Packet is forwarded using the IMS HTQ.
5. Packet requires fragmentation. Packet is forwarded using the IMS HTQ.
6. Bridge Source Routing is enabled.
7. The PCR indicates that the destination interface is a type which is currently not supported in the DPM routing path. Packet is forwarded using the IMS HTQ.
8. The PCR indicates that no route exists to the destination IP address. The packet must be sent to the central processor for processing. The central processor IP needs to maintain statistics and a ICMP message may need to be generated. Packet is forwarded using the IMS HTQ.
9. The PCR indicates that the packet destination port is the same port it was received on. Packet must be sent to the central processor for processing. The central processor IP needs to maintain statistics and a ICMP redirect message may need to be generated. Packet is forwarded using the IMS HTQ.

C. The packet may be forwarded to the central processor IP quick path for the following reasons.
1. Debug controls indicate packet should be forwarded to the central processor. In this case all packets will be forwarded to the central processor for processing by the IP quick path. Packet is forwarded using the IMS HTQ.
2. The protocol address cache PAC has reached the maximum limit of the entries it can have. An additional PACE entry cannot be created. The packet is forwarded to the central processor for processing by the quick path.

D. The packet may be routed to destination interface directly in the following cases.
1. If a valid entry for the destination is found, or there is a successful PCR which indicates that the packet should be routed and the PCR contains the valid routing information, the packet will be forwarded to the destination interface.
2. If the destination interface is on a remote slot, the packet will be sent in an IMS HTQ message to the destination slot peer DPM or the IP CDPM on the central processor.
3. If the destination interface is on a local port, the packet will be directly put on the output queue for that port.

The Protocol Address Cache PAC 1105 is managed as next described.

The DPM will maintain a local routing cache. Routing will be performed by looking up the destination addresses in the local cache. A query/response system will be used between the DPM and IP DPMs on server (DOMSS) 1108 on the central processor to obtain new routing information for insertion into the cache.

The PAC can be a state machine and be event driven.

Protocol Address cache entries PACE are created as follows.

A PACE will be created when a packet is to be routed and no PACE entry exists for the destination IP address. In this case a PACE is created, the packet is queued to the PACE and a PCQ is sent to the DPMS to determine the route. All subsequent packets for the same destination are queued until a PCR is received.

If a PCR is received, the PACE is updated and based on the PCR information the queued packets are either routed to the destination port or forwarded to the central processor for processing.

If no PCR is received and a set time expires, the PACE is deleted and all queued packets are discarded.

If the PAC has reached the maximum entry limit, an additional PACE will not be created. All packets which require an additional PACE to be created will be forwarded to the central processor for processing by the quick path.

Protocol Address Cache maintenance is handled as follows.

The maintenance is purely timer based. A PACE will become stale after period of time and will need to be refreshed by issuing a PCQ to the DPMS.

A PACE can be deleted if the age timer expires indicating that the entry is not longer valid.

The complete PAC can be flushed via command, or by the DPMS when the routing table or the address table in the central processor is flushed.

Cache maintenance will be the core of the DPM functionality. It will include:

1. queuing of packets for destinations not in cache.
2. dispatching of Protocol Cache Queries to the IP DPMS on the central processor for unknown routes.
3. updating of local cache entries from Protocol Cache Reply messages from the IP DPMS on the central processor.
4. supporting a rate limiting mechanism for PCQs.
5. cache maintenance including aging, refresh, re-use.
6. forwarding or dropping of queued packets based on successful response or aging.
7. supporting general controls including enable, disable, flush, display.

Per-port statistics will be maintained. The following counts will be maintained:

1. packets received from network.
2. packets discarded.
3. packets routed to port on local I/O card.
4. packets routed to remote I/O card.
5. packets sent to CEC for exception processing.

Additional counts of the cache and data flow statistics are available under debug. These statistics will be available to the central processor for display via the user interface.

The IP DPM will be supported on the central processor by the following logical components—IP CEC, IP DPMS and IP CDPM.

IP CEC

This component is not directly involved in the data path of packets routed by the IP DPM. This component provides:

1. complete IP protocol processing. This includes maintaining the IP routing tables, processing configuration information, et cetera.
2. IP "quick" path packet switching for packets received from I/O cards which do not have a DPM, or from intelligent I/O cards where the DPM has been disabled.
3. IP "normal" path processing for any packet received from any interface. This includes processing of exception packets from a DPM.

IP DPM Server (IP DPMS)

This component provides IP DPM cache support. The IP CEC will maintain the master IP routing tables. The DPMs on the I/O cards maintain local Protocol Address Caches. The IP DPMS will be responsible for:

1. receiving Protocol Cache Queries form a DPM and responding to them with the appropriate Protocol Cache Reply.
2. flushing DPM Protocol Address Caches when appropriate. This will be done when large scale changes are made to the central IP routing databases. For example, when the routing table is flushed, a port comes up or goes down, et cetera.

The IP CEC also provides IP DPM receive function registration. The IP DPMS will indicate the set of unicast/broadcast functions that should be used by the IBD to forward packets to the IP DPM. This will be done through the snl_register_dpm_tag function call.

The IP CEC is also used for IP configuration. The central processor IP maintains the master user configuration for the IP protocol. IP DPMS is responsible for communicating the appropriate configuration to the DPMs. Configuration information is distributed to the DPM on notification that a DPM needs intializing (via the receipt of the ICM_PROCESS_UP message), or whenever the relevant configuration changes.

The configuration information that needs to be communicated includes:

1. status of the IP routing functionality: whether the DPM should process packets locally or forward all packets to the central processor for forwarding. In certain configurations (for example when IP security is enabled) all packets must be forwarded to the central processor for processing.
2. keeping to IP filtering databases in synchronization. C copy of the IP filtering database will be maintained on the central processor and the I/O cards by the DPM. At initialization, and whenever there is a change in the filtering database, the configuration will be downloaded to the DPMs.

The IP CDPM component is involved in the data path of packets switched by a DPM. The packet flow model for routing with DPMs advocate that the data flow should be from a DPM to a peer DPM. That is, a routed packet should be sent from the DPM on the card it was received to the DPM on the destination slot. It is the responsibility of the DPM on the destination slot to place the packet on the appropriate output queue.

Since the central processor has no DPM component, the IP CDPM provides the subset of the DPM functionality necessary for receiving and forwarding routed packets.

IP CDPM will register the necessary functions to receive packets routed by a DPM for transmission to an IOM port. This function will gather statistical information before sending the packets to be placed on the outbound transmit queues.

The IP specific messages used in the distributed processing include the following:

1. PCQ message to look up a route in the central routing table. This is transferred in the high reliability queue with a priority of one from the distributed protocol module to the distributed protocol server in the central system.
2. A PCR message in response to a PCQ. This can contain the valid next hop information or an indication to send the data packets to the central processor. This message is transferred on the high reliability queue with a priority of one from the DPM server in the central processor to the remote IPDPM.
3. Packets routed by a DPM to a remote intelligent card or to an IOM card without intelligence. This packet is transferred in the high throughput queue with a standard priority, either from an IP distributed protocol module to a second IP distributed protocol module in the destination intelligent I/O card, or from the I/P distributed protocol module to the IP central distributed protocol module on the central processor for routing to the IOM card.

4. Exception control packets (broadcast or unicast) or if the destination IP address is the local address, are sent to the central processor for processing in the IP normal path. These packets are sent by the higher reliability queue with standard priority from the distributed protocol module to the central routing resources.

5. Exception data (unicast) packets sent to the central processor for processing by the IP normal path. These are transferred in the high throughput queue with standard priority from the distributed protocol module to the central processors.

6. Packets sent to the central processor for processing by the IP fast path used for debugging purposes or when the local protocol address cache has reached the maximum number of entries. These packets are sent in high throughput queue by standard priority from the IP distributed protocol module to the central IP resources.

7. Packets used to convey commands from the central unit are transferred to the kernel with guaranteed delivery from the distributed protocol module server to the distributed protocol module.

8. Configuration information is downloaded to the DPMs from the central processor with guaranteed delivery from the distributed protocol module server to the distributed protocol module.

9. The DPM control with guaranteed service for enable, disable, and flush commands are sent with guaranteed priority from the server to the distributed protocol modules.

FIG. 34 illustrates the components of a distributed transparent bridging TB process using the distributed protocol module system according to the present invention. Thus, a distributed protocol module for the bridge process includes the components illustrated at generally 1300. The central processor includes the bridge process 1301 shown in the figure. Thus, the distributed protocol module includes the receive bridging dependent processing 1302 which includes a source address learning resource 1303, a bridge address cache 1304, and spanning tree support 1305. The bridging dependent processing 1302 communicates with the packet disposition module 1306, and with the IMS resource on the local card 1307. Packets are received on the I/O ports on the processor executing the distributed protocol module 1308 is the I/O ports. Also, the packet disposition resources 1306 can route packets directly back to the I/O ports.

The central bridge process includes a transparent bridging DPM server module 1310 which includes a remote DPM configuration service 1311, and bridge cache support 1312. The complete bridge processing resources 1313 are included in the central processor. Also, the central bridge routing tables 1314 are maintained here.

The complete bridge processing resources 1313 communicate with the packet disposition services 1315 and with the IOM ports 1317 served by the central processor. Also a CDPM resource 1318 on the central processor is utilized for facilitating the interface between the DPMs and the IOM ports 1317.

In a simpler version of the Bridge DPM, most transparent bridging features are implemented directly by the Bridge DPM running on the intelligent I/O (II/0) cards (such as an IOP or IOS). However, some features are not directly implemented by the Bridge DPMs. Bridged data packets are forwarded to the central processor for processing as exception packets when a required feature is not directly implemented within the Bridge DPM. The transparent bridging features not implemented within the Bridge DPM as described below can be migrated from the central processor to the bridge DPM on the II/O card.

The following transparent bridging features are implemented directly within the Bridge DPM:
1. dynamic learning of MAC addresses.
2. aging of inactive MAC addresses.
3. firewall support.
4. broadcast limiting support.

The following transparent bridging features are not implemented directly within the Bridge DPM this version and require exception processing by the central processor:
1. translation bridging.
2. mnemonic filtering.
3. source and destination address-based security.

The Bridge DPM Cache 1304 is maintained on the II/O cards. The Bridge DPM on the II/O maintains a cache of recently encountered MAC addresses which is referred to as the Bridge DPM Protocol Address information Cache (PAC). Each PAC entry (PACE) contains information related to a single MAC address. The PAC is used to determine how inbound packets are processed by looking up the destination MAC address in PAC. The PAC is also accessed during the source address SA learning and refresh process.

PAC entries are created when:
1. An inbound packet is received for a unicast destination address not currently in the PAC. This results in a query from the Bridge DPM to the Bridge DPM Server to determine the appropriate destination port. The Bridge DPM issues a PCQ message and the Bridge DPM Server responds with a PCR message. A FIFO queue is maintained for the PACE to queue the original packet and any additional packets (up to a limit) received for same destination while waiting for the PCR.
2. The Bridge DPM Server distributes local MAC addresses to the Bridge DPM by issuing CONFIG messages. Local MAC addresses are distributed during Bridge DPM initialization and updated whenever a local MAC address is added or deleted during operation. PAC entries for local addresses are not subject to aging and remain in the PAC until explicitly deleted.
3. An inbound packet is received with a SA not already in the PAC and PCU is posted to the central engine controller CEC.

PAC entries are deleted when:
1. An inactive address is aged out by the Bridge DPM maintenance function.
2. The Bridge DPM Server issues a CONFIG message when a local address is deleted.
3. The Bridge DPM Server issues a CONFIG message to flush entries in the PAC in response to a user request or as a result of topology change detected by STP.

Entries in the PAC are refreshed by periodically issuing queries (PCQs) to the central bridge routing table on the CEC. A PACE is refreshed (updated) when a PCR is posted to the Bridge DPM by the Bridge DPM Server on the CEC in response to a PCQ.

Source Address SA learning and refresh are handled in the system as follows.

Source address learning occurs in the Bridge DPM when new SAs are encountered in received inbound packets. Refresh is used to prevent previously learned active (i.e. transmitting) stations from aging out of the Bridge DPM cache and the central bridge routing table on the central processor. Source address learning and refresh is not applied to outbound packets.

SA learning and refresh for inbound packets is performed by looking up the SA in the PAC. SA refresh is performed if an entry already exists in the PAC for the SA. It involves updating the age flag in the PACE for the SA.

SA learning is performed if no PAC entry exists for the SA. It involves sending a PCU message from the Bridge DPM to the central processor indicating the location (port) of the SA. A PCU message is not generated for each new SA encountered. Instead, the new SA is added to a PCU message buffer. The PCU is sent to the central processor asynchronously by a maintenance function when a timer expires. This allows batches of SAs to be placed in a single PCU message.

A check is also made to determine if the packet was tagged as BDPM_LEARN_SA (in a driver level filter function described below). If so, the packet is discarded since it is a local traffic packet that was forwarded to the Bridge DPM solely for the purpose of SA learning.

The protocol address cache maintains entries in three states, including a fresh state, a stale state, and a time out state. A timer based protocol cache management system is implemented, in which a fresh entry in the cache remains fresh as long as it is being used. If it is not used for an interval, such as 4 or 5 seconds, then it transitions to the stale state. If an entry in the stale state remains unused for 20 seconds, it is marked invalid. After 20 seconds of unuse in the stale state, then the entry is marked invalid. If an access occurs which relies on a stale cache entry, the access will utilize the stale entry, and then the cache management system will forward a request to the central processor to refresh the entry. If the refresh is received, then the cache entry is moved back to the fresh state. The time intervals utilized for a given protocol address cache vary depending on the traffic in a particular system having the cache. Thus, for some protocol types, longer or shorter intervals may be utilized for the transition from fresh to stale, or from stale to invalid. These intervals should be optimized for a particular implementation.

A rate limiting mechanism is used to limit the rate at which PCU messages are posted to the central processor. The rate limiting mechanism is needed to prevent the central processor from being flooded out with PCUs from the Bridge DPMs following some LAN topology transition.

A PACE is created for each new SA encountered. The PACE state is set to indicate that a PCU has been posted to the central processor. This state is used to prevent additional PCUs for the same address from being posted to the central processor. The PACE is not used to forward data packets until a PCQ/PCR exchange between the I/O and central processor completes. New SA PACEs are not created while PCU generation is inhibited by the PCU rate limiting mechanism.

A driver-level packet filter function is implemented as follows.

The Bridge DPM driver-level packet filter function, bdpm_drvr_filter, is called by the I/O interface driver for each received packet. The bdpm_drvr_filter function will be called by the Ethernet (or other) LAN Driver.

The bdpm_dvr_filter function is invoked by BEMD for each received packet as soon as the packet's destination address DA and SA have been ready from the controller receive FIFO. Its primary purpose is to perform driver-level bridge filtering by returning a filter or forward indication to driver. This allows the driver to filter local traffic packets by issuing a flush command to the controller without reading the entire packet from the FIFO.

For packets to be forwarded to DLL Demux, a value is returned which is used by driver to tag the received packet. This value is used later by the DLL demux to determine how received packets should be processed and in some cases it contains the destination port number for packets to be bridged. The appropriate return value is determined by looking up the DA in the Bridge DPM PAC.

The bdpm_dvr_filter function also performs bridge age refreshing for local traffic packets which are filtered by driver. It is necessary to do bridge age refreshing within bdpm_dvr_filter for local traffic packets to prevent aging out PAC entries for stations that only generate local traffic for extended periods. Bridge age refreshing is performed by setting an "active" bit in PACE for the SA and incrementing a per-port filtered packet counter.

SA learning and bridge age refreshing for packets which are forwarded by driver are not performed within bdpm_dvr_filter. Instead, it is deferred until the packets are received by the Bridge DPM. This approach require that some local traffic packets are "leaked" (forwarded) to the Bridge DPM solely for the purpose of SA learning. These are the local traffic packets containing an SA which needs to be learned (no PACE exists for the SA).

The rationale or deferring SA learning until packets reach the Bridge DPM is:

1. It results in only learning SAs from bridged packets and not from routed packets.

2. Optimum performance is not required while learning new SAs so the additional overhead in leaking some local traffic for SA learning is insignificant.

3. Optimizations can be realized by performing learning and bridge age refresh based on batches of packets.

4. Overhead incurred within the bdpm_dvr_filter function should be minimized since it runs in an interrupts context (SA learning requires creating new PAC entries and sending PCU (Protocol Cache Update) messages to the central processor).

All bdpm_drvr_filter function return values are listed below:

1. BDPM_FILTER

Local traffic packet to be filtered by BEMD.

2. BDPM_LOCAL_HOST

Unicast packets with a DA containing one of the bridge/router's local AMC addresses (packets addressed to the bridge/router itself). These are either packets to be routed or end system packets directed to the bridge/router.

3. <bridge_dest_port>

<bridge_dest_port> is returned for packets to be bridged when the DA is in the PAC. It contains the actual destination port number the packet should be forwarded to. This allows the Bridge DPM to forward the packet without looking up the destination in the PAC.

4. BDPM_MULTICAST

All packets with the multicast address bit set in the DA. This includes both multicast and broadcast packets.

5. BDPM_UNKNOWN_DA

Unicast packets containing a DA which is not in the PAC or a DA which is in the PAC but does not have a valid port associated with it (occurs while waiting for a response to query to locate the DA). The SA may or may not be in the PAC. These are packets to be bridged but the destination is not yet known.

6. BDPM_LEARN_SA

Local traffic packets where no PACE exists for the SA or a PACE exists for the SA but the source port in the PACE doesn't match the source port the packet was received on (occurs when station moves from one port to another). These packets are passed to the bridge DPM solely for the purpose of SA learning and they are discarded after the SA has been learned.

7. BDPM_EXCEPTION

Unicast packets where a PACE with a valid port exists by the destination media type differs from the source media type. These packets require translation (e.g. Ethernet to FDDI) and are forwarded to the central processor for processing as exception packets. It is also returned if the destination is an IOM serial port, and the WAN protocol is SMDS or X.25.

The BDPM inbound receiver is implemented as follows.

The BDPM inbound receiver is invoked by inbound demultiplexer IBD to receive batches of packets from the local II/O ports. A separate receive function is used for unicast and multicast batches.

Three different pairs of multicast and unicast receive functions are supported:

1. bdpm_rcv_ibd_unicast and bdpm_rcv_ibd_mcast; normal receive functions used when filtering and debug processing not active.

2. The appropriate unicast/multicast receive function pair is selected when the BDPM Server calls the snl_registerdpm_tag function on the central processor.

3. When the debug or filter versions of the receive functions are active, all packets received by the unicast and multicast receive functions are passed to the central processor without being processed by the Bridge DPM. The filtering receive path is used whenever mnemonic or source and destination address bridge security filtering is enabled. It forces all packets received by the Bridge DPM to be processed by the central processor as exception packets since filtering is not supported within the II/O card. The debug receive path is only used to facilitate debugging. It allows the Bridge DPM to essentially be disabled.

The normal inbound receive path is used when filtering and debug mode are inactive. It is described in detail below.

Normal receive path unicast packet handling for the system is done as follows.

Unicast packets in the normal receive path are received by the bdpm_rcv_ibd_unicast function. Disposition of unicast packets is based on the packet tag value applied by the Bridge DPM driver-level packet filter function:

1. <bridge_dest_port>—Directly forwarded to the destination port indicated.

2. BDPM_EXCEPTION—Forwarded to the central processor for processing.

3. BDPM_LEARN_SA—Source address learning is performed and then the packet is discarded.

4. BDPM_UNKNOWN_DA—A PACE entry is created for the DA and the packet is queued to the PACE, a PCQ is posted to the central processor. Additional packets received for the same DA while waiting for the PCR from the central processor in response to the PCQ are also queued to the PACE.

Packet disposition is based on the PCR returned as follows:

1. Destination Found

Packet is forwarded to the destination port if translation is not required otherwise it is forwarded to the central processor for processing. The PACE is updated so additional packets received from the same DA will be tagged as <bridge_dest_port> or BDPM_EXCEPTION by the driver-level filter function.

2. Destination Not Found

Packet is an unknown unicast and is flooded using the same technique used for multicast packets described below. The PACE entry is also deleted so that additional packets for the same DA will result in another PCU.

3. No PCR Received

This occurs if either the PCQ or PCR is lost. The PACE entry will time-out and the packet(s) queued to PACE are discarded. The PACE entry is also deleted so that additional packets for the same DA will result in another PCU.

Normal receive path multicast data packet handling is implemented as follows.

Inbound multicast data packets in the normal receive data path are received by the bdpm_ibd_rcv_mcast function. Packet flooding is applied to all inbound multicast and unknown unicast packets received in the normal receive path. Flooding is performed as follows:

1. A copy of the packet is forwarded to each of the local II/O ports (excluding the one it was received on).

2. A single copy of the packet is forwarded to central processor TB, which floods the packet to all of the active IOM ports, performing translation as required.

3. A single copy of the packet is forwarded to each of the other Bridge DPMs on the other II/O cards in the system without performing translation. The receiving Bridge DPM then floods the packet to all the local II/O ports.

The BDPM outbound receiver is implemented as follows:

Outbound bridged data packets are received from the Corebus via IMS and forwarded to the local II/O ports. Source address learning is never applied to outbound packets received by the Bridge DPM. The Bridge DPM directly receives the following packet types at the bdpm_outbound_rcv function:

1. multicast packets from another II/O or the central processor.

2. unknown unicast packets from another II/O or the central processor.

Each packet received at bdpm_outbound_rcv is flooded to all local II/O ports except the one it was original received on by passing multiple copies of the packet to the common IBD transmit function ibd_dpm2port_xmit. The IBD transmit routine updates the statistics and queues the packets for transmission on the II/O local ports.

The following packet types bypass the Bridge DPM and are passed directly to the IBD function ibd_cec2port_xmit where they are queued for transmission without updating statistic (statistics are counted on the CEC):

1. known unicast packets from IOM ports.

2. unicast exception packets.

Known unicast packets from other II/Os in the system bypass the Bridge DPM and are received directly by the common IBD receive function ibd_ims2port_xmit where statistics are updated and the packets are queued for transmission to the II/O ports.

Spanning Tree Protocol support is implemented as follows.

Spanning Tree Protocol (STP) processing is not performed by the Bridge DPM or Bridge DPM Server on the central processor. Instead, all STP processing is performed by the existing STP component on the central processor. The Bridge DPM Server monitors the STP port state (e.g. LISTENING, LEARNING, FORWARDING, BLOCKING) of the II/O local ports and posts CONFIG messages to the bridge DPMs to inform them of the current port state.

STP BPDUs received on II/O local ports are passed by IBD to the Default DPM and then forwarded on the STP component on the central processor bypassing the Bridge DPM and Bridge DPM Server.

Bridge DPM server functionality includes the following.

The primary purpose of Bridge DPM Server is to provide centralized support on the central processor for the Bridge DPMs running on the II/O cards. It is responsible for:

1. Distributing configuration and status information to the bridge DPMs.
2. Receiving PCQ messages from the Bridge DPMs and responding within PCRs.
3. Receiving PCU messages from the Bridge DPMs to learn/refresh source addresses of stations attached to II/O local ports.
4. Accessing debug information maintained by the Bridge DPMs.

Configuration and status information distribution occurs as follows.

Configuration and status information is distributed by the Bridge DPM Server to the Bridge DPMs as part of the Bridge DPM initialization process. The Bridge DPM Server receives an ICM_PROCESS_UP message when each II/O card with a Bridge DPM initializes. The Bridge DPM Server also updates configuration /status information on the bridge DPMs whenever changes occur during operation.

The following configuration and status information is distributed the Bridge DPMs:

1. port status: disabled, listening, learning, forwarding, blocking (II/O local ports only).
2. bridge control: Bridge or NoBridge, Forward or NoForward, Learn or NoLearn, et cetera.
3. Local MAC addresses.
4. bridge filter state information.
5. flush entries in PAC.
6. per-port broadcast limit information.
7. current status of all slots.

Port status information is distributed as follows.

The Bridge DPM Server is responsible for distributing port state information to the Bridge DPMs and purging obsolete information in the Bridge DPM PACs. Within the central processor, Spanning Tree Protocol port state transitions are reported by calling a tb_control function. The tb_control function informs the Bridge DPM Server whenever a port state transition occurs for an II/O port and whenever an IOM port transitions to BLOCKING or DISABLED state.

When the Bridge DPM server receives a port state transition indication from tb_control for an II/O port, the new port state is passed to the Bridge DPM for the II/O port by issuing a CONFIG message. In addition, the Bridge DPM Server issues a flush PAC CONFIG message to all Bridge DPMs whenever a port transition to BLOCKING or DISABLED state. This ensures the Bridge DPM PACs are purged of obsolete information.

Local MAC address distribution occurs as follows.

The Bridge DPM Server is responsible for distributing the local MAC addresses to the Bridge DPMs. The local addresses are distributed to each Bridge DPM in the system as part of the Bridge DPM initialization process. Additionally, updates are distributed to all Bridge DPMs whenever a local address is changed. An example of a local MAC address when can change during operation is the special MAC address used by DECNET routing.

The local MAC addresses are distributed by the Bridge DPM Server to the Bridge DPMs in CONFIG messages. Multiple addresses can be packet into a single CONFIG message. Each address entry in a CONFIG message contains the following information:

1. action: add or delete address
2. MAC address

The Bridge DPM creates a PACE for each local MAC address in a received CONFIG message. These addresses are not subject to aging from the PAC and are only removed from the PAC when explicitly deleted by a CONFIG message from the Bridge DPM Server.

Bridge filter state information is distributed as follows.

The current bridge filtering state information for both mnemonic filtering and source and destination address bridge security filtering is conveyed to the Bridge DPMs by selecting the normal or filter versions of the unicast and multicast receive functions for the BDPM Inbound Receiver by calling the snl_register_dpm_tag function with the following tag values:

1. IBD_BDPM_RCV_UNICAST and IBD_BDPM_RCV_MCAST to select the normal receive functions
2. IBD_BDPM_RCV_UNICAST_FILTER and IBD_BDPM_RCV_MCAST_FILTER to select the filter versions of the receive functions.

All inbound data packets (unicast and multicast) received by the bridge DPM are treated as exception packets and passed to the central processor processing when the filter version of the receive functions are active.

Slot status information is distributed as follows.

The current slot state information is distributed to the Bridge DPMs. The Bridge DPM Server is informed of the slot status by ICM_PROCESS_UP and ICM_PROCESS_DOWN messages. The Bridge DPMs cause the slot state information to control flooding of multicast and unknown unicast bridged data packets to other II/Os.

A generic slot status function may be implemented on the II/Os. It would directly inform the DPMs about the current status of all slots in the system. Slot status distribution by the Bridge DPM Server to the Bridge DPMs will not be necessary if the generic function is implemented.

Processing of PCQ requests from bridge DPMs occurs as follows.

The Bridge DPM queries the central bridge routing table for the location of MAC addresses by sending the PCQ messages to the Bridge DPM Server. Upon receiving a PCQ, the Bridge DPM Server looks up the MAC address(es) specified in the PCQ in the central bridge routing table maintained on the central processor and posts a PCR in response to the PCQ. If an address specified in the PCQ is found in the central bridge routing table, the destination port number, WAN address if any, and media type is returned in the PCR. Upon receiving the PCR, the Bridge DPM updates the PACE and forwards the queued packet(s).

If an address contained in a PCQ is not found in the central bridge routing table, the port field in the PCR is set to UNKNOWN. The UNKNOWN is returned in the PCR, the Bridge DPM will flood the packet and delete the PACE for the address. Deleting the PACE causes a new PCQ to be posted by the Bridge DPM to the Bridge DPM Server when another packet for the same destination is received.

SA learning and age refresh in central bridge routing table is handled as follows.

The Bridge DPM forwards learned MAC addresses to the bridge DPM Server in PCU messages. A single PCU can contain several learned addresses. Each address entry in the PCU message contains the MAC address and source port number.

The Bridge DPM Server creates an entry in the central bridge routing table for each learned MAC in the PCU message from the Bridge DPM. These entries are subject to the normal aging process. The Bridge DPMs periodically posts PCU messages for active addresses in the PAC learned from the local II/O ports. This causes the Bridge DPM Server to refresh the age of the corresponding entries in the central bridge routing table. The interval for periodically generating PCU messages from the DPMs is less than the time required to age out an entry in the central bridge routing table which prevents entries from being aged out.

V. EXTENSION TO LAN OR WAN BACKBONE

FIG. 35 illustrates an extension of the present invention to a system which replaces the high speed parallel bus of FIG. 1 with a local area network or wide area network backbone generally 2000. For instance, the backbone 2000 might be an ATM network coupled to a variety of local area networks using virtual circuits, such as discussed in the document published by the ATM Forum entitled *LAN Emulation OverATM Specification—Version* 1.0. Thus, a plurality of input/output processors, such as IOP 2001, IOP 2002, and IOP 2003 are coupled using the interprocessor messaging systems IMS 2004 through IMS 2006 respectively. Using the backbone physical layer 2000, the IMS communicates among the IOPs using the message passing protocol as described above. Coupled to the WAN or LAN backbone 2000, is at least one router in the embodiment shown. A first router labeled Router A 2007 is coupled to the backbone through the interprocessor messaging system 2008. Also, a second router 2009 labeled Router B in the figure, is coupled to the backbone through the interprocessor messaging system 2010. Each of the input/output processors 2001 through 2003 and the routers 2007 and 2009 in the figure include a plurality of network connections which provide interfaces to networks which use the router resources distributed amongst the processors. More than one router is included in the system. This way, the IOP processors 2001 through 2003 can contain some fault tolerance. For instance, if Router A is down, a processor may retry a given request to the router by sending it to Router B. A variety of protocols can be used to optimize performance of the system. For instance, the IOP might use Router A for a first transaction and Router B for a second transaction, and constantly change between routers. Alternatively, each IOP could be assigned a primary router which it relies upon, unless a catastrophic failure in the primary router occurs. In which case, its requests are redirected to the secondary router.

Because of the interprocessor messaging system based on the latency and reliability classes of the present invention, the scalable internetworking processes are achieved using the LAN or WAN backbone, which suffers lost packets from time to time. Data in transit is ensured to receive the best available throughput across the backbone 2000, while control messages and the like are given higher priority, and managed to ensure greater reliability than are the high throughput, data-in-transit messages. This way, the overhead associated with high reliability type messages is not extended to the data-in-transit, providing substantial improvements in overall system throughput across the backbone 2000.

VI. CONCLUSION

Accordingly, the present invention provides a high performance family of bridge/routers which supplies transparent communication between all types of interfaces within a single chassis, integrating Token Ring, Ethernet, FDDI, ATM, and WAN links. The architecture of the present invention delivers the power of single or multiprocessor options, with a high speed backplane bus for consistently fast throughput across all interface ports.

These resources allow for selecting the most efficient path between any two locations, automatically re-routing around failures, solving broadcast and security problems, and establishing and administering organizational domains.

The high speed, scalable networking framework according to the present invention encompasses all segments of the network—the workgroup, the building or campus backbone, and the remote and personal offices connected over wide area links. It allows these segments to be administered from a centralized management system. The end result is an enterprise wide network that is suited to the way in which companies conduct business. The benefits of the high speed scalable networking strategy include expertise can be brought together quickly to deliver projects or products efficiently and effectively. Also, custom applications can be developed and more cost-effectively. The cost of incremental computing power drops dramatically because of the scalable nature. Finally, the investment in current equipment and technology is protected while paving the way for future technologies.

Thus, the scalable platform of the present invention provides for interconnection of a full function routing engine with a wide variety of input/output modules, including other full function engines, intelligent I/O modules which perform a subset of the routing decisions, and basic I/O modules which have no local routing capability and rely on the centralized full function routers for such decisions. All of these elements are interconnected by a high speed backplane bus utilized efficiently according to logical layer interconnections for the intelligent I/O processors, and physical layer interconnection for the basic I/O modules without processing facilities necessary for managing the logical links. Thus, the architecture of the present invention supports growing complexity of I/O modules, as well as basic single port connections that can be used for incremental growth, and backward compatibility in the systems.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An apparatus of interconnecting a plurality of networks, comprising:

a plurality of input/output systems, having input/output ports for physical connections to a diversity of networks operating with a plurality of routed network protocols, said input/output systems having a plurality of variant sets of processing resources;

an interprocessor messaging system, coupled with the plurality of input/output systems, including a logical layer and a physical layer, for transferring data-in-transit and control signals among the plurality of input/output systems; and distributed processing services in the plurality of input/output systems, including for respective sets of routing decisions according to corresponding routed network protocols in the plurality of routed network protocols a central routing resource in a processor coupled to the interprocessor messaging system, and a distributed protocol module in a given input/output system in the plurality of input/output systems, in which the distributed protocol module supports a subset of the respective set of routing decisions for the corresponding routed network protocol and relies on communications across the interprocessor messaging system with the central routing resource for routing decisions not in the subset of the set of routing decisions for the corresponding routed network protocol.

2. The apparatus of claim 1, wherein the processor which includes the central routing resource, includes a plurality of input/output ports for physical connections to a networks.

3. The apparatus of claim 1, wherein the plurality of input/output systems comprise a plurality of central routing processors coupled to the interprocessor messaging system, each including central routing resources for respective routed network protocols.

4. The apparatus of claim 1, wherein the central routing resource includes resources for communicating with input/output systems at the physical layer of the interprocessor messaging system for input/output systems without logical layer processing capability.

5. The apparatus of claim 1, wherein the interprocessor messaging system supports messages among the plurality of input/output systems according to a plurality of classes having different latency and reliability characteristics.

6. The apparatus of claim 1, wherein the central routing resource includes a routing table for the given protocol, and the distributed protocol module includes a routing table cache maintained through the interprocessor messaging system.

7. The apparatus of claim 1, including a central routing processor coupled to the interprocessor messaging system which includes:

the central routing resource;

resources for communicating with input/output systems at the physical layer of the interprocessor messaging system for input/output systems without logical layer processing capability; and wherein the interprocessor messaging system supports messages among the plurality of input/output systems and the central routing processor according to a plurality of classes having different latency and reliability characteristics.

8. The apparatus of claim 7, wherein the central routing resource includes a routing table for at least one routed network protocol in the plurality of routed network protocols, and the distributed protocol module for the at least one routed network protocol includes a routing table cache maintained through the interprocessor messaging system.

9. The apparatus of claim 1, wherein the interprocessor communication system includes a backbone communication medium which comprises a local area network.

10. The apparatus of claim 1, wherein the interprocessor communication system includes a backbone communication medium which comprises a wide area network.

11. The apparatus of claim 1, wherein the interprocessor communication system includes a backbone communication medium which comprises an asynchronous transfer mode network executing a process for emulation of a connectionless local area network protocol.

12. An apparatus for interconnecting a plurality of networks through network interface systems having different degrees of protocol processing capability, comprising:

a router processor having processing resources for managing multiprotocol routing of packets received from the plurality of networks, including protocol processing resources serving the different degrees of protocol processing capability in the network interface systems;

a bus having a plurality of bus slots for network interface systems and coupled to the router processor providing a data path among the router processor and network interface systems connected in the bus slots;

a bus communication system run in the router processor and network interface systems in the bus slots supporting flow of data-in-transit and control messages among the router processor and the bus slots across the bus;

wherein the protocol processing resources provide centralized protocol processing for packets forwarded from a particular network interface system which receives a packet needing processing for a protocol not supported by the particular network interface system, and provide distributed protocol processing for protocols partially supported by network interface systems in response to requests from network interface systems.

13. The apparatus of claim 12, wherein the centralized protocol processing includes support for per-packet routing and header processing for at least one protocol run in the plurality of networks.

14. The apparatus of claim 13, wherein the distributed protocol processing includes management of routing tables in the router processor and support of routing table caches in network interface systems for at least one protocol run in the plurality of networks.

15. The apparatus of claim 12, wherein the communications system supports transfer of data-in-transit and control messages among the router processor and the plurality of bus slots with reliability classes.

16. The apparatus of claim 12, wherein the communications system supports transfer of data-in-transit and control messages among the router processor and the plurality of bus slots with latency classes.

17. The apparatus of claim 12, wherein the router processor includes shared memory resources accessible through the bus communication system by the network interface systems in the plurality of slots, for holding data-in-transit.

18. An apparatus for interconnecting a plurality of networks, comprising:

a backbone communication medium having a physical layer protocol;

a central routing processor coupled to the backbone, including resources for making routing decisions according to a plurality of routed network protocols;

a plurality of input/output modules coupled to the backbone and in communication with the central routing processor according to the physical layer protocol, the input/output modules having respective sets of physical network interfaces, the set for a given input/output module having one or more members;

an interprocessor messaging system in a logical layer above the physical layer protocol executed in the central routing processor and in a set of one or more intelligent input/output modules within the plurality of input/output modules; and distributed protocol services executed over the interprocessor messaging system, including a distributed protocol module in at least one member of the set of intelligent input/output devices which makes routing decisions supported by the distributed protocol module according to a corresponding routed network protocol in the plurality of routed network protocols, and a distributed protocol module server in the central routing processor which in response to queries from the distributed protocol module makes routing decisions on behalf of the distributed protocol module according to the corresponding routed network protocol.

19. The apparatus of claim 18, wherein a particular input/output module in the plurality coupled to the backbone includes resources for signalling the central routing processor about events across the physical layer protocol, and including:

centralized routing services executed in the central routing processor over the physical layer protocol in response to events on the particular input/output module which makes routing decisions.

20. The apparatus of claim 18, wherein the distributed protocol services include resources for performing transparent bridging in at least one the of the input/output modules.

21. The apparatus of claim 18, wherein the corresponding routed network protocol of the distributed protocol services comprises Internet protocol (IP) routing in at least one of the input/output modules.

22. The apparatus of claim 18, wherein the interprocessor messaging system includes resources for transferring control messages and network packets-in-transit among the central routing processor and input/output modules in the set of intelligent input/output modules.

23. The apparatus of claim 18, wherein the distributed protocol module includes a protocol routing table cache, and the distributed protocol module server includes resources for maintaining a central protocol routing table and supporting the protocol routing table caches.

24. The apparatus of claim 18, wherein the interprocessor messaging system supports communication among the central routing processor and the plurality of input/output modules with messages in a plurality of latency classes.

25. The apparatus of claim 18, wherein the physical layer protocol supports communication among the central routing processor and the plurality of input/output modules with messages in a plurality of latency classes.

26. The apparatus of claim 18, wherein the interprocessor messaging system supports communication among the central routing processor and the plurality of input/output modules with messages in a plurality of reliability classes.

27. The apparatus of claim 18, wherein the physical layer protocol supports communication among the central routing processor and the plurality of input/output modules with messages in a plurality of reliability classes.

28. The apparatus of claim 18, including a second central routing processor coupled to the backbone, including a second distributed protocol module server.

29. The apparatus of claim 18, wherein the backbone communication medium comprises a local area network.

30. The apparatus of claim 18, wherein the backbone communication medium comprises a wide area network.

31. The apparatus of claim 18, wherein the backbone communication medium comprises an asynchronous transfer mode network executing a process for emulation of a connectionless local area network protocol.

32. The apparatus of claim 18, wherein the backbone communication medium comprises a high speed parallel bus.

* * * * *